US012808732B2

(12) United States Patent
Madden et al.

(10) Patent No.: US 12,808,732 B2
(45) Date of Patent: Nov. 24, 2026

(54) SMART ROLLER

(71) Applicant: The University of British Columbia, Vancouver (CA)

(72) Inventors: John David Wyndham Madden, Vancouver (CA); Xiulun Yin, Vancouver (CA); Nima Bakhshi, Vancouver (CA); Anoshiravan Poursartip, Vancouver (CA); Ziqiang Chen, Vancouver (CA); Mirza Saquib Sarwar, Vancouver (CA); Jian Gao, Vancouver (CA); Justin Kian Ming Wyss, Vancouver (CA)

(73) Assignee: The University of British Columbia, Vancouver (CA)

( * ) Notice: Subject to any disclaimer, the term of this patent is extended or adjusted under 35 U.S.C. 154(b) by 365 days.

(21) Appl. No.: 17/976,740

(22) Filed: Oct. 28, 2022

(65) Prior Publication Data

US 2023/0139916 A1 May 4, 2023

Related U.S. Application Data

(60) Provisional application No. 63/272,856, filed on Oct. 28, 2021.

(51) Int. Cl.
*G01L 1/14* (2006.01)
*G01L 5/00* (2006.01)
*G01L 25/00* (2006.01)

(52) U.S. Cl.
CPC ............ *G01L 1/146* (2013.01); *G01L 5/0028* (2013.01); *G01L 25/00* (2013.01)

(58) Field of Classification Search
CPC ........... G01L 1/142–148; G01L 5/0085; G01L 5/0028; G01L 5/0066; G01L 25/00; B65G 39/00–20
See application file for complete search history.

(56) References Cited

U.S. PATENT DOCUMENTS 6,387,214 B1 * 5/2002 Kustermann ........... F16F 15/00 162/263
8,272,276 B2 9/2012 Gorjanc et al.
(Continued)

FOREIGN PATENT DOCUMENTS

BR PI0904633 A2 * 6/2011
DE 102005042159 B3 * 3/2007 ............. G01K 7/003
DE 102017223196 A1 * 6/2019 ............. B65G 23/04

OTHER PUBLICATIONS

BR-PI0904633-A2 (Year: 2011).*
(Continued)

*Primary Examiner* — Fatemeh Esfandiari Nia
(74) *Attorney, Agent, or Firm* — Todd A. Rattray; Oyen Wiggs Green & Mutala LLP

(57) ABSTRACT

A smart roller comprises: an exterior annular cylinder portion comprising an elastomeric material and having an exterior cylindrical surface; a sensor array imbedded in a volume of the exterior annular cylinder portion, the sensor array extending in an axial direction and in a circumferential direction of the exterior annular cylinder portion, the array comprising a plurality of independently sampleable sensor elements, each sensor element located for measurement at a corresponding axial and circumferential sensor location; a rigid interior portion, at least a portion of the rigid interior section disposed in a bore of the exterior annular cylinder portion, the rigid interior portion connected to the exterior annular cylinder portion for unitary rotational movement therewith; and readout electronics operably connected to the sensor array and configurable to independently sample sensor output from each of the sensor elements.

24 Claims, 31 Drawing Sheets

(56) References Cited

U.S. PATENT DOCUMENTS

| | | | | |
|---|---|---|---|---|
| 8,893,561 | B2 | 11/2014 | Gorjanc et al. | |
| 10,203,254 | B2 * | 2/2019 | Bechstein | G01L 1/2281 |
| 2008/0236275 | A1 * | 10/2008 | Breed | B60R 21/015 73/290 V |
| 2012/0137765 | A1 * | 6/2012 | Wagner | G01P 5/02 73/170.01 |
| 2014/0260680 | A1 * | 9/2014 | Gao | G01L 1/146 73/862.68 |
| 2015/0260871 | A1 * | 9/2015 | Weber | G01V 3/02 324/679 |
| 2015/0320356 | A1 * | 11/2015 | Toth | G01L 1/205 600/587 |
| 2021/0278300 | A1 * | 9/2021 | Bao | B25J 19/02 |
| 2023/0009475 | A1 * | 1/2023 | Sakakura | G01L 5/228 |

OTHER PUBLICATIONS

DE-102017223196-A1 (Year: 2019).*
English translation of Stander, DE102017223196A1 (Year: 2019).*
DE-102005042159-B3 (Year: 2007).*

* cited by examiner

PRIOR ART

SMART ROLLER

REFERENCE TO RELATED APPLICATIONS

This application claims priority from, and the benefit under 35 USC 119 in relation to, U.S. application No. 63/272,856 filed on Oct. 28, 2021. All of the applications referred to in this paragraph are hereby incorporated herein by reference.

TECHNICAL FIELD

This disclosure relates to smart rollers and methods for fabrication, use and control of same, particularly smart rollers as may be applied to automated fiber placement (AFP), and, in some embodiments, other cylindrical or near-cylindrical smart rollers such as paint rollers, conveyor belt rollers, and vehicle tires.

BACKGROUND

Automated Fiber Placement has been a leading technology for the automated manufacturing of composite parts. An AFP system may comprise a gantry or a robotic arm implemented to produce the motion for depositing materials on complex tooling. The material used is typically narrow tapes of pre-impregnated carbon fiber composites (referred to as 'tows' and 'prepreg carbon fiber tows'). The end effector of the motion system (i.e., AFP head or dispenser) collimates and places multiple tows on the tooling using a compaction apparatus, with application of heat and force, and by controlling tow tension and deposition rate. The quality of the layup achieved is influenced by the process conditions at the process nip point, where tows are consolidated under the roller.

The compaction apparatus comprises a force generation mechanism and solid or segmented rollers, which are primarily responsible for placing the tows, facilitating tack development, consolidating the material, and reducing voids between plies. Dimensions of the roller and material used to manufacture the soft outer layer of the roller vary between processes, typically depending on the material used and complexity and geometry of the tooling. For instance, concave tools and/or high curvature (small radius of curvature) tools would typically use smaller rollers to ensure roller conformity to tooling geometry.

Since the composite layup process associated with AFP involves precise layering of carbon fibres—that are then impregnated with resin—the automation of manufacture can be challenging. Typically, the automation involves the use of multiple soft, rubber coated rollers that spread and align fibres over complex surfaces. There is a desire for these rollers to be precise in the application of force (normal and shear) to avoid wrinkling, indentation, misalignment and/or void formation in the AFP process. In prior art AFP systems, the overall force and torque applied to each roller can be measured. However, the local pressures and shears applied by different areas of the roller that are in contact, and the contact area itself, are unknown. If the roller is angled or skewed relative to the surface, for example, this is not detected.

Beyond AFP, many manufacturing and other processes involve rollers with an elastomer coating. Such rollers may include, by way of non-limiting example, paint rollers, roll-roll processes, printer rollers, conveyor rollers and various types of tires and wheels. For rollers, there is a desire to know local conditions in the region of contact between the roller and the part with which the roller is interacting, including the local forces applied to/by the roller, as such conditions and forces are typically related to the quality of the process. For example, with respect to wheels and tires, awareness of the local forces experienced in the region of contact between the tires and an underlying surface can allow monitoring of the motion of apparatus (e.g. an automobile) running on the wheels or tires. As another example, with respect to conveyor rollers, awareness of the local forces experienced in the region of contact between the roller and the belt or between the roller and parts transported on the roller may permit identifying, counting and/or weighing of multiple parts across the axial dimension of the roller.

In some state-of-the-art roller systems, some of these forces can be measured or inferred indirectly, based on the force and torque measured remotely in the roller handle. This does not guarantee that the conditions are satisfactory locally, at the interface between the roller and the part with which the roller is interacting. As a result, imperfections can arise (e.g. uneven paint and protection, misaligned or jammed paper feeds, flaws in the carbon fibre structure that can lead to failure and/or the like). Pressure sensitive films or piezoelectric sensor arrays can be placed on, or imbedded within, the part with which the roller is interacting. This adds an extra layer between the roller and the part which may interfere with manufacturing, or, when imbedded, adds to the complexity of the part itself, or renders it useless.

In AFP systems and other systems and/or processes involving rollers, there is a general desire for direct knowledge of various parameters and/or conditions (e.g. local pressures and/or shear forces and/or other parameters) at the nip point (i.e. the region of contact between the roller, the part or substrate with which the roller is interacting and any intervening material (e.g. carbon-fibre prepreg tow in the case of AFP)). Such knowledge can be used to provide feedback and/or to provide input for simulations, which can in turn improve the systems and/or processes (in real time or otherwise).

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides a smart roller for measuring properties of a region of contact between the smart roller and a target surface. The smart roller comprises: an exterior annular cylinder portion, the exterior annular cylinder portion comprising an elastomeric material, the exterior annular cylinder portion having an exterior cylindrical surface; a sensor array imbedded in a volume of the exterior annular cylinder portion, the sensor array extending in an axial direction and in a circumferential direction of the exterior annular cylinder portion, the array comprising a plurality of independently sampleable sensor elements, each sensor element located for measurement at a corresponding axial and circumferential sensor location; a rigid interior portion, at least a portion of the rigid interior section disposed in a bore of the exterior annular cylinder portion, the rigid interior portion connected to the exterior annular cylinder portion for unitary rotational movement therewith; and readout electronics operably connected to the sensor array and configurable to independently sample sensor output from each of the sensor elements.

Some of the sensor elements may generate sensor output that varies with force applied to the exterior cylindrical surface in a radial direction normal to the exterior cylindrical surface at their corresponding sensor locations. Some of the sensor elements may generate sensor output that varies with force applied to the exterior cylindrical surface in at least one of axial and circumferential directions tangential to the exterior cylindrical surface at their corresponding sensor locations. Some of the sensor elements may generate sensor output that varies with proximity of the target surface to their corresponding sensor locations. Some of the sensor elements may comprise a flexible capacitive sensor for which the sensor output is a capacitance.

The sensor array may comprise an array of inner electrodes and may comprise an array of outer electrodes. The array of inner electrodes and the array of outer electrodes may at least partially overlap one another. At least some regions of the array of inner electrodes and the array of outer electrodes may be separated from one another in the radial direction by elastic dielectric material. One or both of the array of inner electrodes and the array of outer electrodes may extend around substantially a circumference of a cylindrical axis of the exterior annular cylinder portion. One or more of the inner electrodes and/or one or more of the outer electrodes may extend around substantially a circumference of a cylindrical axis of the exterior annular cylinder portion.

The readout electronics may be configured to selectively sample inner electrodes and outer electrodes corresponding to sensor elements with corresponding circumferential sensor locations within a threshold circumferential range in or around the region of contact. The readout electronics may be configured to selectively sample inner electrodes and outer electrodes corresponding to sensor elements with corresponding circumferential sensor locations within the threshold circumferential range by dynamically selecting a subset of inner electrodes and outer electrodes based on at least one of a measurement of the region of contact or an estimation of a location of the region of contact.

The readout electronics may be configured to selectively sample inner electrodes and outer electrodes corresponding to sensor elements with corresponding axial sensor locations within a corresponding threshold axial range.

Elastic dielectric material between the inner electrodes and outer electrodes may be shaped to define gaps which provide volumes into which the elastic dielectric material deforms in response to force applied to the exterior cylindrical surface. The smart roller may be designed for use in a particular application where forces applied to the exterior cylindrical surface are expected to be within a corresponding range and wherein the elastic dielectric material between the inner electrodes and outer electrodes may comprise spaced apart pillars of elastic dielectric material and wherein the gaps may be sized such that the pillars can deform into the gaps without contacting one another under forces within the expected range.

The rigid interior portion may comprise a surface defining at least a portion of a compartment. The readout electronics may be housed within the compartment.

A shaft housing may be rigidly connectable to or defined by the rigid inner portion to enable a rotary connection to an external shaft.

The sensor array may span a circumference around cylindrical axis of the exterior annular cylinder portion and an axial dimension of the exterior annular cylinder portion to thereby provide a spatial pressure sensor that spans over the exterior cylindrical surface of the exterior annular cylinder portion. The pressure sensor may have a spatial resolution corresponding to a size of the sensor elements.

Another aspect of the invention provides a method for sampling the sensor array of a smart roller. The method comprises: determining or estimating the region of contact; and controlling the readout electronics to selectively sample sensor elements with corresponding circumferential sensor locations within a threshold circumferential range in or around the determined or estimated region of contact.

Controlling the readout electronics to selectively sample sensor elements with corresponding circumferential sensor locations within the threshold circumferential range may comprise controlling the readout electronics to refrain from sampling sensor elements with corresponding circumferential sensor locations outside of the threshold circumferential range.

The threshold circumferential range may span a circumferential range that is larger than that of the determined or estimated region of contact. The threshold circumferential range may span a circumferential range that is equal to that of the determined or estimated region of contact.

Determining or estimating the region of contact may comprise estimating the region of contact based on output from one or more sensors (e.g. an encoder connected to detect rotation of the roller about its axis).

The method may comprise repeating the following steps a plurality of times in each rotation of the roller: determining or estimating the region of contact; and controlling the readout electronics to selectively sample sensor elements with corresponding circumferential sensor locations within a threshold circumferential range in or around the determined or estimated region of contact.

In some embodiments, methods may involve controlling the readout electronics to selectively sample sensor elements with axial sensor locations within a corresponding threshold axial range.

Another aspect of the invention provides a method of automatically calibrating a smart roller. The method comprises: positioning the smart roller in a known position relative to a calibration surface; rolling the smart roller over and in contact with the calibration surface to produce a measured sensor readout; and recalibrating the smart roller on the basis of an expected sensor readout and the measured sensor readout; wherein the calibration surface comprises one or more calibration protrusions of known dimensions and shaped to provide for the measurement of the expected sensor readout.

The method may also comprise rolling the smart roller over the calibration surface one or more additional times to thereby generate one or more additional measured sensor readouts; and recalibrating the smart roller on the basis of the expected sensor readout, the measured sensor readout and the one or more additional measured sensor readouts.

The calibration protrusions of the calibration surface comprise a known sequence of protrusions at least two of which are aligned with one another in an axial dimension of the roller as the roller rolls over the calibration surface and at least two of which are aligned with one another in a circumferential dimension of the roller as the roller rolls over the calibration surface.

Another aspect of the invention provides a method of estimating tack of prepreg tow deposited by a smart roller.

The method comprises rolling the smart roller relative to the prepreg tow under a compaction pressure; measuring local pressure histories at one or more of the sensor elements, each local pressure history corresponding to a section of prepreg tow compacted by the smart roller; and determining, based at least in part on the measured local pressure histories, an estimated prepreg tack of the corresponding sections of prepreg tow.

Another aspect of the invention provides a smart roller for measuring properties of a region of contact between the smart roller and a rolled surface. The smart roller comprises: an exterior annular cylinder portion, the exterior annular cylinder portion comprising an elastomeric material; a sensor array distributed in one or more of a circumferential and an axial dimension of the exterior annular cylinder portion; a rigid interior portion, at least a portion of the rigid interior section disposed in a bore of the exterior annular cylinder portion, the rigid inner portion having an interior surface defining a compartment, the rigid interior portion connected to the exterior annular cylinder portion to cause the rigid interior portion to move unitarily with the exterior annular cylinder portion; readout electronics secured within the compartment, the readout electronics operably connected to the sensor array; and a shaft housing connected to the rigid inner portion to cause the smart roller apparatus to rotate about an axis of rotation in response to rotational forces about a shaft; wherein the sensor array is configured to measure at least one of a normal force and a shear force at the region of contact and provide measured data to the readout electronics. The smart roller comprises capacitive sensors.

Capacitive sensors of any sensor arrays may measure changes in mutual capacitance between inner electrodes and outer electrodes embedded in the exterior annular cylinder portion. Capacitive sensors of any sensor arrays may measure forces oriented in a radial dimension of the exterior annular section. The capacitive sensors may measure shear forces. Capacitive sensors of any sensor arrays may measure proximity of adjacent objects.

Data obtained from any sensor arrays may be used to monitor a manufacturing process. Data may be used in a simulation process. Data may be used to adjust parameters of the manufacturing process. Data obtained may be used to affect yield, safety, throughput, quality and other process variables, control and outcome. Data obtained may be used to identify properties of a product being manufactured. Data may be used to detect underlying geometry of a rolled surface. Data obtained may be used to detect process-induced defects.

Smart rollers may be applied to additive manufacturing. Smart rollers may be applied as a compaction roller for automated fibre placement. Any sensor arrays may measure the tack of a prepreg tow prior to the prepreg tow contacting a region of contact. Smart rollers may be applied to painting. The smart roller may be applied to conveyors. Smart rollers may be applied to printers. Smart rollers may be applied to roll-to-roll manufacturing. Smart rollers may be applied to tires and wheels. Smart rollers may be applied to measure wear. Smart rollers may be applied as a compaction roller for manual hand layup of composites. The data obtained may be used for training skilled personnel including hand-layup technicians. Compliance may be tuned to match the needs of the process. Simulation may be used to guide the tuning.

Another aspect provides a smart roller system wherein multiple smart rollers are applied in parallel to a common target surface The multiple smart rollers are connectable to one or more rotatable shafts to permit individual smart rollers to rotate on the one or more shafts relative to one another. In some embodiments, the one or more shafts comprise a plurality of shafts or shaft segments capable of translational movement relative to one another (e.g. in any one or more of three translational degrees of freedom) and/or in capable of rotational movement relative to one another (e.g. in any one or more of three rotational degrees of freedom). Such movement of shafts or shaft segments may permit the multiple smart rollers to conform to a target surface.

Another aspect of the invention provides a smart roller comprising an actuator array embedded in the exterior annular cylinder portion. The actuator array comprises a plurality of dielectric elastomer actuators. The plurality of dielectric elastomer may be are individually actuatable to produce radially aligned deformation of elastomer in the exterior annular cylinder portion. The plurality of dielectric elastomer actuators may be individually actuatable to produce deformation of elastomer aligned tangential to a surface of the exterior annular cylinder portion.

Cylinders with elastomer coatings may also be used in conveyor belts and car tires, among may other applications. These are other areas where having a soft smart roller imbedded into the outer elastomeric annular volume has benefits, including monitoring weight of parts being transported or loads on tires, counting parts, identifying regions of wear, providing alerts of jamming or misdirection and more. In conveyor rollers, a soft smart roller permits identifying, counting and weighing multiple parts across the length of an individual roller and/or the like.

The smart roller may be able to measure normal and/or shear forces at the region of contact. It may also be adapted to measure the proximity to, and dielectric constant of, an adjacent tools and workpieces. It may also be rapidly calibrated, such as by the application of the smart roller to a known patterned surface under known conditions. A smart roller may also permit measurement of the tackiness of input materials, such as a prepreg tow in an AFP process. Measurement of the tackiness of an input prepreg tow may permit adjustment of nip conditions during deposition.

A physics-based system design approach may be used to design dimensions, determine outer layer material properties, and design pillar structure dimensions and spacing, to quantitatively tune and match the mechanical performance of the smart roller to the specifications of any roller for industrial processes. Physics-based simulations may be implemented to optimize the sensor pillar structure dimensions and spacing to ensure independent deformation of individual pillars without interference from adjacent pillars while the influence on mechanical performance is maintained at a minimum. Furthermore, an automated calibration procedure may allow for quantitative characterization of individual taxel responses, taking into account variations in taxel manufacture.

One aspect of the invention provides a smart roller apparatus comprising an exterior annular portion, the exterior annular portion comprising a flexible material; a rigid interior portion, the rigid interior portion comprising an interior surface defining a hollow compartment; an array of taxels distributed axially and/or circumferentially around the exterior annular section; processor electronics disposed within the hollow compartment and operably connected to the array of taxels; and, optionally, a shaft housing connected to the rigid interior annular portion to transmit forces from a shaft.

Another aspect of the invention provides a smart roller apparatus for measuring properties of a region of contact between the smart roller apparatus and a rolled surface, the smart roller apparatus comprising: an exterior annular portion, the exterior annular portion comprising an elastic material; an array of sensors distributed through circumferential and axial aspects of the exterior annular section; a rigid interior portion, at least a portion of the rigid interior section disposed radially internal to the exterior annular portion, the rigid interior portion having an interior surface defining a hollow compartment; readout electronics secured within the hollow compartment, the readout electronics operably connected to the array of sensors; and, optionally, a shaft housing connected to the rigid inner annular section to transmit forces from a shaft; wherein the array of sensors are configured to measure at least one of a normal force and a shear force at the region of contact and transmit measured data to the readout electronics.

It is emphasized that the invention relates to all combinations of the above features, even if these are recited in different claims.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1:
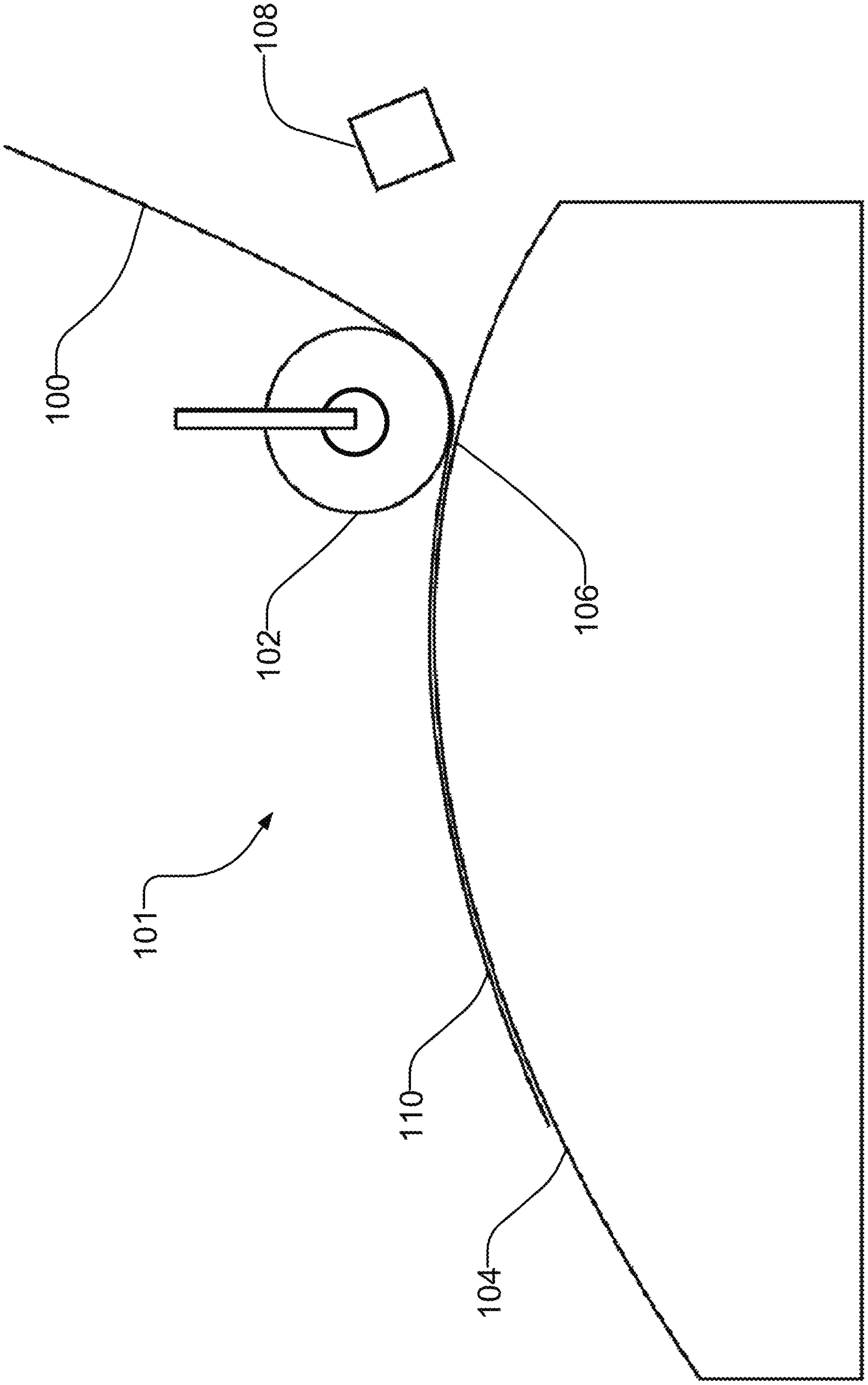
FIG. 1 depicts a side-view of a prior art automated fiber placement (AFP) process using a conventional compaction roller apparatus.

Automatic Fibre Placement (AFP) machines are widely used in the aerospace industry and other industries to manufacture high-quality and complex composite parts. FIG. 1 schematically depicts a partial view of a prior art AFP system 101, wherein an AFP machine (not shown) automatically dispenses carbon-fibre pre-impregnated (prepreg) tows 100 under controlled pressure, temperature, and speed. During AFP processing, a compaction roller 102 is used to place narrow strips of unidirectional pre-impregnated carbon fibre tows 100 onto the substrate 104. Local processing conditions, including, for example, pressure and temperature, under the roller and at the processing zone 106 (also known as the process nip point) are important for obtaining defect-free layups acceptable within aerospace standards. It should be understood that the term process "nip point" refers to a region of contact, rather than necessarily a single point or line of contact. Specifically, the process "nip point" is the region of contact between the roller, the carbon-fibre prepreg tow (or other intervening material (if present)), and the substrate underlying the tow. A heating element 108 may be used to raise the temperature of the substrate 104 and carbon-fibre pre-impregnated tows 100 to improve the layup.

The pressure applied (by roller 102) to deposited prepreg tow 100 is a significant factor in providing the degree of intimate contact between tow 100 and substrate 104 desirable to achieve optimal adhesion (i.e., tack) between tow 100 and substrate 104. Prepreg tack is a primary mechanism that resists the formation of defects in composite layups, and prepeg tack depends strongly on the pressure history applied by roller 102 to tows 100. Knowledge of the local pressure distribution and history (between roller 102 and tows 100) during tow deposition can assist in characterizing and developing the processing window for a specific material system and layup geometry.

A smart roller technology is disclosed that may be applied to AFP processing and/or to other systems or processes involving generally cylindrical rollers. In some generalized applications of a smart roller, the smart roller applies pressure to and is rolled across a target surface. For example, in a painting application, the smart roller applies paint while being rolled across a target surface which comprises the surface to be painted. In AFP applications, the target surface comprises the carbon fiber prepreg tow 100 and the substrate 104. In an embodiment of the smart roller, flexible capacitive pressure sensing technology is employed to measure real-time local force (e.g. radially oriented compaction pressure and/or circumferentially oriented shear force) at any of a plurality of individually sampleable locations on an outer cylindrical surface of the roller. Such measured data may then be transmitted wirelessly to a control unit, enabling real-time feedback within the process. For optimum process performance, real-time feedback is highly desirable, rather than relying, for example, on ex-situ inspections for detecting flaws after manufacturing. Embodiments of the smart roller may be used in AFP processes for laying down carbon fibre prepreg tows to ensure path conformance and adhesion across the surface of a complex shape. Real-time force (e.g. radially oriented compaction pressure and/or circumferentially oriented shear force) measurements at the nip point of the AFP process may be provided using capacitive sensing technology.

In some embodiments, smart rollers comprise arrays of soft sensors which provide a soft, skin-like interface while also measuring force and/or displacement. Such soft sensors may typically employ piezoresistive or capacitive mechanisms. Although piezoresistive sensors can have higher theoretical sensitivities, they tend to respond to high strain with nonlinearity and high hysteresis. In comparison, capacitive sensors tend to be more flexible, more stable under high strain, and consume less power.

Figure 2:
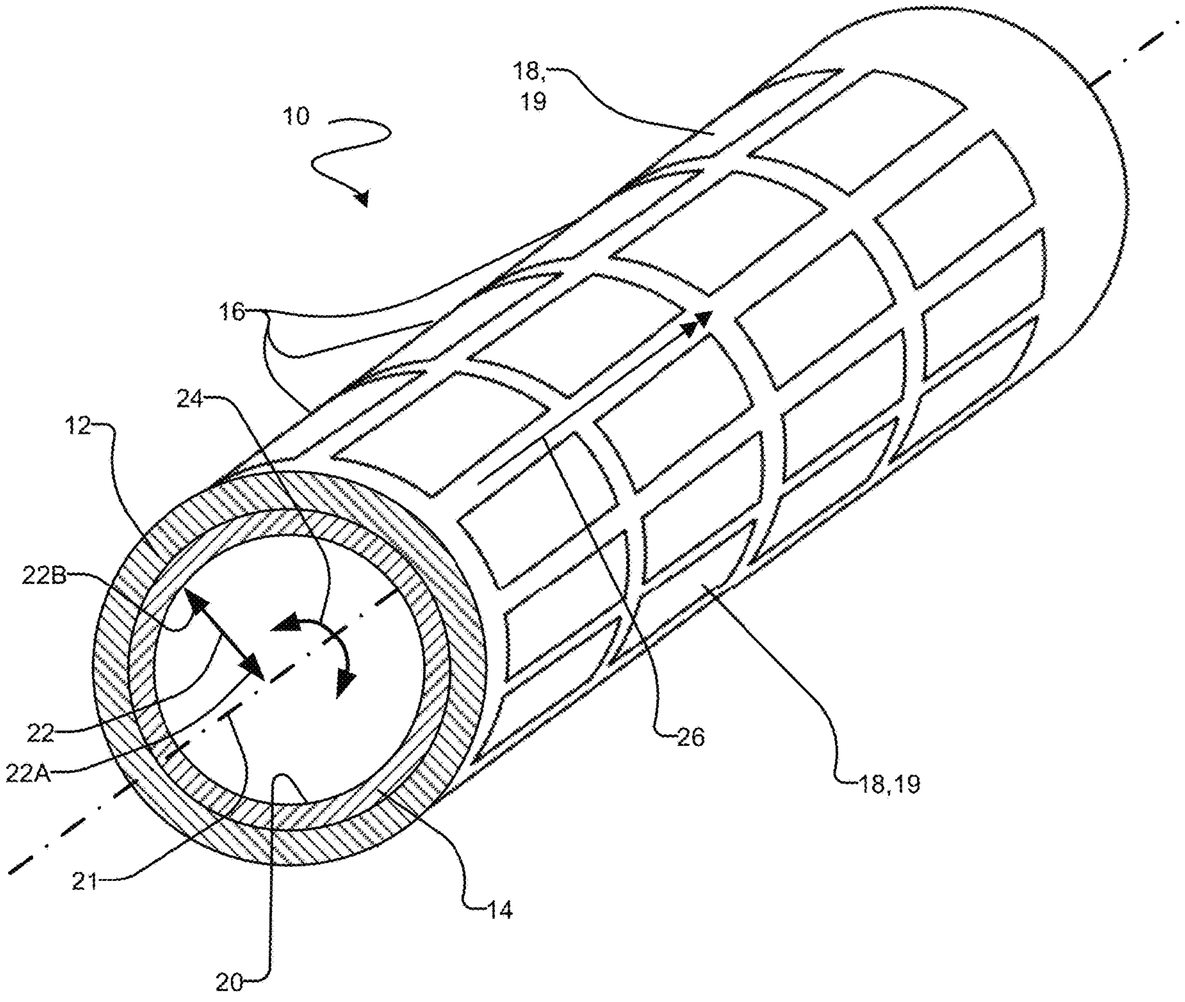
FIG. 2 depicts a perspective view of a smart roller apparatus according to an embodiment.

FIG. 2 illustrates an exemplary embodiment of a smart roller apparatus 10. Smart roller 10 has a generally cylindrical shape with a cylinder axis 21 and is typically configured (e.g. by suitable mounting) for rotational motion about axis 21. This disclosure uses a number of directional conventions to describe various embodiments. Directions parallel to axis 21 (e.g. as shown in FIG. 2 by shown by double-headed arrow 26) may be referred to as axial directions; directions orthogonal to axis 21 and oriented toward axis 21 or away from axis 21 (e.g. as shown in FIG. 2 by double-headed arrow 22) may be referred to as radial directions (with the radially inward direction 22A being toward axis 21 and the radially outward direction 22B being away from axis 21); and directions orthogonal to both axis 21 and radial directions 22 and oriented in circle about axis 21 (e.g. as shown in FIG. 2 by double-headed arrow 24) may be referred to herein as circumferential directions.

Roller 10 has a substantially cylindrical body defined, in the FIG. 2 embodiment, by an exterior annular cylinder portion 12 and a rigid interior portion 14. Exterior annular cylinder portion 12 comprises an elastic material. Suitable elastic materials may include elastomers such as silicone rubbers. Other additional or alternative suitable elastic materials may include, but are not limited to polyurethanes, styrene-butadiene rubbers, polychloroprene, natural or synthetic polyisoprene, polybutadiene, nitrile rubber, foams, aerogels, patterned thermoplastics, and/or the like. An exemplary silicone rubber used in an embodiment is the 20 A durometer material, Dragon Skin™ series (available from Smooth-On, Inc.). Rigid interior portion 14 generally comprises a material with greater rigidity than that of exterior annular cylinder portion 12.

A portion of the elastomer material present in exterior annular cylinder portion 12 may serve as a dielectric material for capacitive sensors 18 in a sensor array 16, described in greater detail below. In any given application or embodiment, the elastomeric materials used in exterior annular cylinder portion 12 may be selected to suit the application. Elastomers forming the dielectric material in capacitive sensors 18 should provide a combination of elasticity and dielectric constant suitable for expected pressures of a particular application and desired sensitivity. In AFP applications, normal stresses applied to roller 10 may fall in the 0.5 to 2 MPa range. The 20 A durometer Dragon Skin™ material has an elastic modulus in the range of 0.1 to 2 MPa, permitting significant displacements within this range of typical stresses applied during AFP processes. These displacements may in turn be sufficient to cause corresponding changes in capacitance in response to the applied stresses, and hence provide suitable sensitivity. In some embodiments, the elastic modulus of the elastomer material present in exterior annular cylinder portion 12 may be chosen to create a significant strain that is readily measured using capacitive sensors 18 (described in more detail). In some embodiments, the elastic modulus of the elastomer material present in exterior annular cylinder portion 12 and the structure of this elastomer material may be selected and configured, respectively, to create a change in capacitance of 10% or more at peak expected compression or shear forces. Higher strains may lead to mechanical creep (i.e. where structures deform and gradually, over time do not return perfectly to their undeformed state) which can in turn lead to capacitive changes and/or a non-linear response in the change in capacitance, while lower strains can be difficult to detect.

Exterior annular cylinder portion 12 comprises an array 16 of sensor elements 18. In various embodiments, each sensor element 18 comprises an individually sampleable capacitive sensor. Sensor array 16 may be imbedded in a volume of elastomer material of exterior annular cylinder portion 12. In some embodiments, sensor array 16 may comprise other additional or alternative sensors elements, such as, for example, piezoelectric sensors, piezoresistive sensors, pneumatic sensors, hydraulic sensors, piezoionic sensors and/or the like.

Figure 3:
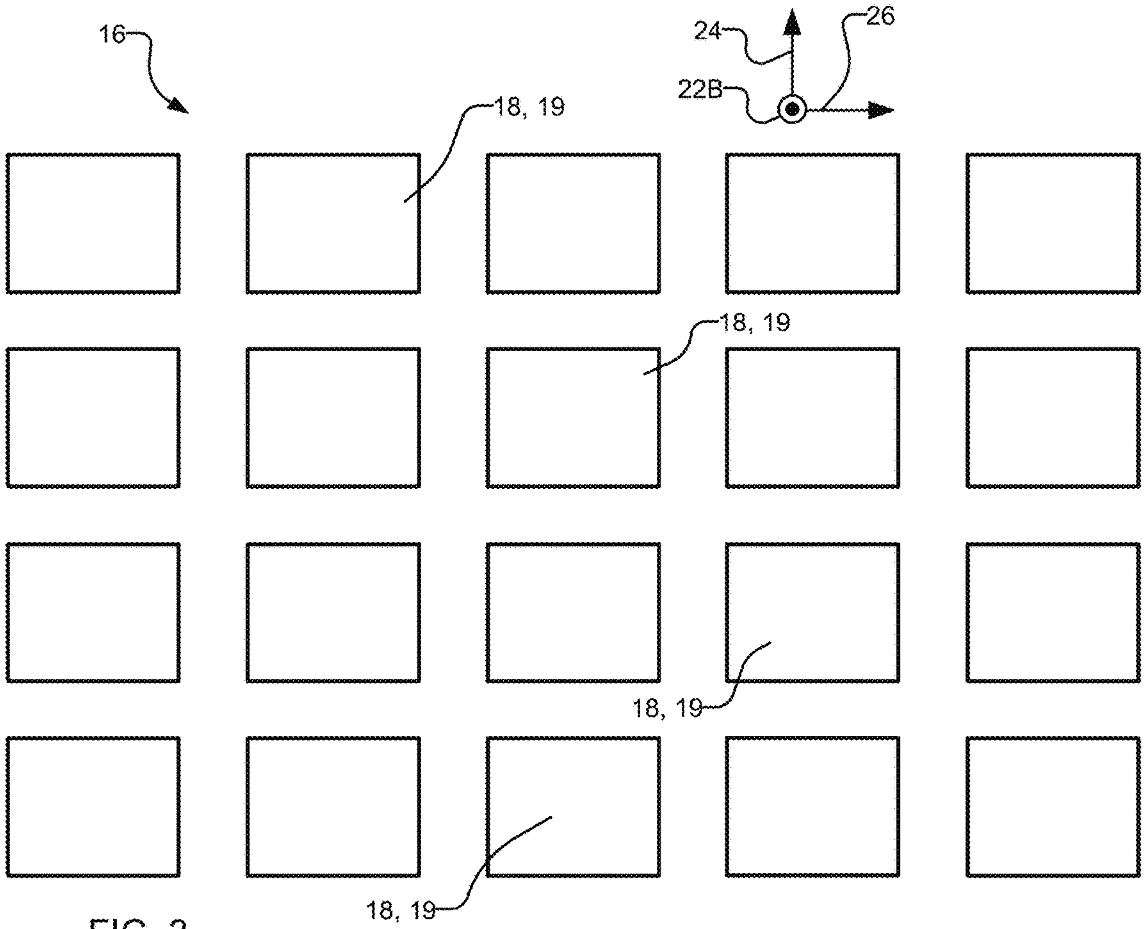
FIG. 3 depicts a schematic flattened, radially inward plan view of a portion of the capacitive sensor array according to the embodiment of FIG. 2 transformed onto a flat plane.
Figure 4:
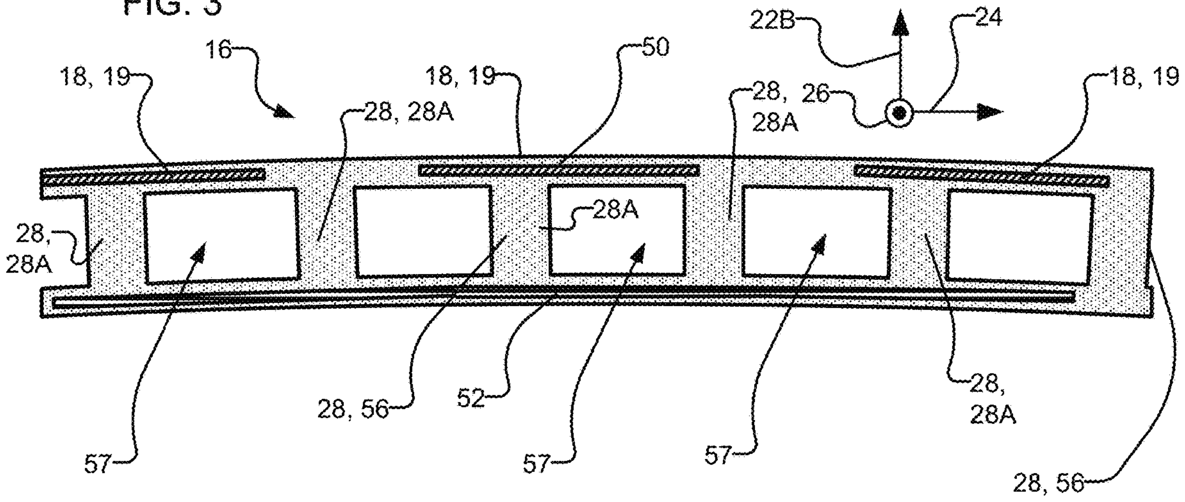
FIG. 4 depicts an axial cross-sectional view of a portion of the FIG. 3 capacitive sensor array taken along a plane that extends in the radial and circumferential directions.

FIGS. 3 and 4 schematically depict partial views of sensor array 16 according to a particular embodiment. FIG. 3 illustrates an exemplary portion of sensor array 16 comprising sensor elements 18 in a "flattened" view or transformed onto a flat plane (where, in the FIG. 3 view, the radially inward 22A direction is into the page, the radially outward direction 22B is out of the page, circumferential direction 24 is linearized as is shown as being vertical on the page and axial direction 26 is shown as being horizontal on the page). For convenience, similar or analogous "flattened" views are used in other drawings of this disclosure. FIG. 4 depicts a cross-sectional view of a portion of sensor array 16 imbedded in a volume of elastic dielectric material 56 taken along a plane that extends in the radial and circumferential directions 22, 24.

As can be seen from FIGS. 3 and 4, each capacitive sensor 18 comprises an outer electrode 50, an inner electrode 52 and an elastic dielectric material 56. In the illustrated embodiment (as shown best in FIG. 4), elastic dielectric material 56 may be shaped to provide a plurality of spaced apart pillars 28 (e.g. axially and circumferentially spaced apart pillars 28) that extend radially between extending at least a portion of the distance between electrodes 50, 52. In currently preferred embodiments including that illustrated in FIG. 4, elastic dielectric pillars 28 (or at least the radial dimension mid-sections 28A thereof) are axially and circumferentially spaced apart by gaps 57. Since elastomers have low compressibility, providing spaced apart pillars 28 and gaps 57 provides space (gaps 57) for elastic dielectric material 56 to expand axially and circumferentially during radial compression, which may allow pillars 57 to be fabricated from softer materials and in turn help to increase capacitive sensitivity of sensors 18.

Sensor elements 18 shown in FIGS. 2-4 provide one particular exemplary and non-limiting shape for sensor elements 18 and their components (e.g. outer electrodes 50, inner electrode 52, and pillars 28 and gaps 57 in dielectric material 56). Other shapes and/or configurations of sensor elements 18 and/or their components are possible. While the shapes of sensor elements 18 and/or their components may vary in different embodiments, each sensor element 18 comprises a combination of an outer electrode 50, inner electrode 52 and intervening dielectric material 56, which may comprise spaced apart pillars 28 of dielectric material 56. Sensor array 16 may also have different layouts (e.g. arrays spacing or patterns). As explained in more detail elsewhere herein, each sensor element 18 is independently sampleable (e.g. by suitable sampling circuitry connected to electrodes 50, 52) at a corresponding discrete 2D sensor location 19 (also referred to herein as a taxel 19). Sensor array 16 may provide an array of individually sampleable taxels 19 on the circumferentially and axially extending, radially outward facing surface of roller 12.

In each capacitive sensor element 18 or taxel 19, dielectric 56 may be provided by the elastic material of exterior annular portion 12. Such elastic material may be selected, shaped (e.g. into axially and circumferentially spaced apart pillars 28) and/or otherwise configured to provide a suitable elastic response for the range of forces expected to be experienced when roller 10 is used and to provide a suitable dielectric constant for capacitive sensor elements 18. The selection of material for the combined properties of elasticity and dielectric constant may vary between applications. For example, it is expected that the desired elasticity and dielectric properties of the elastic material of exterior annular portion 12 may be different for a smart roller used in an AFP process than for a smart paint roller or a smart tire.

In some embodiments, exterior annular cylindrical portion 12 may comprise multiple elastomeric materials and/or layers. For example, exterior annular cylindrical portion 12 may comprise a first dielectric elastomer which forms the material for pillars 28 and a second elastomer which may provide a protective layer exterior to (i.e. radially outward from) sensor array 16. The multiple elastomeric materials and/or layers may be bonded to one another, although this is not necessary.

FIG. 4 illustrates how pillars 28 of dielectric material 56 can separate arrays of outer electrodes 50 and inner electrodes 52. Elastic dielectric 56 forms a spring-like element when deformed under pressure. Elastic dielectric material 56 may be chosen and the geometry, dimensions and distribution (e.g. axial and circumferential spacing) of pillars 28 and/or gaps 57 may be designed to provide a desired balance between stiffness and sensitivity. An increase in stiffness will cause a reduction in sensitivity (e.g. because of less deformation and corresponding less capacitive change in response to force applied to a taxel 19), while a reduction in stiffness can result in larger deformations for a given force (higher sensitivity), but also earlier saturation of the response (reduced measurement range), as the pillar structure becomes flattened, which in then leads to greatly increased stiffness, viscoelastic and nonlinear responses.

Figure 7:
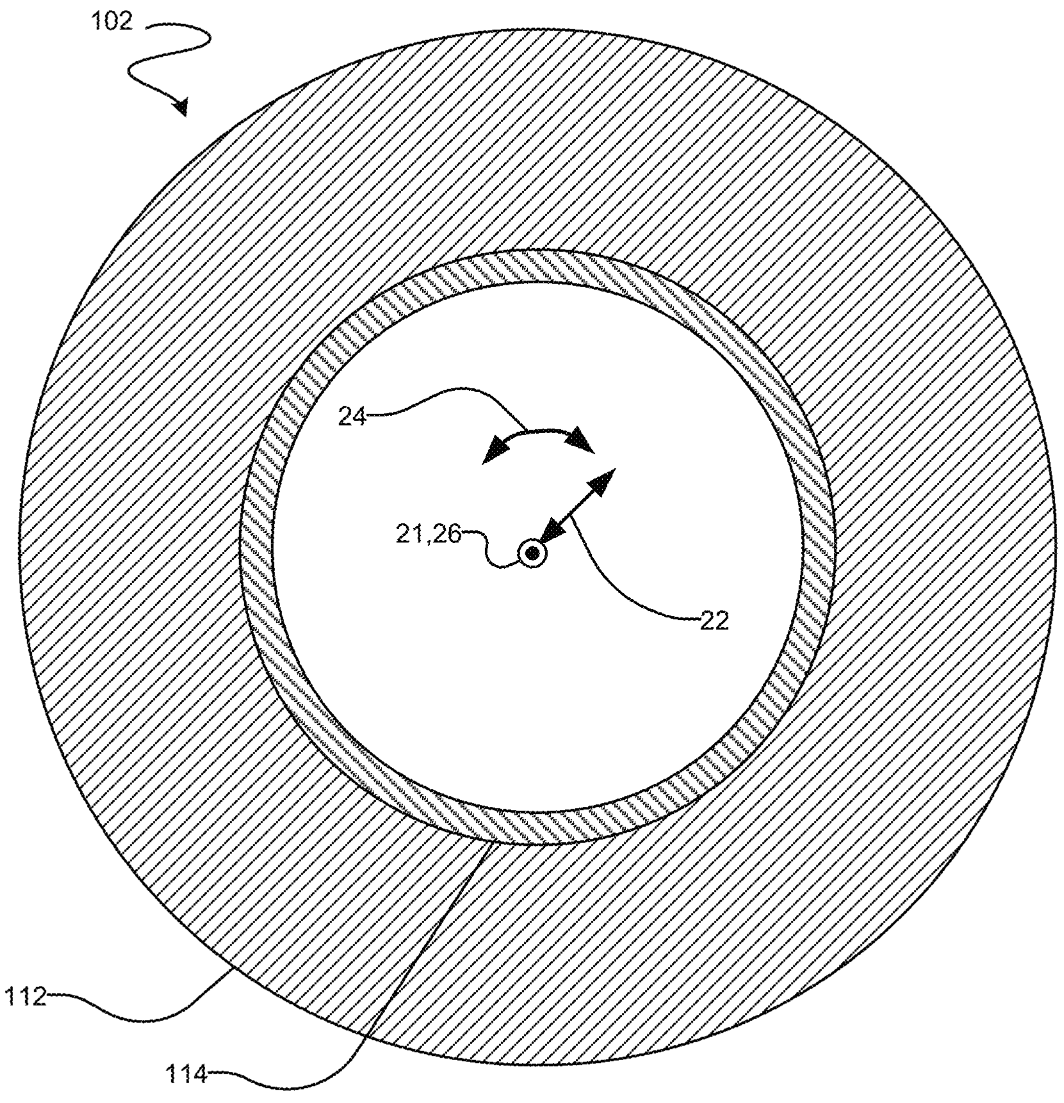
PRIOR ART FIG. 7
FIG. 7 depicts an axial cross-sectional view of a prior art compaction roller taken along a plane that extends in the radial and circumferential directions.
Figure 8:
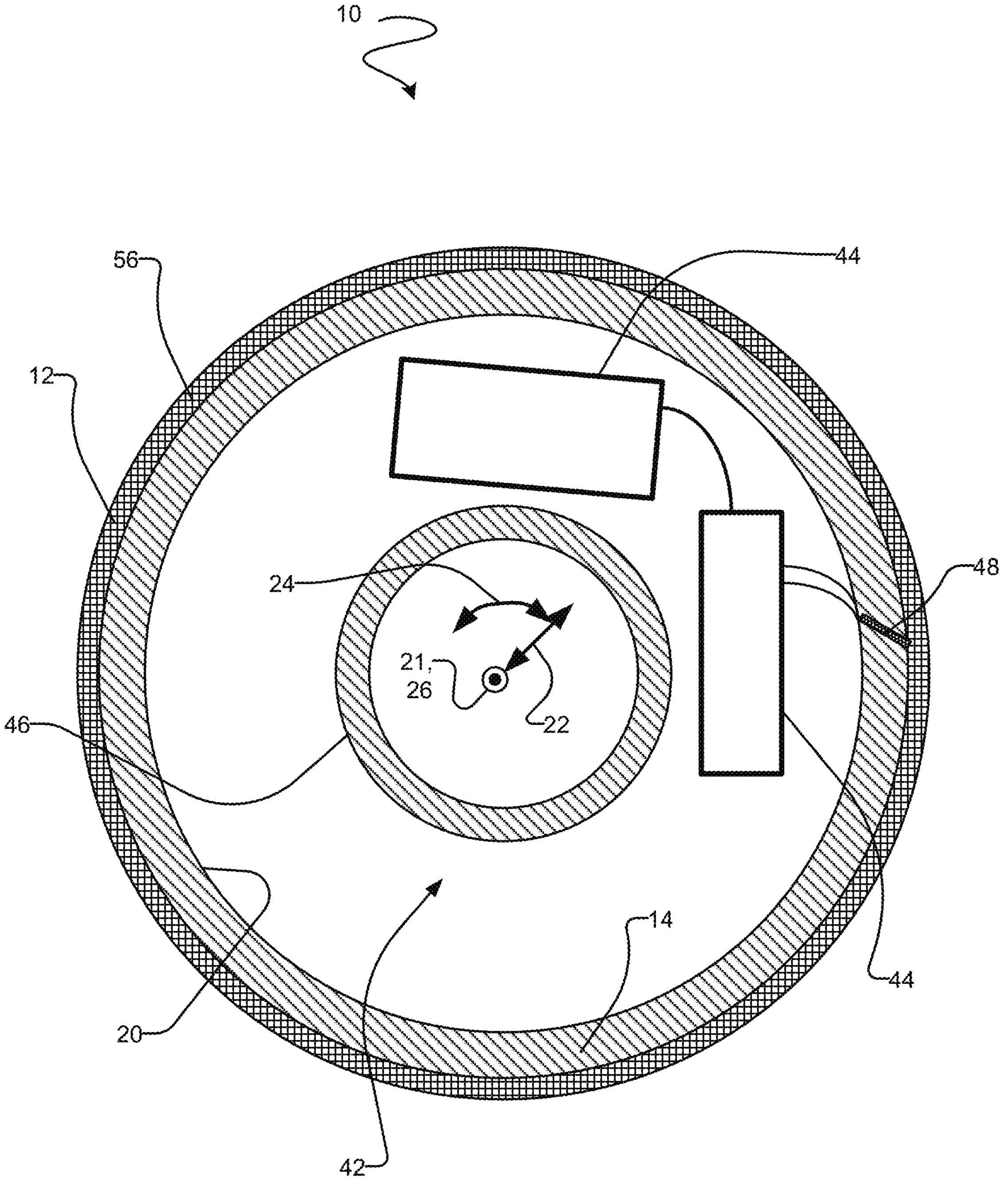
FIG. 8 depicts an axial cross-sectional view of a smart roller according to an embodiment taken along a plane that extends in the radial and circumferential directions.

Dragon Skin™ (having a durometer of shore 20 A and being a currently preferred elastic dielectric material for use as dielectric 56 (which forms pillars 18) and as the material of exterior annular portion 12 for some embodiments of roller 10) is a softer material than the shore 60 A elastomer used in many prior art AFP rollers. Smart roller 10 may be designed to accommodate this relatively soft material in exterior annular portion 12 by shaping the radial dimension of exterior annular portion 12 to be relatively thin (compared to the relatively thick radial dimension of the exterior annular portion of priori art AFP rollers which use relatively high durometer elastomer). This radial dimension difference is illustrated, for example, in FIGS. 7 and 8 where FIG. 7 shows a prior art AFP compaction roller 102 and FIG. 8 shows a smart roller 10 according to a particular embodiment. It can be seen, by comparing FIGS. 7 and 8, that prior art AFP compaction roller 102 comprises an exterior annular cylindrical portion 112 that is relatively thick (in radial its dimension) compared to exterior annular cylindrical portion 12 of the FIG. 8 smart roller 10.

Figure 9:
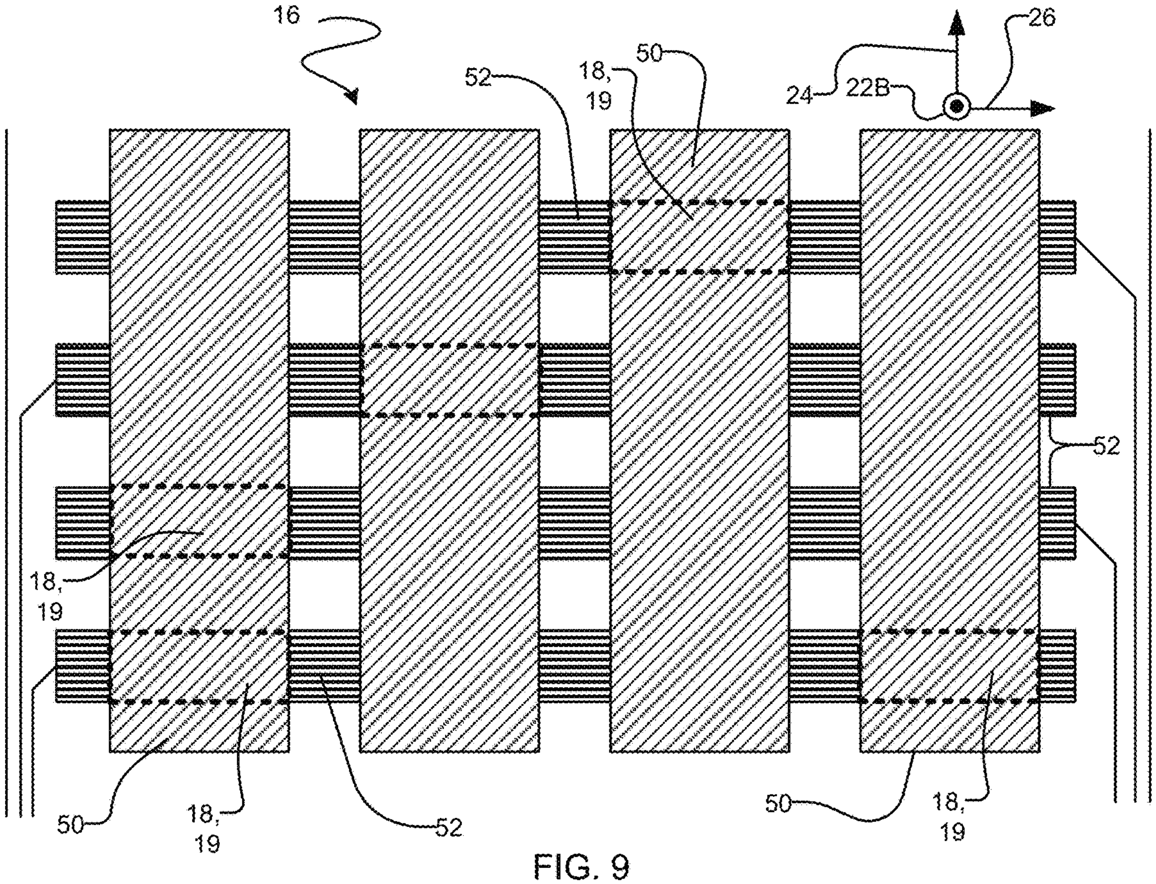
FIG. 9 depicts an illustrative flattened, radially inward view of a portion of a capacitive sensor array transformed onto a flat plane and with elastic dielectric material omitted for clarity in which sensor elements use mutual capacitance between orthogonal outer and inner electrodes.
Figure 10:
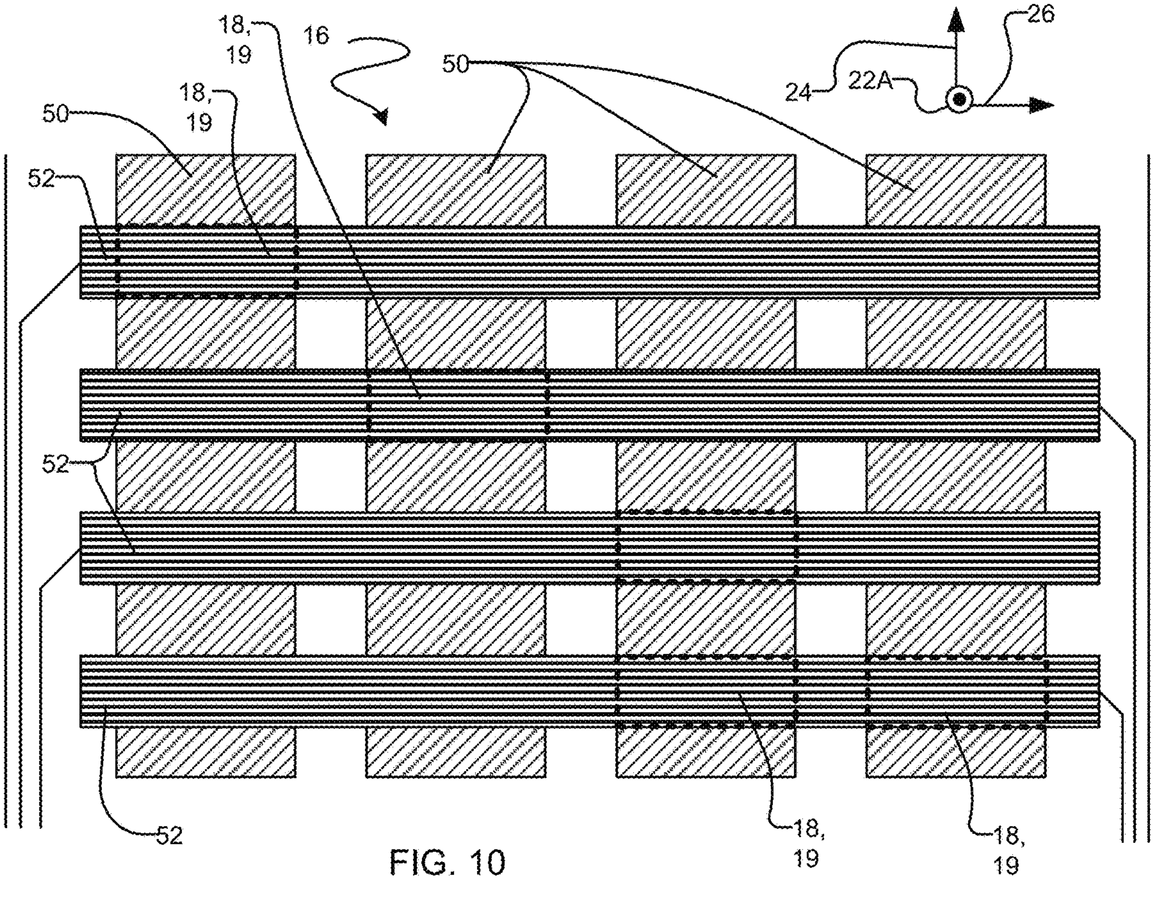
FIG. 10 depicts a schematic flattened, radially outward view of the FIG. 9 portion of the capacitive sensor array with elastic dielectric material omitted for clarity.
Figure 14A:
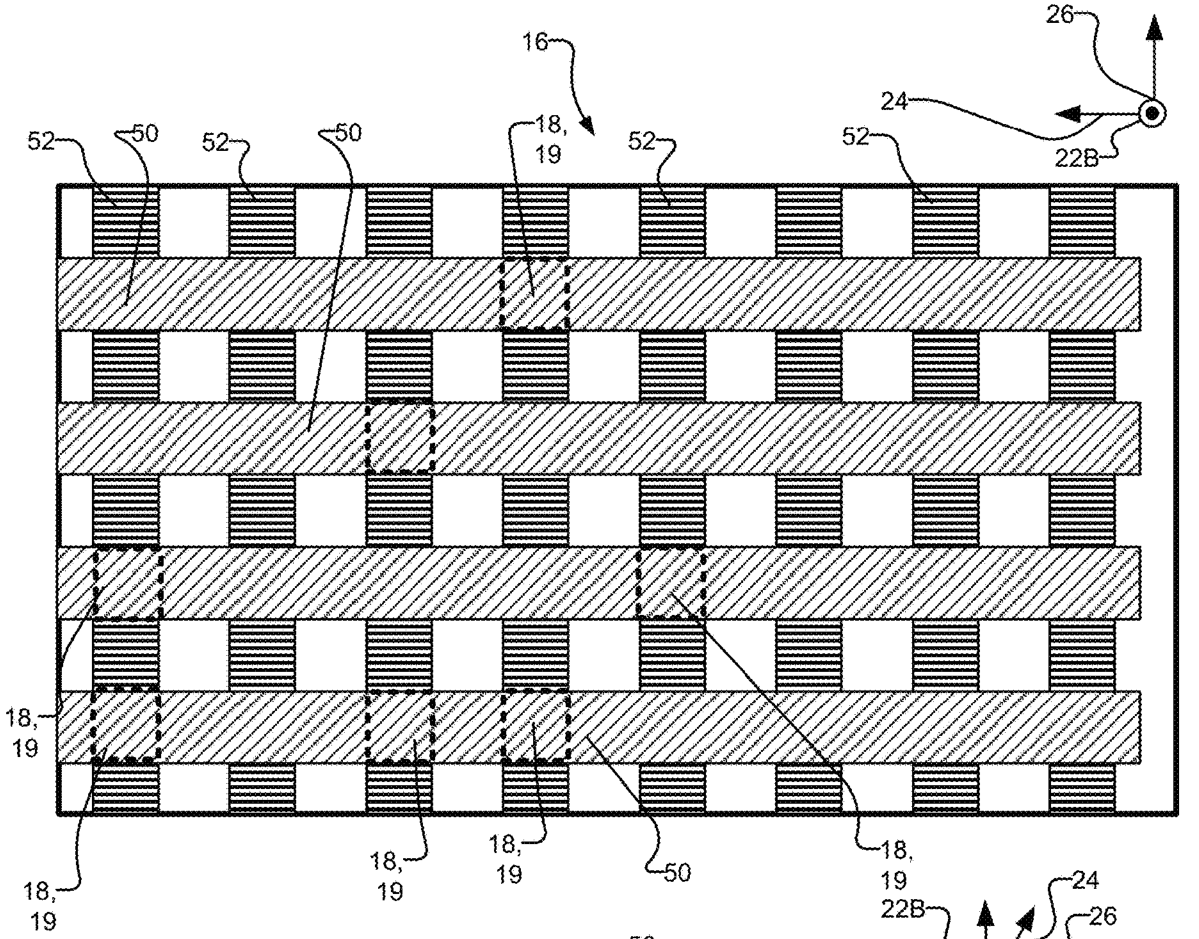
FIG. 14A depicts a schematic flattened, radially inward view of a portion of an array of sensors according to the embodiment illustrated in FIGS. 9 and 10 transformed onto a flat plane, and with elastic dielectric material omitted for clarity illustrating a taxel as a region of overlap of the inner and outer electrodes.

FIGS. 4, 9, 10, 14A and 14B show various features of the construction of sensor arrays 16 and sensor elements 18 (or taxels 19) according to particular embodiments. As discussed elsewhere herein, sensor arrays 16 comprise sensor elements 18 (or taxels 19) that are independently sampleable by suitable connection of sampling circuits to outer and inner electrodes 50, 52. In FIGS. 9, 10 and 14A a number of sensor elements 18 (taxels 19) are shown in bold dotted lines. In the embodiments, of FIGS. 9, 10 and 14A, each sensor element 18 may be sampled by electrical connection to a corresponding pair of outer and inner electrodes 50, 52—i.e. to one outer electrode 50 and one inner electrode 52. It will be appreciated that the electrodes 50, 52 of each pair of one outer electrode 50 and one inner electrode 52 overlap one another (in the radial direction) at the location of a sensor element 18 (taxel 19). In such embodiments, a single outer electrode 50 may be the outer electrode 50 for multiple sensor elements 18 in association with plurality of inner electrodes 52. Similarly, a single inner electrode 52 may be the inner electrode 52 for multiple sensor elements 18 in association with a plurality of outer electrodes 50. In such embodiments, each sensor element 18 (taxel 19) may be defined in a region of radial direction overlap between a given outer electrode 50 and a given inner electrode 52.

As also discussed elsewhere herein, intervening dielectric material 56 (which is visible in FIGS. 4 and 14B, but has been removed from FIGS. 9, 10 and 14A to show more detail about electrodes 50, 52) may be formed to comprise axially and circumferentially spaced apart pillars 28 of dielectric material 56 which may extend at least a portion of the way between outer electrodes 50 and inner electrodes 52. Pillars 28 may be axially and circumferentially spaced apart at least at their radial-dimension mid-sections 28A (see FIG. 4) by gaps 57. The spacing of pillars 28 (i.e. gaps 57) ensures that there is room for the deformation of the dielectric material 56 (pillars 28) at each taxel 19 in response to pressure applied directly on the taxel 19, without interacting with (or by interacting only in a minimal way with) pillars 28 corresponding to adjacent taxels 19. This allows each taxel 19 to be sensitive to pressure applied directly thereto, without being influenced by (or being only influenced in a minimal way by) the pressure on adjacent taxels 19. Providing spaced apart pillars 28 may also increase the sensitivity of taxel capacitance to local pressure at the taxel 19 (relative to a dielectric layer 56 without pillars 28/gaps 57). In some embodiments the pillar structure is designed with enough axial and circumferential clearance between pillars 28 (i.e. gaps 57 are sized) to ensure that each pillar 28 can deform independently of other pillars 28 up to 50% strain.

Figure 5:
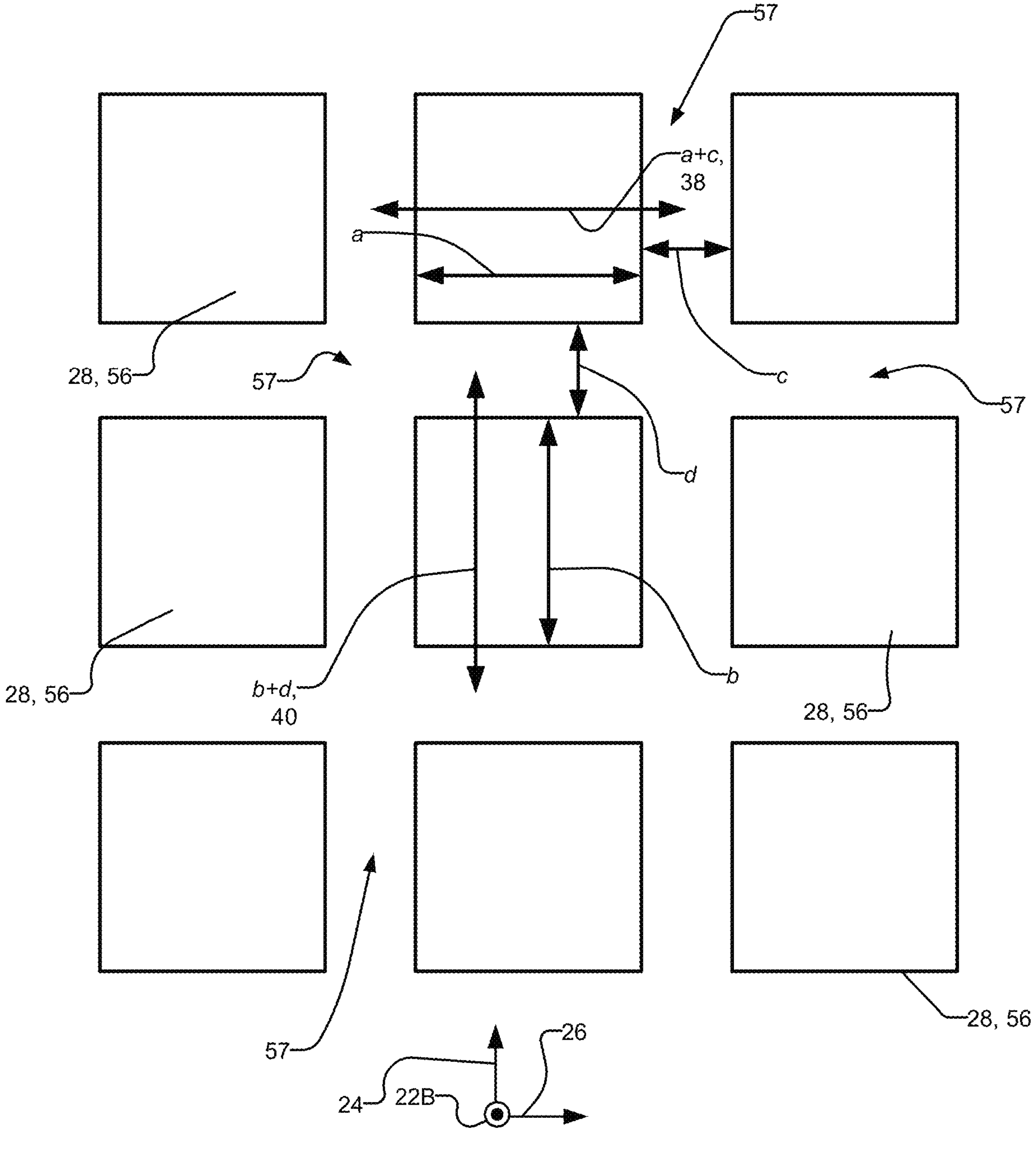
FIG. 5 depicts a schematic flattened, radially inward cross-sectional view (taken along a cross-sectional plane that extends in the axial and circumferential directions) showing the pillars of a portion of the FIG. 3 capacitive sensor array showing spatial dimensions of and between dielectric pillars.

The spaced apart pillars 28 of roller 10 provide roller 10 with non-uniform mechanical pressure distribution, as roller 10 exerts greater pressure in the radial direction 22 at the axial and circumferential locations of pillars 28 than in the axial and circumferential locations of gaps 57 (see FIG. 5, for example). The magnitude of this non-uniformity can be reduced by reducing the axial and/or circumferential spacing between pillars 28; however, the desire that pillars 28 deform independently of (without contact with) other pillars 28 may provide a lower bound on the desired minimum spacing between pillars 28 (i.e. a lower bound on the size of gaps 57).

Referring to FIG. 5 and assuming that elastic dielectric material 56 is approximately incompressible, the minimum spacing between pillars 28 that would allow for independent deformation of each pillar 28 without interference from adjacent pillars can be approximated by:

$$c = a\left(\sqrt{\frac{1}{\beta}} - 1\right) \tag{1}$$

$$d = b\left(\sqrt{\frac{1}{\beta}} - 1\right) \tag{2}$$

where: a and b are the axial and circumferential dimensions, respectively, of pillars 28; c and d are the axial and circumferential dimensions, respectively, of the clearance (gaps 57) between pillars 28; and β is the compression factor (selected to be β=50% for modelling purposes). In this model, compression factor (β) describes the ratio between the deformed radial dimension of a pillar to its initial radial dimension. In some embodiments, the overall structural compliance of roller 10 may be tuned such that exterior annular cylinder portion 12 undergoes a 50% strain under process-level compaction forces. The 50% strain may ensure that a good signal is generated by roller 10 for particular conditions (e.g. AFP processing); however, roller design is not limited to designing with β=50%. In general, by using physics-based models and simulations, the material choice, dimensions, and geometry of pillars 28 of exterior annular cylinder portion 12 can be optimally designed to reach a balanced trade-off between roller mechanical performance and sensor sensitivity for any given application.

If it is assumed, for simplicity, that the entire pillar 28 expands uniformly, and that current sensor fabrication technique according to a particular embodiment allows for manufacturing pillars 28 as small as 2 mm×2 mm. Using equations (1) and (2), an anticipated minimum preferred clearance (size of gaps 57) between pillars 28 is found to be approximately c=d=0.8 mm. The sum of the axial dimension of a pillar 28 and the axial dimension of gap 57 (a+c; also shown as axial dimension 38 in FIG. 5) defines the axial dimension of a unit cell of the array of pillars 28. Similarly, the sum of the circumferential dimension of a pillar 28 and the circumferential dimension of gap 57 (b+d; also shown as circumferential dimension 38 in FIG. 5) defines the circumferential dimension of a unit cell of the array of pillars 28.

Figure 6:
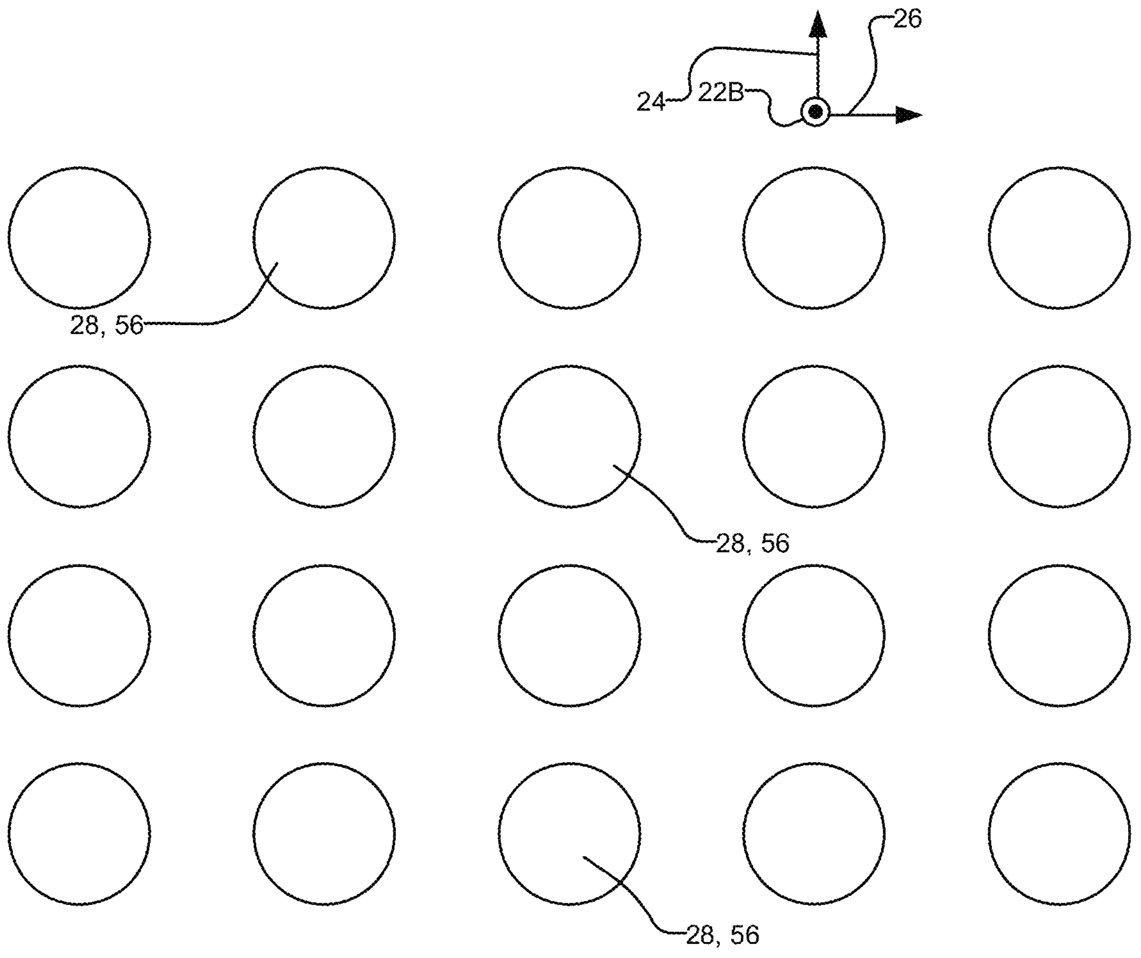
FIG. 6 depicts a schematic flattened, radial inward cross-sectional view (taken along a cross-sectional plane that extends in the axial and circumferential directions) showing the pillars of a capacitive sensor array according to another example embodiment in which pillars have circular cross-sections.

While some embodiments, comprises pillars 28 having square or rectangular cross-sectional shapes (in axially and circumferentially extending cross-sectional planes), various geometries may be used for pillars 28, including in combination with various geometries for sensor electrodes 50, 52. As one such example, pillars 28 may be provided with circular cross-sectional shapes (in axially and circumferentially extending cross-sectional planes) as illustrated in FIG. 6. Pillars 28 could also have irregular geometries, such as spirals (not illustrated), or have cross-sectional dimensions (in axially and circumferentially extending cross-sectional planes) that vary along their radial dimensions.

For further examples, some pillar geometries, electrode geometries and sensor array features suitable for use in roller 10 may be as described in US Patent Pub. No. 2021/0333164 A1, which is incorporated herein by reference.

Sensor Structure

The traditional prior art AFP roller 102 consists of a rigid interior portion 114 and soft outer layer 112 as illustrated in FIGS. 1 and 7. Smart roller 10 comprises an exterior annular cylinder portion 12 comprising an elastic sensor array 16. Referring to FIG. 8, in roller 10, when a radially outward facing cylindrical surface of rigid interior portion 14 abuts against a radially inward facing cylindrical surface of exterior annular cylinder portion 12, exterior annular cylinder portion 12 acts like the soft outer layer 112 of prior art AFP roller 102. An interior surface 20 of interior portion 14 defines at least a portion of a compartment 42 (e.g. a bore or cavity). Electronics 44 for the operation of sensor array 16 and for communicating data (e.g. wirelessly) from sensor array 16 to a suitable data processing unit may then housed in compartment 42.

The dimensions of roller 10 used in an AFP application may be chosen to suit the typical roller dimension while allowing space in compartment 42 for readout electronics 44. In various other applications of roller 10, the dimensions may be selected to fit the previous roller which roller 10 is replacing and the functionality it must provide. That is roller 10 may be retrofit into an existing system (e.g. an AFP system) in the place of an existing roller. As shown in FIG. 8, roller 10 of the illustrated embodiment comprises a shaft housing 46 dimensioned and/or otherwise configured to receive a rotational shaft (not shown) and to transmit rotational forces from the shaft to exterior annular cylindrical portion 12. Shaft housing 46 may be rigidly connected to or defined by the rigid interior portion 14, to enable a rotary connection to the external rotational shaft (not shown). The rigid interior portion 14 is encased by the exterior annular cylindrical portion 12, and rigid interior portion 14 may be connected to exterior annular cylinder portion to cause the rigid interior portion 14 and exterior annular cylinder portion 12 to move unitarily together about the rotational shaft (not shown). The electronics are self-contained in the smart roller, inside a compartment provided by the rigid interior portion.

In sensor array 16 comprising capacitive sensor elements 18, capacitive sensor elements 18 comprise an outer electrode 50 and an inner electrode 52 separated by a volume of elastic dielectric material 56, preferably provided in the form of circumferentially and axially spaced apart pillars 28 which extend at least part way radially between electrodes 50, 52. Electrodes 50, 52, pillars 28 and spacing 57 between pillars 28 may have various configurations. Two non-limiting examples of such configurations are illustrated in FIGS. 9-10 and FIGS. 11-12, wherein elastic dielectric material 56 is omitted to more clearly depict electrodes 50, 52. Different configurations of electrode geometries and pillar arrangements may provide benefits for enabling roller 10 to sense different properties, including normal forces and shear forces, and also properties of the materials being rolled, including, by way of non-limiting example, distance/proximity and dielectric properties of the material being rolled.

FIGS. 9 and 10 illustrate a configuration of sensor array 16 in which outer electrodes 50 and inner electrodes 52 are arranged in a lattice with: outer electrodes 50 in the form of strips elongated in circumferential direction 24 and spaced apart from one another in axial direction 26; and inner electrodes 52 in the form of strips elongated in axial dimension 26 and spaced apart from one another in circumferential direction 24. FIG. 9 shows sensor array 16 from an external perspective, looking radially inwardly, and therefore shows outer electrodes 50 overlapping inner electrodes 52. FIG. 10, on the other hand shows sensor array 16 from an internal perspective, looking radially outwardly and therefore shows inner electrodes 52 overlapping outer electrodes 50. Between outer electrodes 50 and inner electrodes 52 there would be dielectric material 56 (not shown in FIGS. 9 and 10). One or both of the outer electrodes 50 and inner electrodes 52 could be set in or cast into dielectric material in the illustrated configuration of FIGS. 9 and 10.

The embodiment illustrated in FIGS. 9 and 10 utilizes the mutual capacitance between the lattice of outer electrodes 50 and inner electrodes 52. Changes in mutual capacitance due to radial displacement of an outer electrode 50 (relative to an inner electrode 52) at a given circumferential and axial position (i.e. at a given taxel 19 position) are independently detectable (i.e. independently sampleable) through by suitable connected readout electronics 44 to measure localized pressure and/or force on the surface of the exterior annular cylinder portion 12. The readout electronics 44 may therefore be configured to independently sample sensor output from each of the independently sampleable sensor elements. Such relative displacements of outer electrodes 50 may be caused, by way of non-limiting example, by spatial variations in the surface being rolled.

Figure 11:
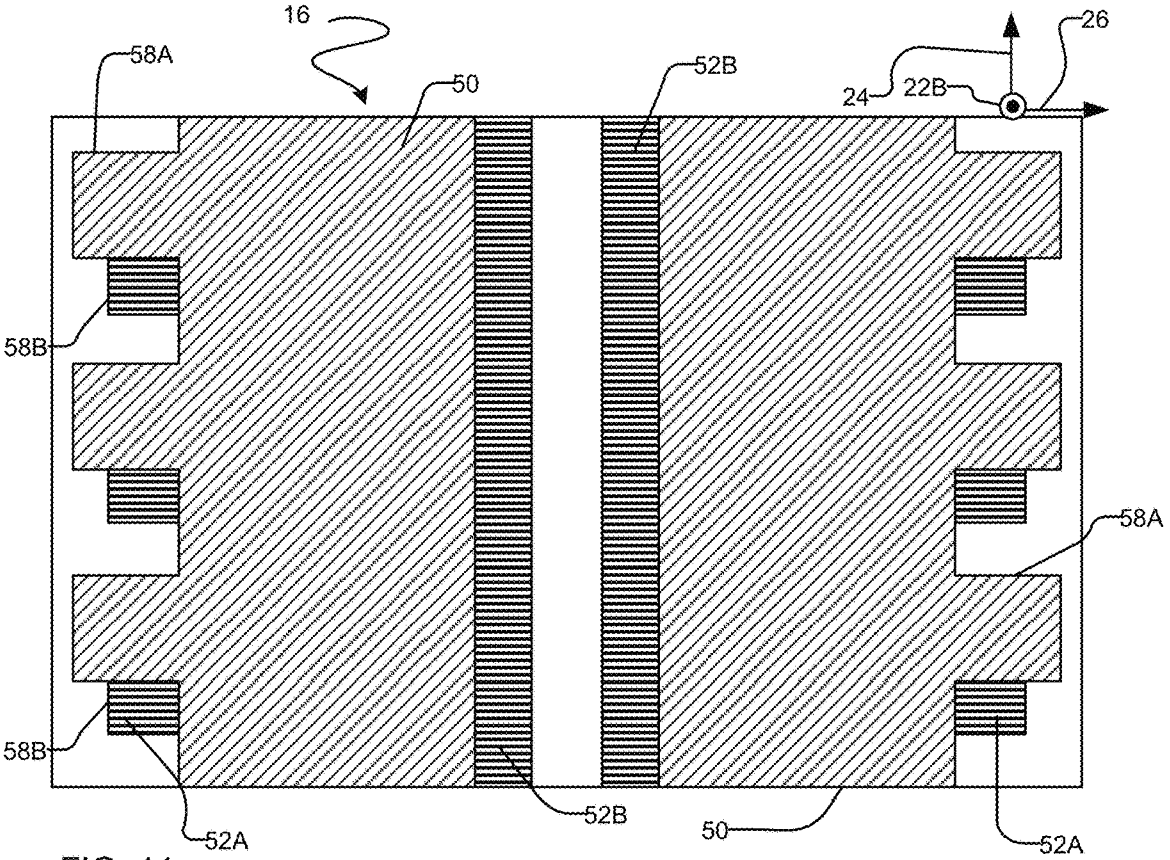
FIG. 11 depicts a schematic flattened, radially inward view of a capacitive sensor array transformed onto a flat plane and with elastic dielectric material omitted for clarity in which sensor elements use mutual capacitance between non-aligned capacitor plates.
Figure 12:
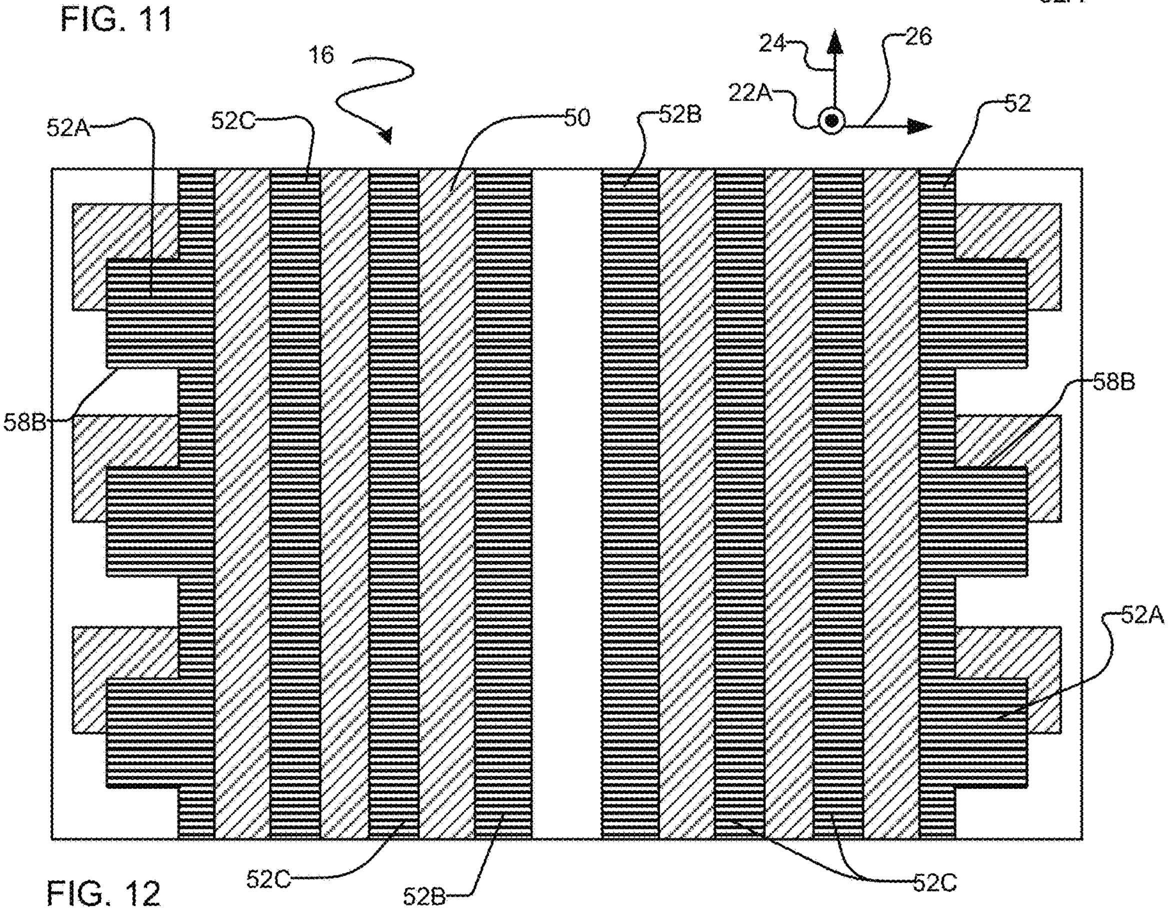
FIG. 12 depicts a schematic flattened, radially outward view of the FIG. 11 capacitive sensor array with elastic dielectric material omitted for clarity.

FIGS. 11 and 12 illustrate a further exemplary configuration of a sensor array 16 in which outer electrodes 50 comprise irregular shaped sheets comprising protrusions and notches 58A partially overlapping a sequence of inner electrodes 52 configured as inner electrode strips 52A comprising protrusions and notches 58B and inner electrode central sheets 52B (which, in the illustrated embodiment, are elongated in circumferential direction 24) and secondary inner electrode sheets 52C (which, in the illustrated embodiment, are elongated in circumferential direction 24). Radial displacement of the surface of the exterior annular cylindrical portion 12 (due to pressure) causes a reduction of the radial distance or space between outer electrodes 50 and inner electrodes 52A, 52B and 52C locally (i.e. at each independent sampleable electrode pair consisting of one outer electrode 50 and one inner electrode 52). Torque (shear in circumferential direction 24) causes a change in the area of radial direction overlap of the protrusions and/or notches 58A of outer electrodes 50 and the protrusions and notches 58B of inner electrode notched strips 52A that give rise to capacitive differences (between outer electrode 50 and inner electrode notched strips 52A) that may be isolated relative to the effect of radial displacement. Transverse shear (shear in axial direction 26) causes a change in the area of radial direction overlap of outer electrodes 50 with inner electrode central sheets 52B, and give rise to capacitive differences (between outer electrode 50 and inner electrode central sheets 52B) that may be isolatable from both radial displacements (local pressure) and torque (circumferential shear). Inner electrode secondary sheets 52C may provide additional sensitivity to radial displacements (local pressure) and may improve the isolation of torque and transverse shear measurements. This effect can be achieved by accounting for the affect of capacitance change in inner electrode secondary sheets 52C, which are primarily sensitive to radial displacement, such that the processor may make calculations to account for and subtract out the effects of radial displacement as measured through the inner electrode central sheets 52B and inner electrode strips 52A.

A material for outer electrodes 50 of sensor elements 18 should be elastic and electrically conductive. In some embodiments, it is preferable for this electrode fabrication material to be bondable to dielectric material 56, but this may be circumvented in other embodiments. The material chosen for outer electrode 50 in some exemplary embodiments is silver-coated stretchable conductive fabric (e.g. Adafruit Knit™ conductive fabric, item number: ZZB-1). The resistance of an 8-mm-wide strip of this conductive fabric is less than 1.25 Ω/cm, and the total outer electrode resistance may be less than 100Ω. The resistance of such fabric also does not change significantly enough with pressure to adversely impact capacitance readings. Such low and stable resistance allows for a refresh rate of sensor array 16 of 100 Hz or higher. Such conductive fabric also bonds to the silicone elastomer used for dielectric 56. Other materials may be usable for outer electrode 50 provided that such materials are at least elastic and electrically conductive. Other additional or alternative materials for outer electrode 50 may include conductive elastomers including carbon black loaded elastomers, carbon fibres or nanofiber loaded elastomers, or a combination of carbon black and carbon nanofibers, carbon nanotube or graphene loaded elastomers, metal particle loaded elastomers, metal fibre or nanofiber loaded elastomers, stretchable conductive fabrics such as those made of silver coated nylon, thin metal layers that are on a wrinkled or undulating surface in order to enable stretchability, ionically conductive materials including salt containing hydrogels, and/or the like.

Figure 21:
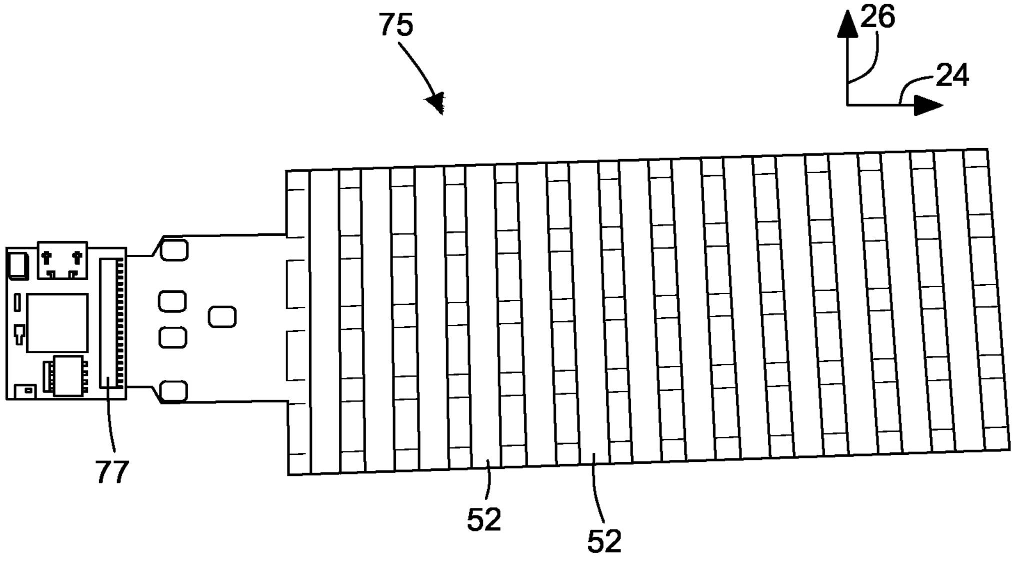
FIG. 21 is a schematic representation of a printed circuit board used as an inner electrode in an exemplary embodiment.

Inner electrode 52 may comprise any electrode material that can be configured along a cylindrical shape and sampleable at discrete locations. In some embodiments, inner electrodes 52 are provided on a flexible Printed Circuit Board (PCB). In an exemplary embodiment, inner electrodes 50 are provided by a PCB comprising 50 μm polyimides as the substrate and 35 μm copper as the conductive layer for inner electrodes 50. Polyimide has significant thermostability under relatively high temperatures (up to 288 °C). This property allows soldering of components onto the flexible PCB. FIG. 21 shows a PCB 75 used in an example embodiment. As illustrated in FIG. 21, flexible PCB 75 used to provide inner electrodes 52 may be connected to readout circuit electronics 44 placed within compartment 42 defined at least in part by rigid interior portion 14 (see FIG. 8). Rectangular copper polygons on the flexible PCB 75 shown in FIG. 21 are the copper inner electrodes 52. Electrical connections between the electrodes 50 and readout circuit 44, and electrical connections between inner electrodes 52 and readout circuit 44 may pass through a gap 48 (FIG. 8) in an exterior surface of rigid interior portion 14.

In the FIG. 21 exemplary embodiment, the circumferential dimension of PCB 75 is 134 mm, which is equal to the circumference of roller 10 in which PCB 75 was employed (although this is not necessary). The axial dimension of PCB 75 was also the same as the axial dimension of roller 10 in which PCB 75 was employed to thereby span the circumferential surface of roller 10 (although, again, this is not necessary). PCB 75 of the FIG. 21 embodiment comprises 13 inner electrodes 52. The overall pattern of the sensor array 16 in one particular example embodiment is a 4×13 matrix, although it will be appreciated that sensor arrays of other sizes could be provided. The dimensions of each taxel 19 of the FIG. 21 embodiment are 8 mm×4.8 mm, although it will again be appreciated that other taxel sizes could be provided. In the illustrated FIG. 21 embodiment, the electrical connection terminal 77 of PCB 75 is directly connected to a capacitive readout circuit 44 through a multi-pin FFC connector. PCB 75 was designed in Altium™ and manufactured by PCBWAY.

Referring back to FIG. 8. An interior cylindrical (bore-defining) surface of exterior annular cylindrical portion 12 may be connected to an exterior cylindrical surface of rigid interior portion 14. In some embodiments, this connection may comprise bonding of dielectric material of the interior cylindrical (bore-defining) surface of exterior annular cylindrical portion 12 to the exterior cylindrical surface of rigid interior portion 14. In some other embodiments, this connection may comprise some other form of connection between these two portions 12, 14, including, for example, friction fit, fasteners, adhesives, and/or the like. The connection of rigid interior portion 14 to exterior annular cylindrical portion 12 may cause the rigid interior portion 14 and exterior annular cylinder portion 12 to move unitarily together, for example due to rotational forces applied about a rotational shaft (not shown). The shaft housing 46 may be rigidly connectable to or defined by the rigid inner portion to enable the rotary connection between the rigid inner portion 14 and the external rotational shaft.

Returning to smart roller 10 of the embodiment illustrated in FIGS. 9 and 10, sensor array 16 comprises a plurality of outer electrodes 50 generally elongated in circumferential direction 24 and spaced apart from one another in axial direction 26 and plurality of inner electrodes 52 generally elongated in axial direction 26 and spaced apart from one another in circumferential direction 24. It will be appreciated that this orthogonal arrangement of outer electrodes 50 and inner electrodes 52 could be reversed. In the embodiment of FIGS. 9 and 10, outer electrodes 50 may comprise conductive fabric strips while inner electrodes 52 may comprise copper pads on a flexible PCB.

The mutual capacitance between any pair of one outer electrode 50 and one inner electrode 52 will increase the most when a localized pressure is applied to the outer circumferential surface of exterior annular portion 12 (roller 10) at the corresponding region where the pair of one outer electrode 50 and one inner electrode 52 overlap in the radial direction 22. This region of overlap in radial direction 22 will have an axial dimension and a circumferential dimension and corresponds to a taxel 19 (shown in dotted lines in FIGS. 9 and 10). In contrast, the mutual capacitance between any pair of one outer electrode 50 and one inner electrode 52 is insensitive to pressure applied away from their region of radial direction overlap. Therefore, by measuring capacitance between every pair of one outer electrode 50 and one inner electrode, 52 the applied pressure can be determined at each taxel 19. As discussed elsewhere herein, sensor array 16 may be sized so that it spans any suitable portion (including the whole of) the exterior circumferential surface of exterior annular portion (roller 10) and so that taxels 19 are appropriately sized and distributed over this surface for any particular application.

In an exemplary embodiment: outer electrodes 50 comprise four conductive fabric strips, each such strip having an axial dimension of 8 mm and a circumferential dimension of 132 mm, embedded in a matrix of silicone rubber attached to dielectric 56; and inner electrodes 52 comprise thirteen copper pads on a flexible PCB. In this embodiment, the radial overlap region between a pair of one outer electrode 50 and one inner electrode 52 (defining a taxel 19) provides a spatial resolution of finer than 1 cm in each of axial and circumferential dimensions. This starting dimension, similar to the width of the tow, enables a first direct and real-time look at non-uniformities.

Figure 14B:
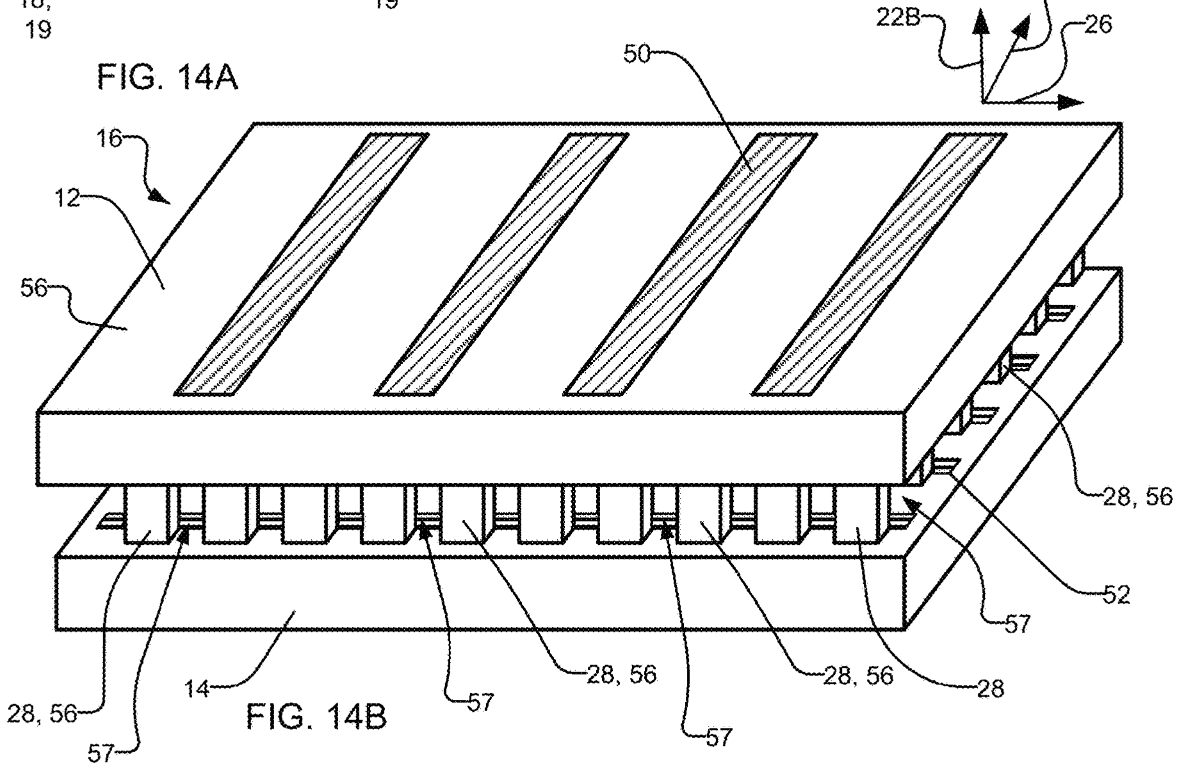
FIG. 14B depicts a perspective view of a portion of the FIG. 14A array of sensors, showing the pillars of dielectric material separating the outer electrodes and inner electrodes.

FIGS. 14A and 14B show various views of a sensor array 16 that is, in many respects, similar to sensor array 16 of FIGS. 9 and 10. Outer electrodes 50 of the FIG. 14A sensor array 16 comprise a plurality of conductive fabric strips elongated in the circumferential direction 24 and spaced apart from one another in axial direction 26 and inner electrodes 52 of the FIG. 14A sensor array 16 comprise a plurality of copper polygons on a flexible PCB (not shown) that are elongated in the axial direction 26 and spaced apart from one another in circumferential direction 24. The perspective view in FIG. 14B shows the structure of the FIG. 14A sensor array 16 in more detail including outer electrodes 52, dielectric material 56 including circumferentially and axially spaced apart pillars 28, and inner electrodes 50.

Capacitive Sensing

The working principle of capacitance tactile sensor element 18 is based on the property of a capacitor. Its capacitance C is approximated by a parallel plate model:

$$C = \frac{(\varepsilon_0 * \varepsilon_0 * A)}{d} \tag{3}$$

where $\varepsilon_0$ is the vacuum permittivity, $\varepsilon_r$ is the relative permittivity, A is the area of the radially overlapping region of the parallel plates formed by one of outer electrodes 50 and one of inner electrodes 52 corresponding to the sensor element 18, and d is the radial distance between the overlapping region of the pair of electrodes 50, 52.

In equation (3), the capacitance C is inversely proportional to radial separation d. When pressure is applied to roller 10 (e.g. to its exterior circumferential surface), the deformation of dielectric layer 56 leads to a decrease in the radial separation d and a corresponding increase in capacitance C. In the devices described here, dielectric 56 comprises an elastomer that is patterned to form axially and circumferentially spaced apart pillars 28. The force sensing range of each sensor element 18 depends on Young's modulus and Poisson's ratios of the elastic dielectric 56 at small deformations, the viscoelastic and nonlinear mechanics of the elastic dielectric 56 at large strains, and the geometry and layout of pillars 28. Axially and circumferentially spaced apart pillars 28 increase compliance relative to solid elastic dielectric by reducing cross-sectional area and providing gaps 57 between pillars 28 (creating a structure that is much more readily compressible than solid elastic dielectric) greatly reducing the stiffening effect of elastomer incompressibility. The desired material of elastic dielectric and structure and geometry of pillars 28 may be selected to have stiffness similar to commercial prior art rollers (which may be replaced by smart roller 10), and low hysteresis.

Sampling Rate

The productivity of an AFP system is determined and limited by the maximum speed at which defect-free tow deposition can be performed. High-speed AFP systems can deposit prepreg tows at rates up to 4000 in/min or ~1.7 m/s. This deposition rate is considerably reduced when prepreg tows are steered or when prepeg tows are deposited to laminate more complex, curved structures (e.g., an aircraft fuselage or a cockpit). Deposition speeds of up to about 1 m/s can be achieved in this case, which for a typical roller with an outer diameter of 40 mm, results in approximately 240 rpm or 4 Hz rate of rotation.

Discretized feedback delay and sampling rates are parameters that influence a control system's performance. The minimum desired sampling frequency for sensor elements 18 in roller 10 may depend on the dimensions and rotational speed of roller 10 for any particular application. The maximum sampling frequency for sensor elements 18 in roller 10 may be restricted by the speed of the readout circuit (e.g. readout electronics 44) and the sensor time constant.

The time constant τ of capacitance measurement is given by $$\tau = RC \tag{4}$$

Where: R is the resistance in series with the capacitor; and C is the capacitance of the capacitor. In some embodiments of roller 10, inner electrodes 52 are copper traces with negligible resistance. Since outer electrodes 50 are at or near the exterior circumferential surface of roller 10, it may be preferred that outer electrodes 50 exhibit similar mechanical properties to the exterior circumferential portions of conventional prior art rollers (which may be replaced by smart roller 10). This desire for similar mechanical properties suggests the use of softer materials (e.g softer than copper), which may tend to have higher resistance (e.g. higher resistance than copper) and may tend to increase the time constant given by equation (4) relative to a capacitor made entirely of copper.

Figure 13:
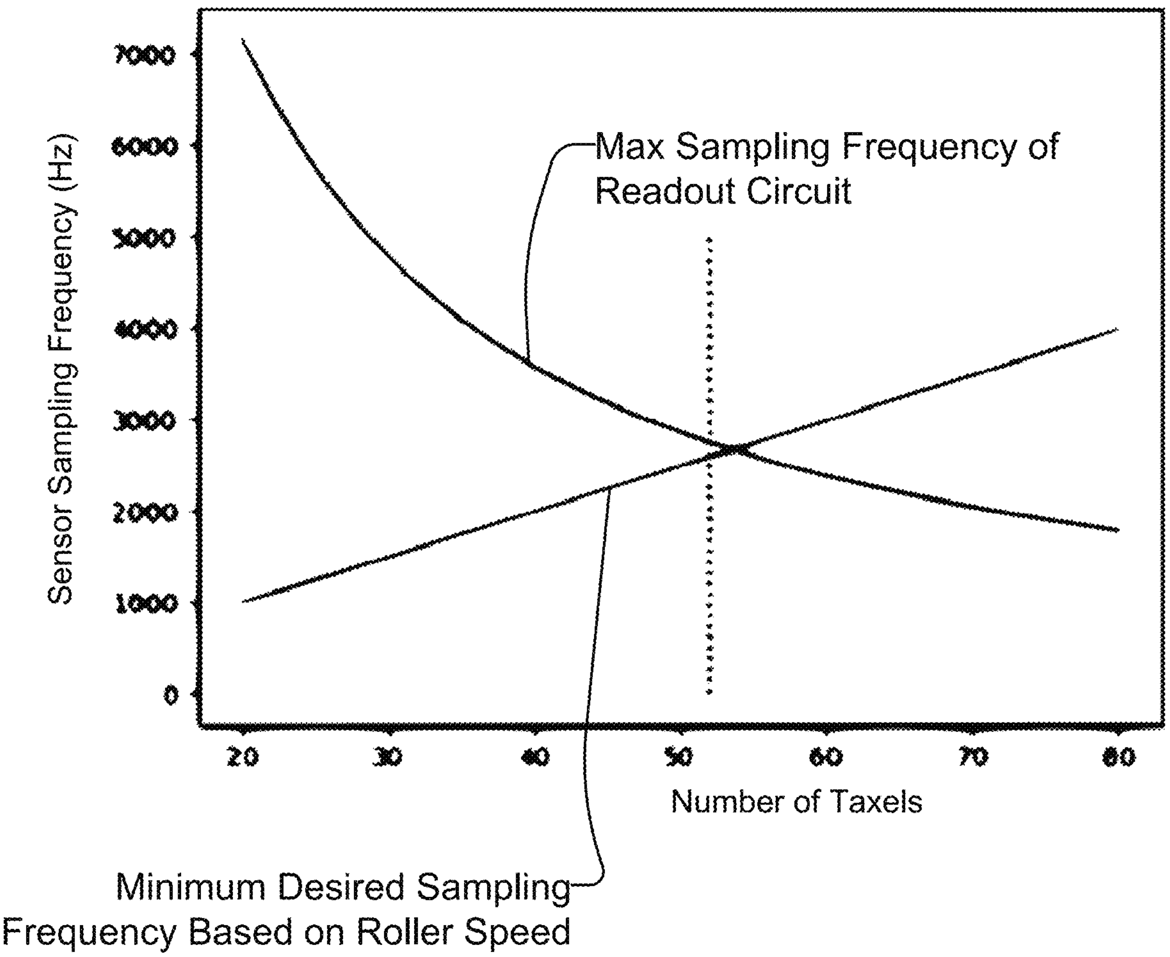
FIG. 13 is a graph of illustrating the sensory sampling frequency by readout circuit and roller speed, each against the number of taxels for an exemplary embodiment.

The overall sampling frequency of an entire sensor array 16 is closely related to the number of sensor elements 18 (taxels 19) on roller 10. FIG. 13 shows that the maximum sensor sampling frequency that a readout circuit is capable of is reduced with an increasing number of taxels 19, as calculated for an exemplary roller 10 of a given size (e.g. of a given axial dimension and a given exterior surface circumference) and a given rotational speed. This maximum sensor sampling frequency determines an upper bound for sensor frequency (as shown on the y-axis of FIG. 13). A lower bound on the sensor frequency is determined by a minimum desired sampling frequency for a given roller rotation rate. In theory, roller 10 shown in the FIG. 13 embodiment could be operated with up to about 54 taxels 19 (i.e. anywhere to the left of the intersection of the two curves). In practice, however, it may be desirable to provide some margin for error, in which case roller 10 shown in the FIG. 13 embodiment could be operated anywhere to the left of the vertical dashed line. FIG. 13 assumes that the time constant τ for capacitance measurement is around 7 μs per taxel 19, determined by capacitance sensing microcontroller sampling rates. In the case of the FIG. 13 example, the Cypress CY8C6347BZI-BLD54 was used as a microcontroller, the roller diameter was 40 mm and the roller operated at a rotation rate of 4 rotations per second.

It will be appreciated from a consideration of the FIG. 13 example, that a large number of taxels 19 leads to a need for faster sampling frequency, because there may be a larger taxel density and so each taxel contacts the surface for a shorter amount of time and/or because there may be a larger number of taxels in contact with the surface at any given time. FIG. 13 shows the minimum desired sampling frequency would increase linearly to ensure that roller 10 samples at least 5 times per taxel during the taxel contact time. The FIG. 13 plot was prepared conservatively for a roller travel speed of 1 m/s—it being appreciated that roller travel speed is a function of the roller circumference and rotational speed.

In the particular case of the FIG. 13 example, this trade-off between a high taxel density and an adequate (minimum desired) sampling frequency for a particular roller travel speed yields an exemplary roller sensor pattern with 52 taxels in total. A layout of 4 rows by 13 columns (discuss for some of the embodiments described herein) was chosen to fit the geometry of this tradeoff. In other embodiments having different dimensions (axial or circumferential dimensions), different rotation rates and/or different maximum readout circuit sampling rates, a different target number and distribution of taxels could be determined.

In general, taxel density and sampling frequency may be balanced to provide a sufficient sampling rate for the application based on the size of the roller and the speed of rotation. Different applications with difference properties may benefit from different taxel densities, sampling frequencies and taxel geometries. In addition, the system may benefit from selective sampling of the taxels based on the current location of the nip point on the roller surface, as described further below.

Simulation

A typical industrial-grade prior art AFP roller (i.e. as illustrated in FIGS. 1 and 7) was simulated to establish a standard baseline of compaction roller performance. The baseline roller's outer and inner diameters were 38 mm and 20 mm, respectively. The material of the outer layer 112 was a shore A 60 durometer polymer, with Young's modulus approximated at 5.5 MPa.

Simulations were conducted for smart rollers of two different geometries. In both cases, the axial and circumferential dimensions of pillars 28 are 2 mm×2 mm, while the axial and circumferential spacing (gaps 57) between pillars 28 was 0.5 mm in a first simulation model and 0.8 mm in a second simulation model. To reduce the demand for computational resources, only three pillars were simulated. Moreover, the full-scale process compaction force (200 N) was scaled appropriately to take into account the reduced number of pillars 28.

In the simulation, the models included rigid tooling against which roller was applied. As discussed above, interior portion 14 of roller 10 is significantly stiffer than exterior annular portion 12 and was therefore replaced by a rigid shell for the finite element simulation. Radially inwardly facing surfaces of pillars 28 were tied to interior portion 14 to represent the adhesive bond between the elastomeric material of pillars 28 and interior portion 14. Hard mechanical contact was defined between all model surfaces, including between pillars 28 and exterior annular portion 12.

As discussed above, shore 20 A durometer rubber may be used in exterior annular portion 12 and was simulated using the Mooney-Rivlin material model to represent the hyper-elastic behaviour of the rubber. Empirical relationships were used to estimate the Young modulus of this rubber to be $E \approx 800$ kPa. At the limit of small strains, Mooney-Rivlin material parameters can be estimated based on shear (G) and bulk (K) moduli of the rubber ($C_{01}=C_{10}=G/2=0.07$ MPa and $D_1=2/\kappa=0.033$ $MPa^{-1}$).

Four-node hybrid tetrahedron elements (C3D4H) were used to discretize exterior annular portion 12. The size of the elements in the contact region was 0.25 mm. Rigid quadrilateral elements (R3D4) were used to discretize rigid surfaces (tooling and interior portion 14). The models were solved using Abaqus™ implicit static solver while considering nonlinear geometries and large deformations.

Figure 15:
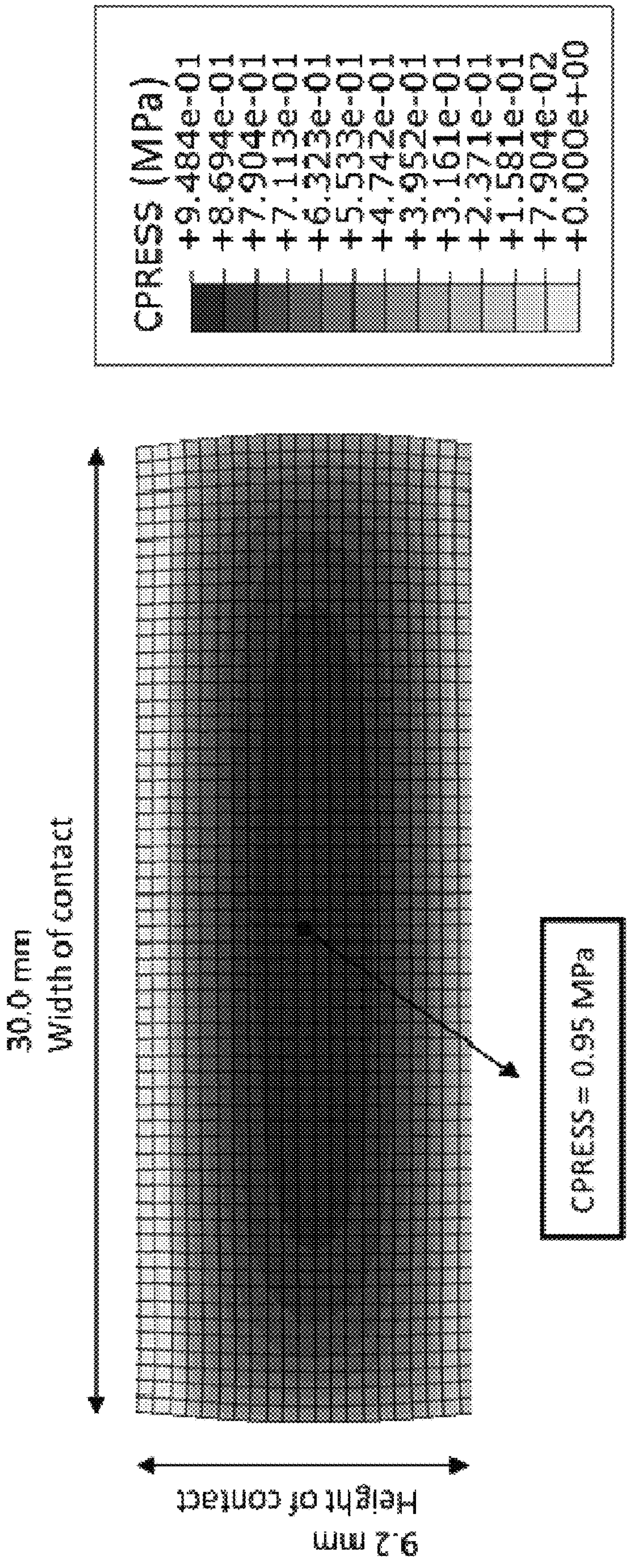
FIG. 15 depicts the results of a simulation of the contact pressure distribution of a prior art compaction roller.
Figure 17:
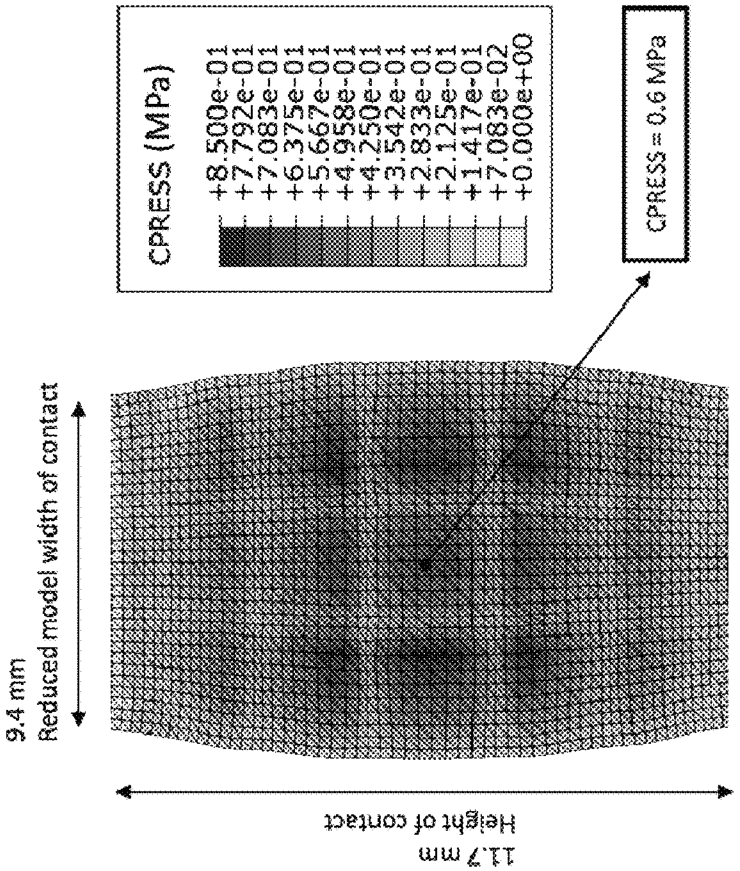
FIG. 17 depicts the results of a simulation of the contact pressure distribution of a smart roller according to an embodiment with 0.5 mm pillar spacing in the dielectric pillars.
Figure 16:
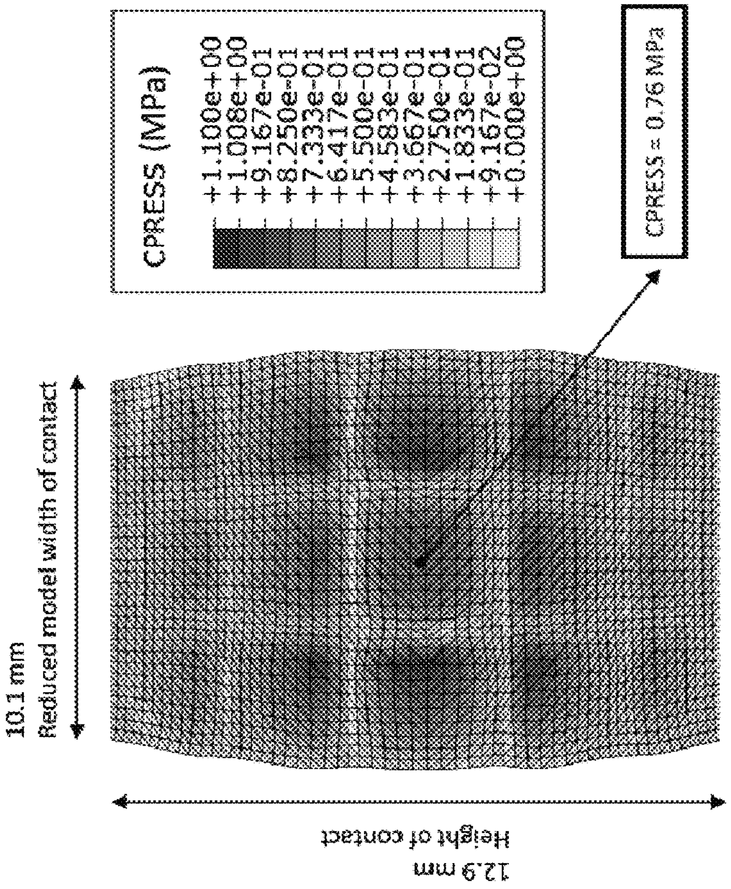
FIG. 16 depicts the results of a simulation of the contact pressure distribution of a smart roller according to an embodiment with 0.8 mm pillar spacing in the dielectric pillars.

FIGS. 15-20 present the results of the finite element simulation. FIGS. 15-18 show the resulting contact pressure profile at the tool roller interface. FIG. 15 shows the baseline roller contact pressure distribution for a standard prior art AFP compaction roller. FIGS. 16 and 17 show that the presence of pillars 28 introduces variations in the magnitude of contact pressure. FIG. 16 illustrates contact pressure distribution in an model smart roller with 0.8 mm pillar spacing whereas FIG. 17 illustrates contact pressure distribution in an model smart roller with 0.5 mm pillar spacing. Decreasing the spacing between pillars 28 from 0.8 mm (FIG. 16) to 0.5 mm (FIG. 17) helps in decreasing contact pressure variations. These simulation results show that the uniformity factor achieved in compaction pressure was 56% for the 0.5 mm pillar spacing and 42% for the 0.8 mm pillar spacing, compared to 79% for the baseline prior art compaction roller.

Figure 18:
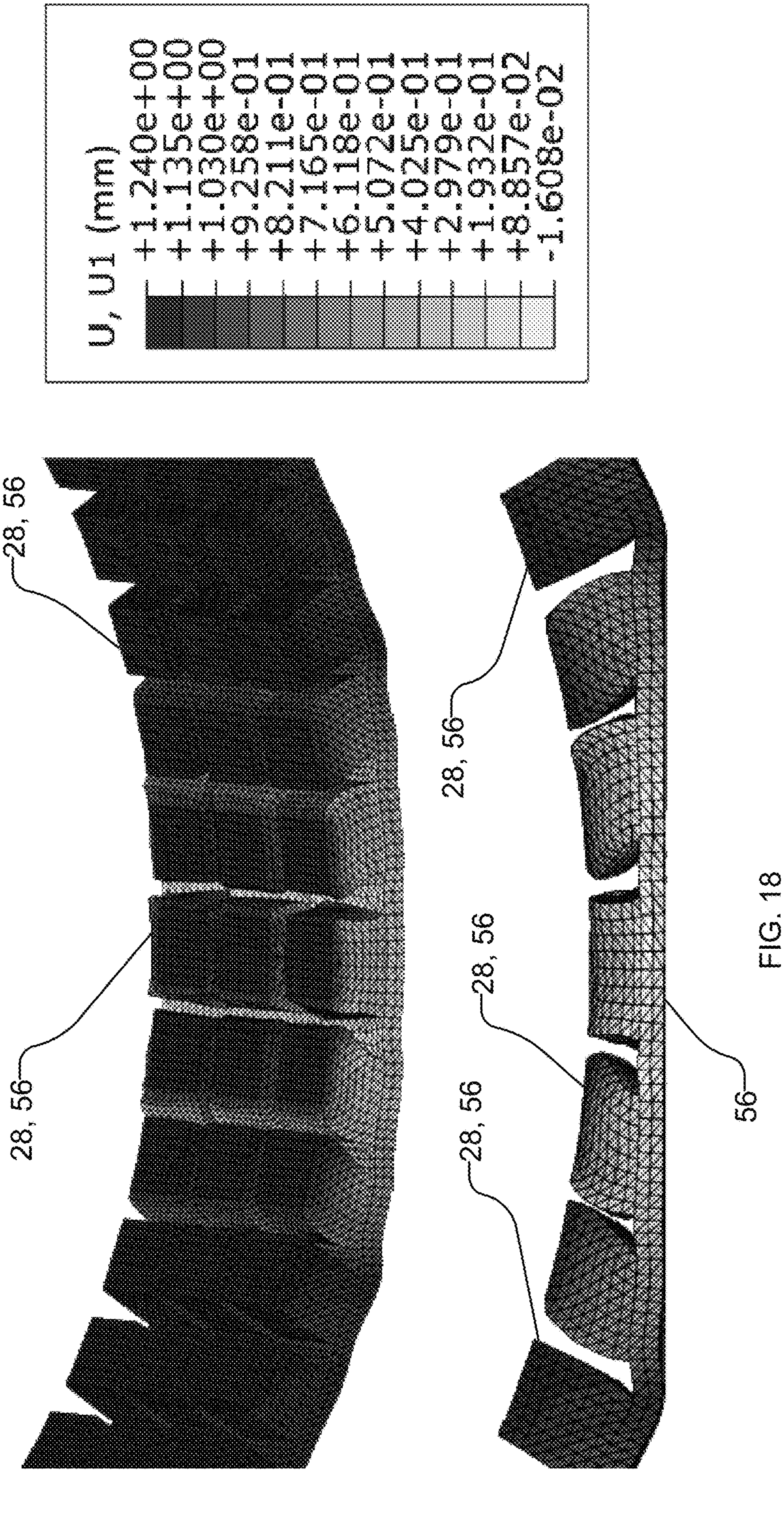
FIG. 18 depicts the results of a simulation of the deformation of dielectric pillars in a smart roller having the same characteristics as that of FIG. 16.

A trade-off exists between uniformity of pressure achieved at the contact interface and individual the ability of an individual pillar 28 to deform freely without interference from (e.g. physical contact with) adjacent pillars 28. FIG. 18 illustrates how the pillars 28 can deform independently with 0.8 mm spacing. A working model was constructed according to this design.

Figure 19:
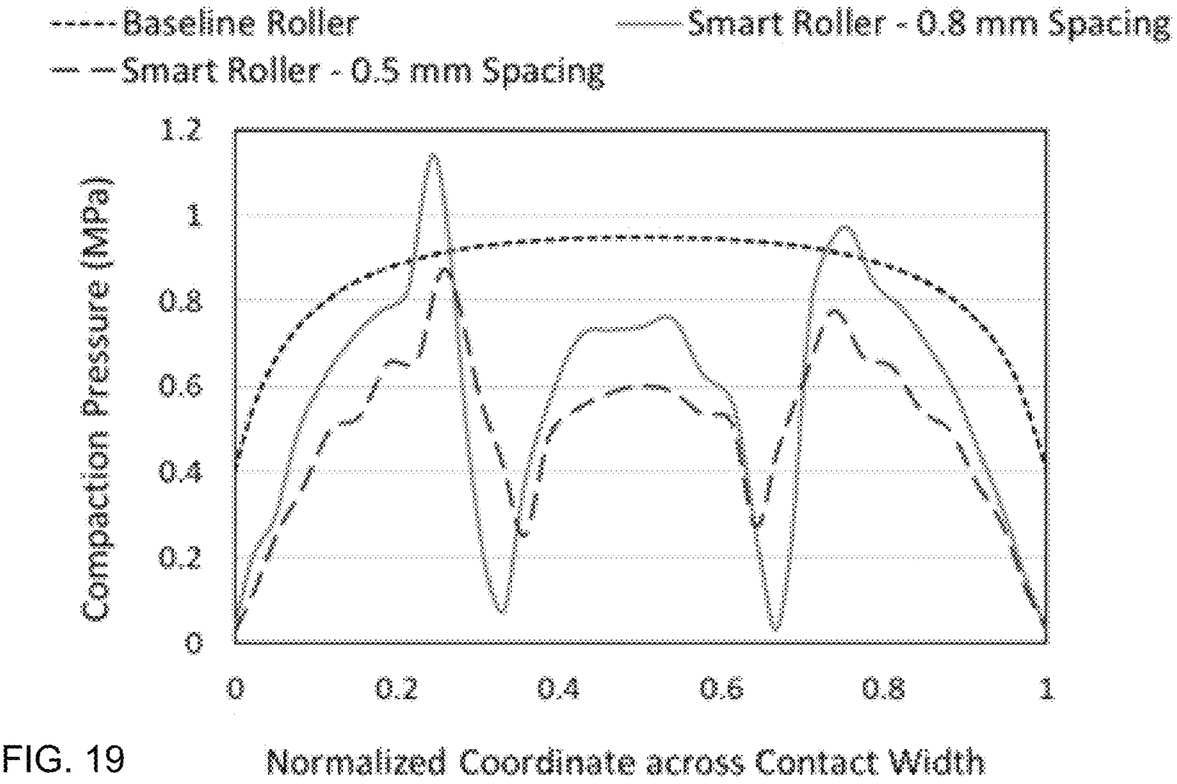
FIG. 19 depicts axial distributions of pressure between the rollers of FIGS. 15, 16 and 17.
Figure 20:
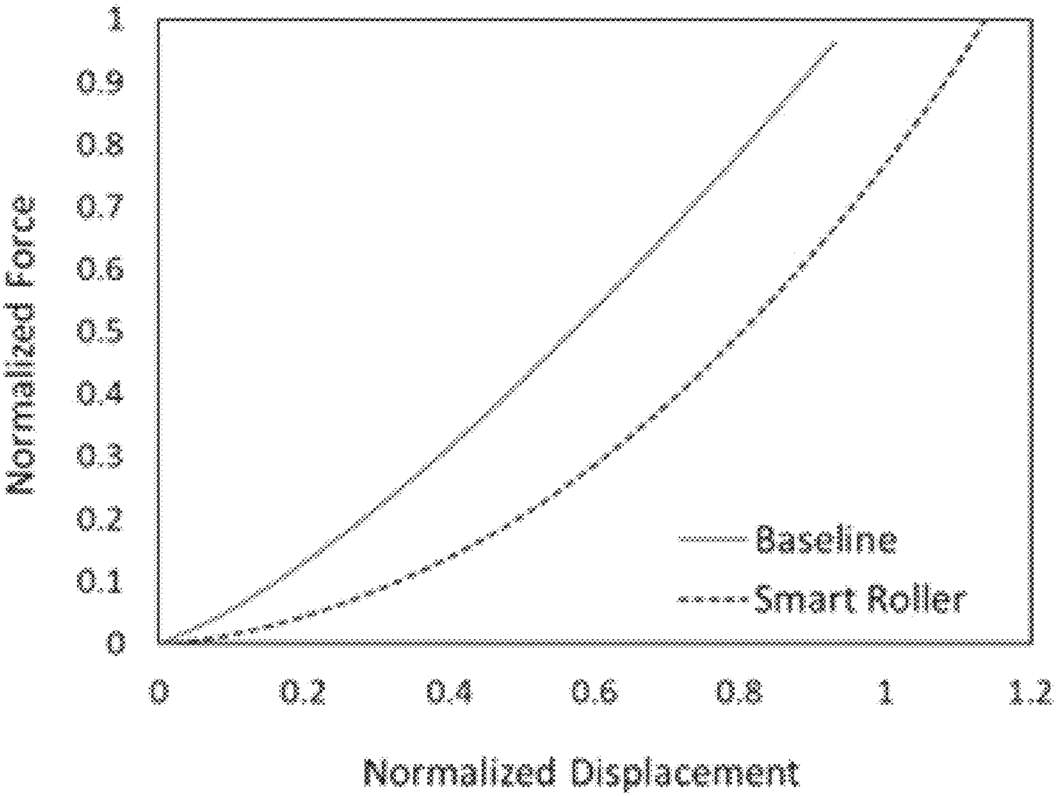
FIG. 20 depicts the normalized force-displacement graphs of the rollers of FIGS. 15 and 16

FIG. 19 summarizes compaction pressure distribution for all rollers across their width and FIG. 20 compares the normalized force-displacement behaviour of the baseline prior art roller with the smart roller with 0.8 mm spacing between pillars 28 (up to 200 N). Displacements are normalized by the maximum displacement of the baseline prior art AFP compaction roller (1.04 mm) in this graph.

In these models, the baseline prior art AFP compaction roller was initially more stiff under small loads, which can be attributed to the stiffer material used in its outer layer 112. However, the model smart roller's stiffness quickly rose with increasing applied force, with bulk rubber deformation becoming the primary mode of deformation. Finally, the maximum deformation of the smart roller model was only 14% larger than that of the baseline prior art roller.

Modularity of Smart Rollers in AFP Processes

Compaction rollers 102 used in existing AFP processing are generally made of a relatively compliant outer layer 112 that is mounted around a rigid hub 114. A variety of compaction rollers with different construction types, dimensions, and material properties are used in industrial applications to perform tow deposition. Depending on the specific application, a suitable compaction roller is selected.

Silicone- or urethane-based rubbers with a wide range of hardness grades are commonly used to manufacture the compliant outer layer 112 of AFP compaction rollers. Rubber grade is identified using its hardness which is measured and quantified using the durometer scale. 30 to 90 Shore A durometer rubbers are typically used as the compaction roller's flexible outer layer 112 for AFP processes. The overall structural stiffness of the roller is not only a function of the material used as the compliant outer layer 112 but is also dependent on the absolute and relative dimensions of the compliant outer layer 112 and the rigid hub 114.

Contact characteristics of the roller, such as peak compaction pressure, distribution of compaction pressure, and dimensions of contact area, under typical process forces, are helpful in understanding the mechanical performance of the roller. Under some standard AFP processing forces, peak pressure of up to 1-1.5 MPa can be observed in typical industrial rollers.

Some elasticity (flexibility) is desired in the exterior surface of an AFP roller, and where smart roller 10 is used for AFP applications, it is desired that the exterior cylindrical annular portion 12 of a smart roller 10 used in an AFP application act as a soft interface with dimensions and stiffness that correspond generally to those of prior art industrial rollers 102 used to lay down carbon fibre composites. In some embodiments, this may mean that a smart roller 10 used to replace a given industrial compaction roller 102 may have dimensions within ±20%, within ±10%, within ±5%, or less of the dimensions the given industrial compaction roller 102, and/or may have a stiffness and/or durometer within ±20%, within ±10%, within ±5% or less of the given industrial compaction roller.

To prevent the need for modifications to AFP machines (i.e. to simplify retrofitting smart roller 10 into existing AFP machines in place of prior art rollers), smart roller 10 may be designed to be fully modular, containing its own readout electronics 44, which may comprise, for example, a battery, microcontroller, and wireless transmission module. A fully contained set of readout electronics 44 may allow a smart roller 10 to be integrated into existing industrial AFP systems to measure pressure over complex geometry without the incorporation of external wiring or other connections along or across the robotic arm or gantry of the AFP system.

Readout Electronics

Figure 38:
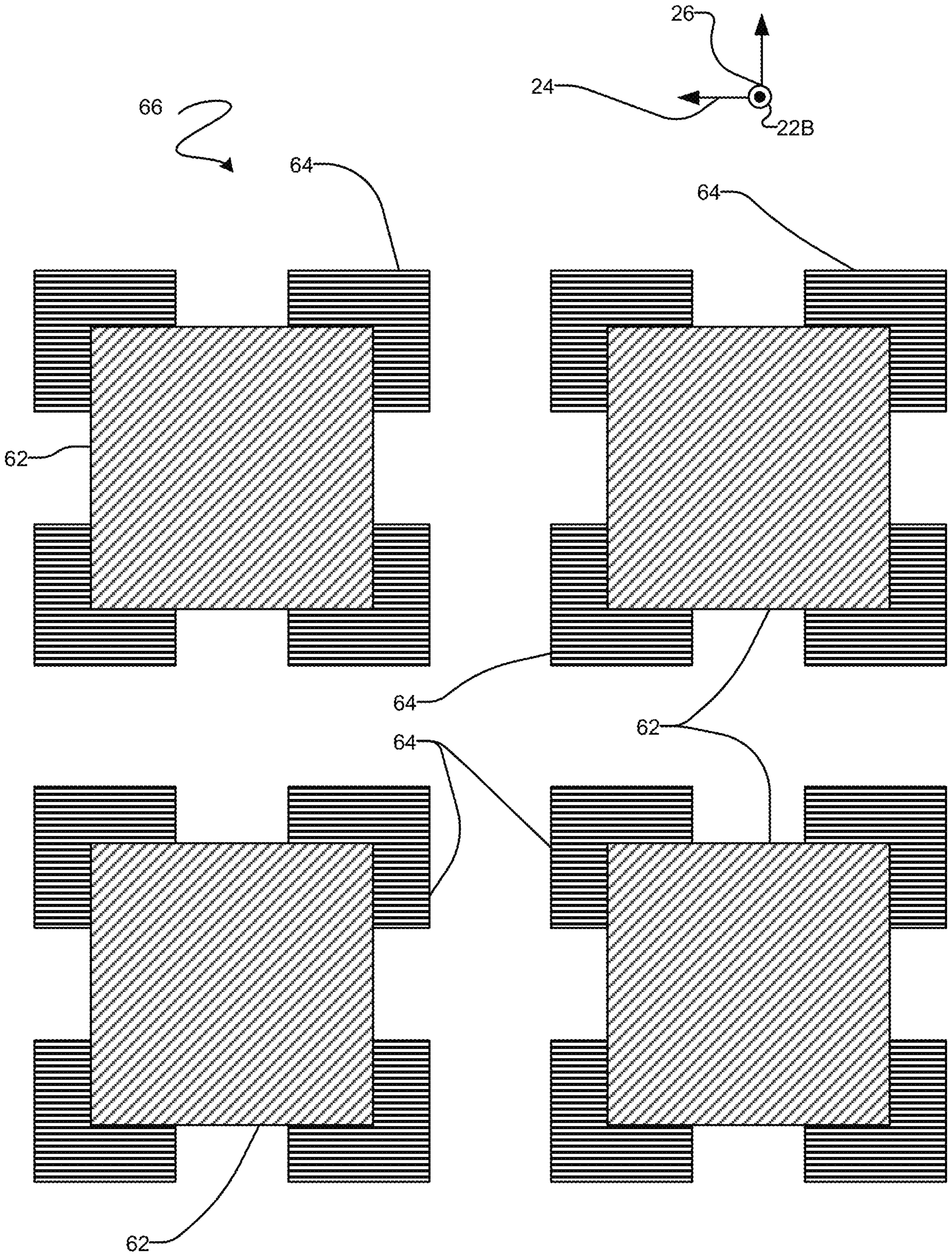
FIG. 38 depicts a schematic flattened, radially inward view of an exemplary geometry of capacitive actuators transformed onto a flat plane according to an embodiment.

As discussed above, smart roller 10 comprises readout electronics 44. In some embodiments, readout electronics 44 receive sensor data from sensor elements 18 (taxels 19) of sensor array 16, processes the data, and sends a processed output to an external receiver using a suitable (preferably wireless) transmitter. In some embodiments, readout electronics 44 may be configured to be able to sample each sensor elements 18 independently. In some other embodiments, readout electronics 44 may receive sensor data from sensor array 16 and transmit the raw data unprocessed. In various embodiments, readout electronics 44 may comprise a microcontroller unit, a battery, a transmitter, signal processing circuitry and other circuit elements known to those skilled in the art to read from sensor array 16, process the sensor data and transmit the processed data away from roller 10. Readout electronics 44 may generally comprise a circuit capable of processing capacitive sensing, along with a means of addressing multiple capacitances (when needed), as well as a means of recording and/or transmitting the measured data. Non-limiting examples of circuits capable of performing at least some of this functionality are disclosed in US patent publication No. 2018/0246594 and in US patent publication No. 2018/0238716 which are both hereby incorporated herein by reference. Readout electronics 44 may be powered by a battery, and or/may receive power externally, such as through the roller bearings and the robot arm of an AFP process, or by RF power, or even using generation from capacitive generators or other generators built into smart roller 10, and generating power as smart roller 10 is deformed. Readout electronics 44 may comprise a transmitter. In some embodiments, the transmitter may use Bluetooth™ Low Energy transmission, or other additional or alternative transmission (e.g. wireless transmission) methods, such as ultra-wideband communications, low-rate wireless personal area networks (WPAN) and/or the like. In some embodiments, the transmitter also functions as a receiver for smart roller 10. The receiver may, for example, receive controlling instructions from an external processor for adjusting an actuator array 66 (e.g. as illustrated in FIG. 38 and described in more detail below) embedded in the exterior annular cylindrical portion 12.

In an exemplary embodiment, readout electronics 44 comprise a readout circuit designed around the specifications of a CY8C6347BZI-BLD54 (BLD54) microcontroller unit from Cypress Semiconductor. Such readout electronics 44 may provide mutual capacitance measurements between 0.1 pF to 2 pF at a single measurement sample rate of 107 Hz. Such readout electronics 44 are robust under variations in trace resistance. The internal highspeed analog multiplexer of such readout electronics 44 allows easy switching between trace measurements. The compact footprint (24 mm×19 mm), low power consumption, and wireless communication capability of such readout electronics 44 allow readout electronics to operate inside the compact space margin (e.g. in compartment 42 (FIG. 8) of roller 10. Readout electronics 44 may be connected to sensor array via a flat flexible connector (FFC).

Read Out Principle and Circuit Structure of an Exemplary Embodiment

Figure 22:
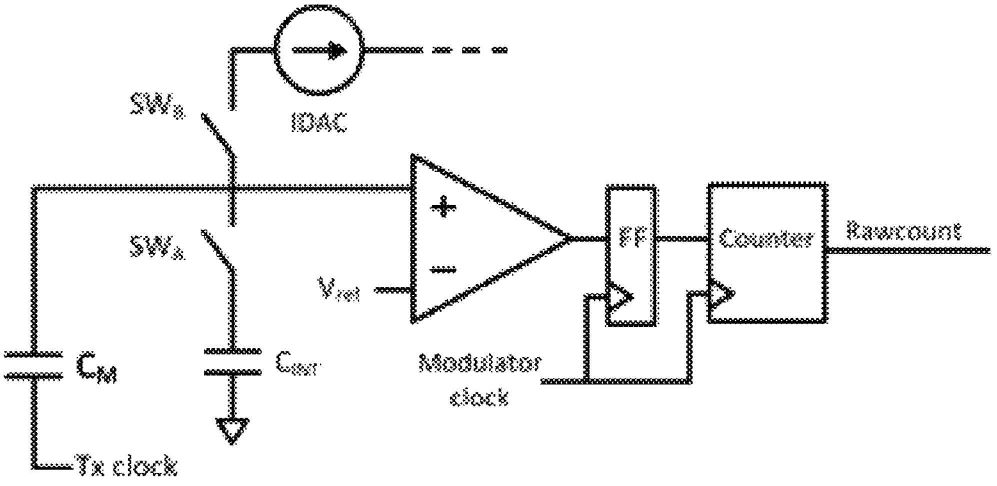
FIG. 22 depicts a schematic circuit block diagram of a readout architecture according to an exemplary embodiment.

FIG. 22 is a simplified block diagram representation of the capacitance-to-digital converter (CDC) architecture inside the BLD54 microcontroller in an embodiment of a smart roller 10 in an AFP application. This architecture converts the charge stored in a measured capacitor ($C_m$) into a readable digital pulse width modulation (PWM) signal.

In FIG. 22, when the Tx clock is high, $SW_A$ is closed, $C_m$ forms a voltage divider with a fixed integration capacitor $C_{int}$. After $C_{int}$ voltage is stabilized, $SW_B$ is closed, and the controlled current source IDAC (Current Digital to Analog Convertor) will discharge $C_{int}$ at a constant rate. The time to discharge a capacitor using a constant current source correlates to the capacitance being measured. The period of the Tx clock dictates the sampling speed as well as the maximum time given for IDAC discharge. Since the rate of IDAC discharge and Tx clock are fully customizable, they can be adapted based on the sensor's dynamic range and series resistance.

In some embodiments, it is desired that each sampling period, as defined by the Tx clock, is greater than ten times the RC time constant of $C_m$, specified by the reference manual to obtain a more useful measurement. The modulator clock defines the resolution of the digital signal which is normally set to a maximum 50 MHz.

The measured data are processed inside the BLD54 and sent to an external receiver via the Bluetooth-Low-Energy (BLE) module. Since these functionalities are integrated into a single chip, the final readout electronics 44 size in such embodiments may be on the order of 24 mm×19 mm. The overall power consumption of readout electronics 44 may e lower than 20 mW. When connected to a 400 mAh battery, a smart roller 10 can continuously run for 8 hours.

Raw Count to Capacitance Conversion

When using the BLD54, the capacitance measurement is given in $Rawcount_{component}$ This is an integer value stored in a 32 bit register. Integer values are much less processor intensive than floating points, such as a real capacitance value. To convert $Rawcount_{component}$ to capacitance values, one may use the following formulas provided by BLD54's Reference Manual.

$$Rawcount_{component} = N_{max} - Rawcount_{counter} \quad (4)$$

$$N_{max} = F_{Mod} \times N_{sub} \quad (5)$$

$$C_m = \frac{Rawcount_{counter} \times IDAC - 2 \times V_{Tx}}{F_{Tx} \times N_{max}} \quad (6)$$

where: IDAC: IDAC current. $C_m$: Mutual capacitance between Tx and Rx electrodes. $V_{Tx}$: Amplitude of the Tx signal (normally 3.2V). $F_{Tx}$: Tx clock frequency. $F_{Mod}$: Modulator clock frequency. $N_{sub}$: The numbers of measurements will be summed together. Values higher than 1 have an averaging effect. $Rawcount_{component}$: Output of the counter register in FIG. 22. This is the only value that changes with $C_m$.

Our targeted value $C_m$ is obtained using equation (6). IDAC, $F_{mod}$ and $F_{Tx}$ are explained in previous section. $N_{sub}$ is the number of measurement that will be summed together. Increasing this number increases the averaging effect while reducing the sampling rate.

While a specific architecture is described here above for sampling, processing and transmitting sensor data, other processes and architectures known in the art may be used. The circuits, components and calculations may be adjusted to use known methods and structures.

Measuring methods that can convert mutual and self-capacitance to analog or digital signals may be suitable for this application. These may include the three main types of existing capacitance measurement methods: AC impedance-based, DC charging/discharging-based, and oscillator-based systems. In an AC impedance-based method, capacitance is extracted from the complex impedance and frequency response of the system under test. Common measurement schemes that embody an impedance-based approach are vector network analyzers, impedance analyzers and synchronous demodulation-based circuits. The charge-based measurement method considers the measured capacitor as a charge bank and a process is applied to count the stored charge in the capacitors. Examples of measurement processes that employ this approach are capacitance to pulse converters, capacitance to voltage converters, and iterative delay discharge chains. An oscillator-based design approach uses the properties of an LCR resonance circuit to measure capacitance. The change in capacitance will affect the LCR oscillation frequency. Texas Instruments™ capacitance to digital convertor, the FDC2212, is an embodiment of this measurement technique. These and other methods may be applied to convert mutual and self-capacitance to analog or digital signals for processing and/or transmission in readout electronics 44.

In some embodiments, readout electronics 44 are configured to selectively sample sensors expected to be in contact with a surface or near the point of contact, such as the nip point (contact region) and its surrounding region in AFP applications. Reducing the sampled sensors to a subset in the region around contact may provide efficiency benefits by applying a limited sampling rate preferentially to sensor elements 18 in the sensor array 16 which are anticipated to provide useful information and may also permit increased density of sensing elements 18 (taxels 19) for a given limited sampling rate. For example, in one such embodiment the processor may identify a sensor 18 that is recording a relative maximum pressure measurement during a given time period and use that location and an expected or calculated rate of rotation of the smart roller to identify successive regions of the smart roller 10 to sample during a sequence of successive time periods. In some embodiments, readout electronics 44 may identify a threshold circumferential range in or around a measured or estimated region of contact. This threshold circumferential range may comprise a dynamic volume or area in or around the determined or estimated region of contact. For example, if the region of contact was determined (e.g. by a processor in readout electronics 44 with the possible assistance of a suitably configured sensor) to be an circumferential region of the exterior surface of the exterior annular cylinder portion 12 defined by an arc of 15° and extending across the axial length of exterior annular cylinder portion 12, then a threshold circumferential range might comprise a region of the exterior of the exterior annular cylinder portion 12 defined by an arc of 30° and extending across the axial length of the exterior annular cylinder portion 12, centered on the region of contact. In another example, if the region of contact was determined to be an area defined by an arc of 30° and extending across the axial length of exterior annular cylinder portion 12, the threshold circumferential range might comprise an area of the exterior of the exterior annular cylinder portion 12 defined by an arc of 30° and extending across the axial length of exterior annular cylinder portion 12, and centered at the center of the current region of contact or in front of the center of the current region of contact. The threshold circumferential range may identify a subset of the independently sampleable sensor elements to be selectively sampled by readout electronics 44. In a subsequent time step, th readout electronics 44 may selectively sample sensor elements 18 that are fully or partially contained in the currently defined threshold circumferential range with respect to the updated region of contact. Readout electronics 44 may then use data from that time step and prior time steps to update the measured or estimated region of contact and update the threshold circumferential range for a subsequent time step.

In some embodiments, the smart roller 10 may be configured to dynamically determine or estimate a region of contact and then control readout electronics 44 to selectively sample sensor elements 18 at sensor locations within a threshold circumferential range in or around the determined or estimated region of contact through the process of rolling the smart roller. Subsequent measurements from the selectively sampled sensor elements 18 may be used to recalculate the determined or estimated region of contact and thereby identify a new subset of sensor elements 18 to be sampled within the updated threshold circumferential range. Since, in various embodiments, sensor array 16 of sensor elements 18 extends circumferentially around all or substantially all of smart roller 10, smart roller 10 may repeat this process many times in a single rotation of smart roller 10.

Roller Fabrication

Smart roller 10 generally comprises an exterior annular cylindrical portion 12 on which or in which (e.g. in a volume of which) an array of sensors 16 is embedded or otherwise disposed. The fabrication of these elements may be achieved by a variety of processes. In some embodiments one or more of outer electrodes 50 and inner electrodes 52 of a sensor array 16 of capacitive sensors 18 may be cast into elastic dielectric 56 in a mould. In some other embodiments, one or more of electrodes 50, 52 can be bonded to a prefabricated dielectric layer. In various embodiments, sensor array 16 is imbedded in a volume of the exterior annular cylinder portion 12, for example by being fully encapsulated in a layer of elastic dielectric material 56. Some other additional or alternative methods for fabrication of exterior annular cylindrical portion 12 include injection molding or stamping of dielectric layers, 3D printing of a dielectric layer, printing or spraying of outer electrodes 50 and/or inner electrodes 52 and their connections, roll-to-roll printing of parts, and machining (e.g. mechanical or laser machining) or etching of individual layers, and/or the like.

Measurement of force and shear are performed using capacitive sensors, which may be similar to approaches described previously, such as in U.S. patent Ser. No. 10/401,241, US Pub. No. 2018/0246594, and/or US Pub. No. 2018/0238716; each of these applications and patents are incorporated herein by reference. In some embodiments, stretchable electrodes may be patterned onto a dielectric roller surface. These electrodes may be made according to methods known in the art—for example mixing of carbon black with elastomers, which may then be patterned by masking, screen printing, doctor blading, moulding or other processes. A layer of elastomer may then be applied to coat the electrodes, followed by another coating of patterned electrodes. Application of force to the elastomer surface leads to the relative displacement of the electrodes—with normal forces pushing the two electrode layers closer together, increasing capacitance in proportion to force, and shear forces laterally displacing the electrodes with respect to each other, again in proportion to the applied force. Measuring changes in capacitance at multiple positions across the roller surface enables force feedback.

In another embodiment, a flexible polymer sheet is patterned with metal electrodes. These electrodes can be produced in the same or a similar manner to those produced for printed circuit boards, and flexible printed circuit boards in particular. This electrode array is placed on the surface of a roller, either directly on the hard inner core of the roller, onto a rubber layer, or molded into the soft portion of the roller. On the outer surface of the roller is a dielectric layer. This layer may typically be made of a patterned elastomer. Above the dielectric is a second electrode layer, containing electrodes that may be stiff or soft (e.g. conductive elastomer). The spacing between the two electrodes is altered when forces are applied (such as shear, normal or torsional forces). This change in spacing is recorded as a change in capacitance, and used to estimate roller displacement and force. A third elastomer layer may encapsulate the inner layers. In some embodiments, a further layer of material may be applied as shielding. This outer shielding layer may assist in reducing the likelihood of outer electrodes 50 developing a short circuit. This outer shielding layer may comprise another layer of elastomer.

In some embodiments, a third electrode layer may be separated from the second layer by the outer shielding layer. This third electrode layer may comprise stretchable electrodes of types similar to those described with respect to outer electrode 50. This third electrode layer may cover the entire surface of the device or only cover parts of the device. It may provide shielding of the lower electrode layers (outer electrodes 50 and inner electrode 52). It may be encapsulated with another further layer of elastomer to provide electrical isolation. In some embodiments coiled wires or coiled conducting filaments such as silver coated nylon may be used as electrodes in the third electrode layer. These may also be put in other conformations such as zig-zags to make them more stretchable. In some embodiments, the third electrode layer may comprise metal films or straight metal wires. Metal films or straight metal wires may be more applicable in cases where strains are small.

Readout electronics 44 may also be embedded within roller 10 as described elsewhere herein. Readout electronics 44 enable measurement of capacitance at one or more locations on the surface of roller 10 and communication of measurements or processed data to components external to roller 10.

In an exemplary embodiment, roller 10 comprises: a inner electrodes 52 of a flexible capacitive sensor in the form of a printed circuit board, onto which the dielectric and the stretchable outer electrodes 50, the remaining elastic material of exterior annular cylindrical portion 12. Readout electronics 44 may be housed in a compartment defined at least in part by interior portion 14.

In some embodiments, the remaining elastic material of exterior annular cylindrical portion 12 is 3D printable. For example, elastomeric material may be printed with ABS plastic on an AnyCubic Chiron™ 3D printer. When possible, the fabrication process uses commercially available tools such as laser cutting, 3D printing, and external PCB sourcing to enable reproducibility and scaling of production.

Sensor Fabrication

Applications in cylindrical structures such as rollers may comprise arrays of sensors that interface with the surrounding environment—the road, in the case of tires, belt in the case of conveyor belts, or the part being transported or manufactured, as in the case of roll-to-roll or carbon fibre composite manufacture. Once the materials and their properties have been decided, considerations in manufacturing include, without limitation: bonding between layers of material in exterior annular cylindrical portion 12 and bonding between exterior annular cylindrical portion 12 and rigid interior portion 14. Other considerations may include preventing delamination, lift off and false reading; patterning of the electrodes 50, 52; and, for capacitive sensors 18, patterning of the elastic dielectric 56; and encapsulation. A robust connection of sensor array 16 to the electronic circuit (e.g. readout electronics 44) is also desired. Bonding of layers of materials in exterior annular cylindrical portion 12 and/or exterior annular cylindrical portion 12 to rigid interior portion 14 can be achieved by thermal or chemical bonding techniques. The bonding of various layers, including of exterior annular cylinder portion 12 to rigid interior portion 14, may cause rigid interior portion 14 to move unitarily with exterior annular cylinder portion 12 (e.g. so that rigid interior portion 14 and exterior annular cylinder portion 12 rotate with one another about axis 21 of roller 10). In thermal approaches, adjacent layers are melted or sintered together. Chemical bonding involves co-valent or non-co-valent (hydrogen, ionic, van der Waal's or other) linking. An adhesive layer is often used, or a common solvent for the two surfaces in question is applied, enabling the two materials being bonded to intermix. Pre-stress can also be applied, enabling mechanical contact to be maintained. Patterning of the electrodes and dielectrics can be done by molding, 2D printing, 3D printing, photopatterning, cutting, patterning and etching and/or the like. Electrodes, especially those close to rigid interior portion 14, can be made on a printed circuit board. Resolution of the patterning of sensors 18 may be chosen such that the circumferential dimension of the taxel 19 is significantly smaller than the circumferential dimension of the contact region (e.g. nip point or region of contact of the roller with a target surface), enable resolution of force and displacement variations across the contact region. Encapsulation can be done by spray coating, dip coating, lamination, and bonding. In roller or tire production, the entire pre-formed array and circuit could be encapsulated into the rubber elastomer. The fabrication of the outer layers also need not be limited to elastomer materials—stiffer materials can be patterned to form flexures and other mechanical structures that enable compression and bending.

In some embodiments, each capacitive sensor element 18 comprises two radially overlapping conducting surfaces (where two objects are said to overlap in a direction if a line oriented in that direction passes through both objects)—an outer electrode 50 and an inner electrode 52. The conductive surfaces can be made from conductive elastomers or conventional conductive material such as metal. In some embodiments, outer electrode 50 is made from a conductive elastomer and inner electrode 50 is made from a flexible PCB. The arrangement of the capacitor plates (electrodes) impacts sensor performance. In some embodiments, outer electrodes 50 comprise strips of conductive fabric. In some such embodiments, the strips of conductive fabric may be cast into moulds of dielectric material. In an exemplary embodiment of a smart roller 10 in an AFP application, the two main steps for sensor layer fabrication are laser cutting the conductive fabric for outer electrodes 50 and molding the dielectric layer. These are depicted in the example fabrication technique of FIGS. 23A-23D.

Figure 23A:
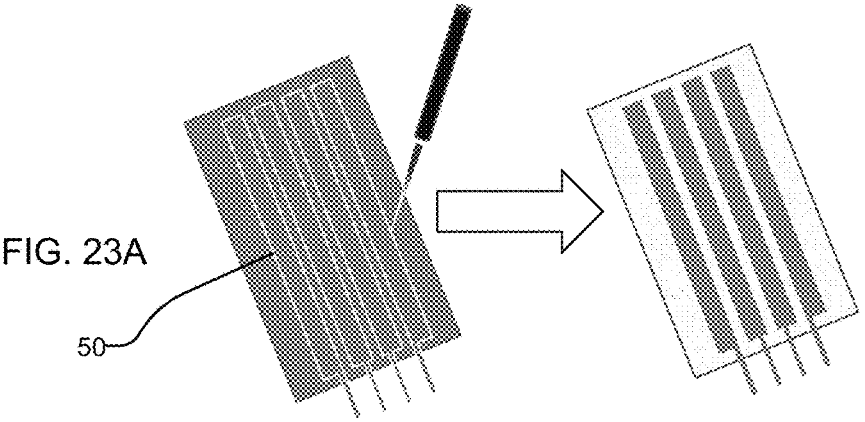
FIG. 23A-23D depicts steps 1-4, respectively of a method for fabricating outer electrodes according to an exemplary embodiment.
Figure 23B:
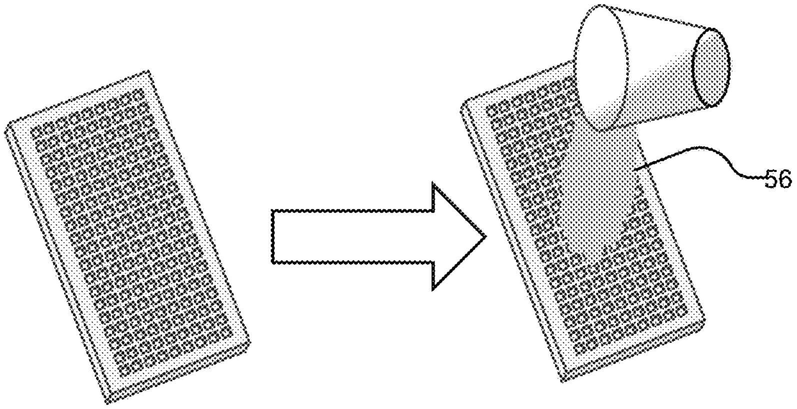

In this exemplary embodiment, outer electrodes 50 are prepared by laser cutting the conductive fabric using 30% power and 40% speed on the Universal Versa Laser VLS 4.60, as shown in in FIG. 23A. Transparency sheets may be flattened and laminated on both sides at 110 °C using the ProLam™ Photo 6 Roller Pouch Laminator before laser cutting.

Elastic dielectric 56 may comprise platinum-cured silicone (Smooth-On Dragon Skin™ Shore 10 A or Shore 20 A). The monomer and crosslinker of the silicone may be mixed by hand or in any other suitable manner and degassed in a vacuum chamber. The mixture was then poured into the mold (FIG. 23B), which is 3D printed with ABS plastic on the AnyCubic Chiron™ 3D printer.

Figure 23C:
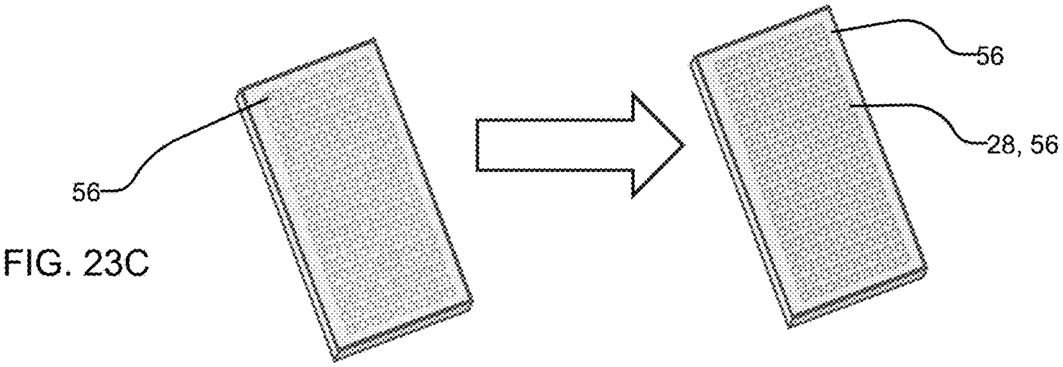
Figure 23D:
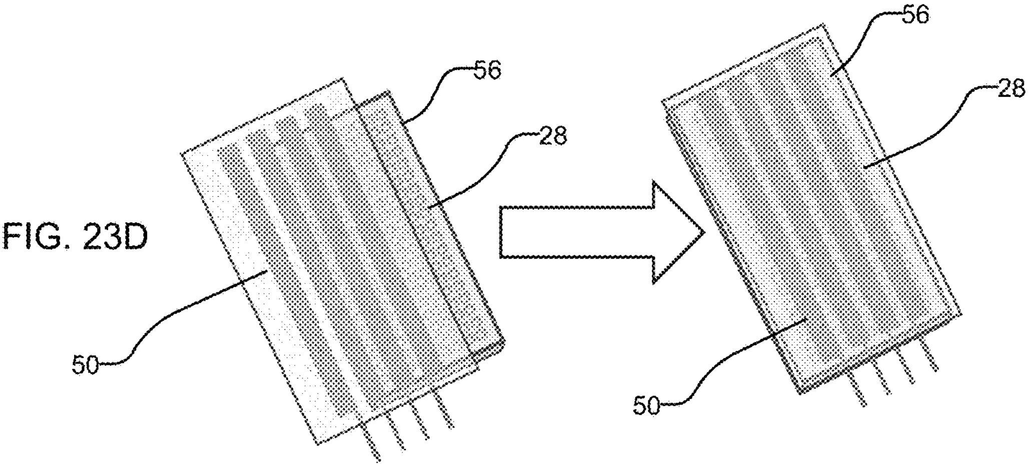
Figure 24A:
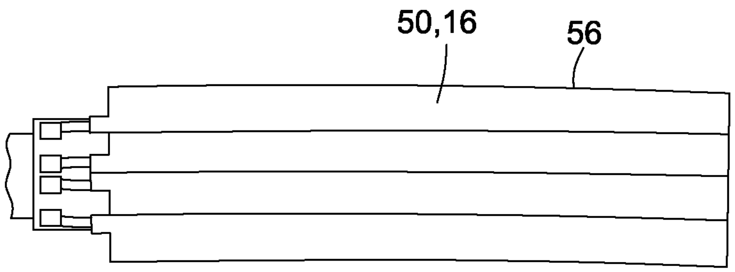
FIG. 24A is a schematic representation of a conductive fabric strip used as an outer electrode in an exemplary embodiment.
Figure 24B:
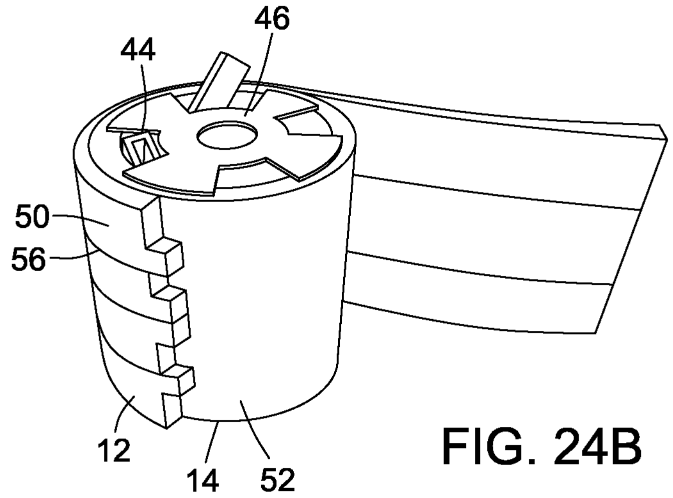
FIG. 24B is a perspective view of the assembly of the printed circuit board of FIG. 22 partially wrapped onto a rigid interior portion.
Figure 24C:
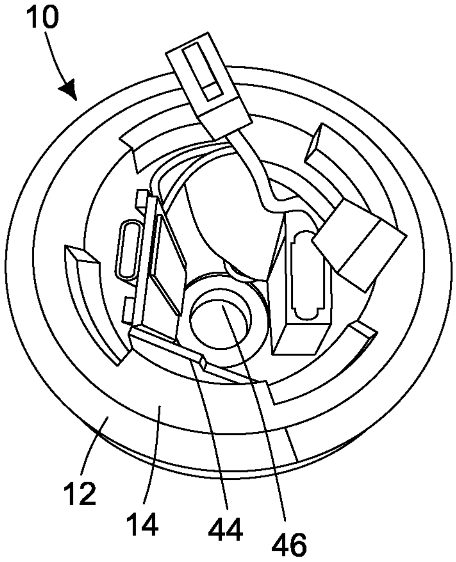
FIG. 24C is a front view of an embodiment of a smart roller depicting readout electronics partially inserted into a compartment of a rigid interior portion.
Figure 24D:
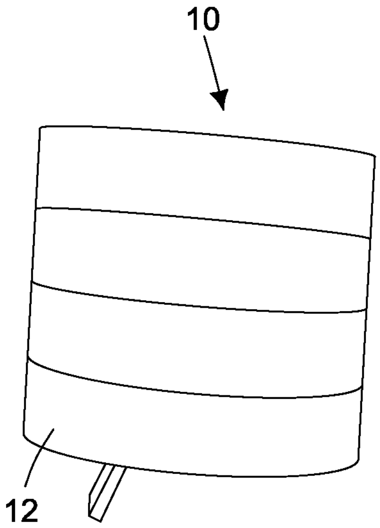
FIG. 24D depicts an assembled smart roller according to the embodiment of FIGS. 24A-24C.

In FIG. 23C of the illustrated embodiment, the four conductive fabric strips in the sensor layer of outer electrode 50 were aligned on and taped to a large transparency sheet. In FIG. 23D of the illustrated embodiment, the side of the transparency sheet with the conductive fabric is pressed onto the uncured dielectric silicone layer while it is still in the mold. The mold is then placed into a vacuum oven and then cured at 60 °C for 1 hour. Elastic dielectric layer 56, including the bonded outer electrodes 50, was removed from the mould and cooled down to room temperature before roller assembly.

Roller Assembly

The roller assembly process of an exemplary embodiment is illustrated in FIGS. 24A-24D. The sensor layer and PCB layer are first bonded together using RTV silicone (Silicone Solutions SS6004VF+) to produce the sensor shown in step 1, FIG. 24A. In step 2, FIG. 24B, the exterior annular cylindrical portion is wrapped around the rigid interior portion. In step 3, FIG. 24C, the battery connector is soldered onto the readout circuit, which is then inserted into the roller and connected to the sensor inner electrodes via a 40-pin FFC and the wires are managed. The terminal of the flexible PCB is connected to the master board. Because the PCB has a layer of adhesive on the back, the sensor is simply wrapped around the 3D-printed roller shell with the adhesive facing the shell. Finally, the roller is inspected to ensure that the PCB layer is bonded well with the shell to form the soft outer layer of the roller, as shown in step 4, FIG. 24D.

Operation of a Smart Roller

A smart roller 10 may permit an in-situ process monitoring system that predicts layup outcomes using local processing conditions as the deposition process is carried out, which can eventually reduce the need to perform costly ex-situ inspections post-layup. The ability of smart roller 10 to measure localized pressure distribution of complex surfaces and provide real-time feedback can also help detect signatures of defects as well as the underlying substrate geometry.

Figure 25A:
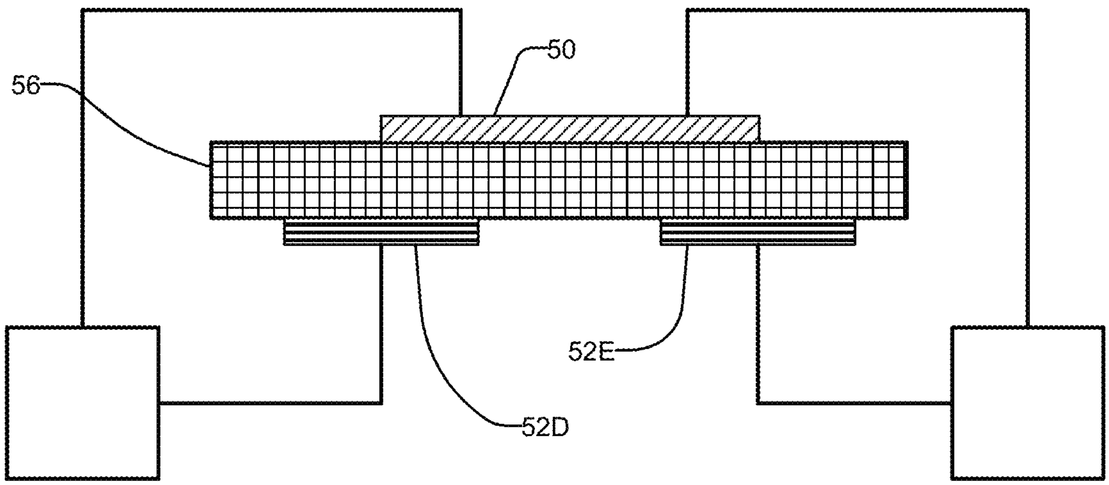
FIG. 25A depicts a schematic view of an implementation of a capacitive sensor.

Under normal operation, smart roller 10 experiences force and deformation. The deformations may be translated into mutual capacitance (capacitance between two electrodes). The change in capacitance may be analyzed to produce pressure, sheer, torque, tilt, and distance data. Mutual capacitance can be obtained by establishing an electric field between two conductive surfaces. Change in overlap area, separation distance, electrical permittivity, and the presence of a sink for the electric field (e.g. ground) will alter the field strength between the two conductive surfaces, thus causing capacitance change. FIG. 25A represents one type of implementation that takes advantage of the property of mutual capacitance.

Figure 25B:
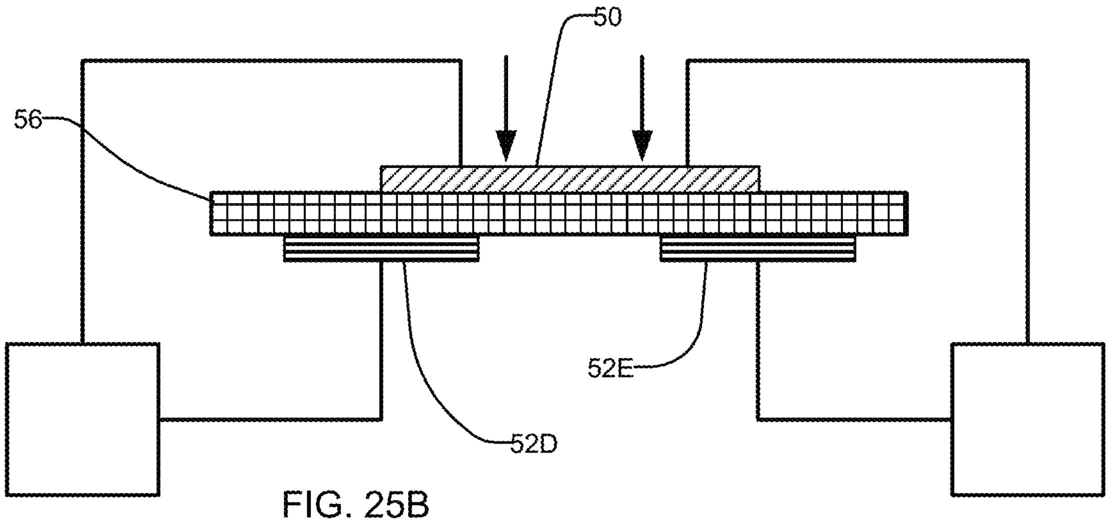
FIG. 25B depicts a schematic view of the FIG. 25A capacitive sensor detecting compressive force.
Figure 25C:
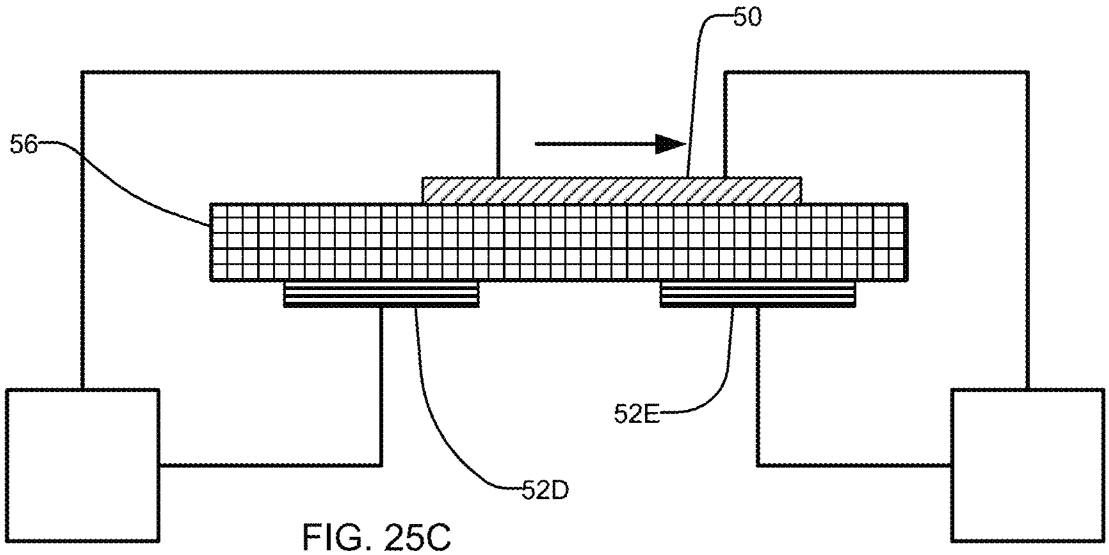
FIG. 25C depicts a schematic view of the FIG. 25A capacitive sensor detecting a shear force.

As regions of roller 10 are compressed and stretch, the radial spacing between outer electrodes 50 and inner electrodes 52 will change. An example simplified configuration is shown in FIG. 25A, with three electrodes shown in cross-section, two inner electrodes 52D, 52E, and one outer electrode 50 with intervening elastic dielectric 56. Compressive normal forces on roller 10 will bring outer electrode 50 closer to inner electrodes 52D, 52E and thereby increase capacitance and displace elastic dielectric material 56, as illustrated in FIG. 25B. This increase in capacitance is measured with readout electronics 44 connected to outer electrodes 50 and inner electrodes 52D, 52E. Readout electronics 44 may be powered externally, such as through the roller bearings and the robot arm in an AFP process, using batteries in the roller, by RF power, and/or even using generation from capacitive generators or other generators built into the exterior annular cylindrical portion 12 of smart roller 10 generating power as smart roller 10 is deformed. FIG. 25C shows the case of an applied shear, in which change in overlap between outer electrode 50 and inner electrode 52E leads to an increase in capacitance between outer electrode 50 and inner electrode 52E on the right side of the illustrated view, and a decrease in the inner electrode 52D on the left side of the illustrated view. This and other capacitor geometries known in the art can be used to measure shear. In some cases, modifying the dielectric between the electrodes to make it more compliant or otherwise affect the sensitivity may be useful to optimize performance for the range of forces that are commonly encountered in any particular application.

Self-capacitance (capacitance between electrode and ground) may also be used for distance/proximity or dielectric measurement of the workpiece. In AFP applications, the conductivity of the carbon fibres of the prepreg tow may allow them to act like an external electrode, which can either work as a grounded electrode (low frequencies, large area)

or a floating electrode (high frequency or small area). Accordingly, the self-capacitance of the outer electrodes 50 against the prepreg tow may allow the system to measure a distance/proximity or dielectric measurement of the of the workpiece. In some embodiments, a proximity/distance measurement of two or more outer electrodes 50 detecting the prepreg tow outside of the nip point (contact region) may be processed to identify the relative alignment of the prepreg tow to a target zone in the nip point. The proximity/distance measurements may be combined with pressure detection at the nip point to identify an overall alignment of the pre-preg tow.

As another example, a self-capacitance measurement of distance/proximity may be used in a smart roller 10 used in a wheel or tire application. In such an embodiment, the outer electrodes of smart roller 10 may be embedded within smart roller 10 underneath an outer layer of elastomer material (not shown). The smart roller 10 may detect wear of the outer layer of elastomer material using the self capacitance of outer electrodes 50 relative to the external surface. As the outer layer of elastomer material wears thin, the distance between the outer electrodes 50 and the external surface decreases, and there is a corresponding increase of self-capacitance of the outer electrodes relative to the external surface.

Mutual capacitance can also be used to detect proximity/distance, for example by using two electrodes placed side by side, with the fields between the two extending out into the workpiece. In general, a multilayer set of electrodes may be appropriate for enabling both proximity/dielectric as well as normal/shear/torque measurements. Outside of AFP applications, the self-capacitance of the electrodes can be used to detect proximity of a workpiece, tool or other target surface, especially where the workpiece, tool or other target surface comprises a conductive material.

Characterization of the Sensor

Primary characterization of sensors 18 of sensor array 16 may be performed to relate force and/or displacement to changes in sensor output (e.g. change in resistance, capacitance, generated voltage or other property). In some embodiments, secondary characterization may be performed on the sensors to relate the change in capacitance or other signals to tack, bonding, surface wetting, contact area, skidding, friction, surface coating, degree of curing and other properties relevant to the application of interest. These secondary characterization properties relate to traction, part quality, efficiency and other manufacturing or transportation metrics. Primary characterization can be performed both by individually applying forces or displacements to each taxel, or doing this simultaneously across multiple taxels. Sensitivity, cross-talk, repeatability, variability between taxels, non-linearity, time dependence, creep, relaxation and noise level are all relevant measurements during characterization, and multiple approaches characterization of a sensor may be applied as known in the art. Force and displacement may be characterized in three axes (radial, circumferential and axial).

Figure 26:
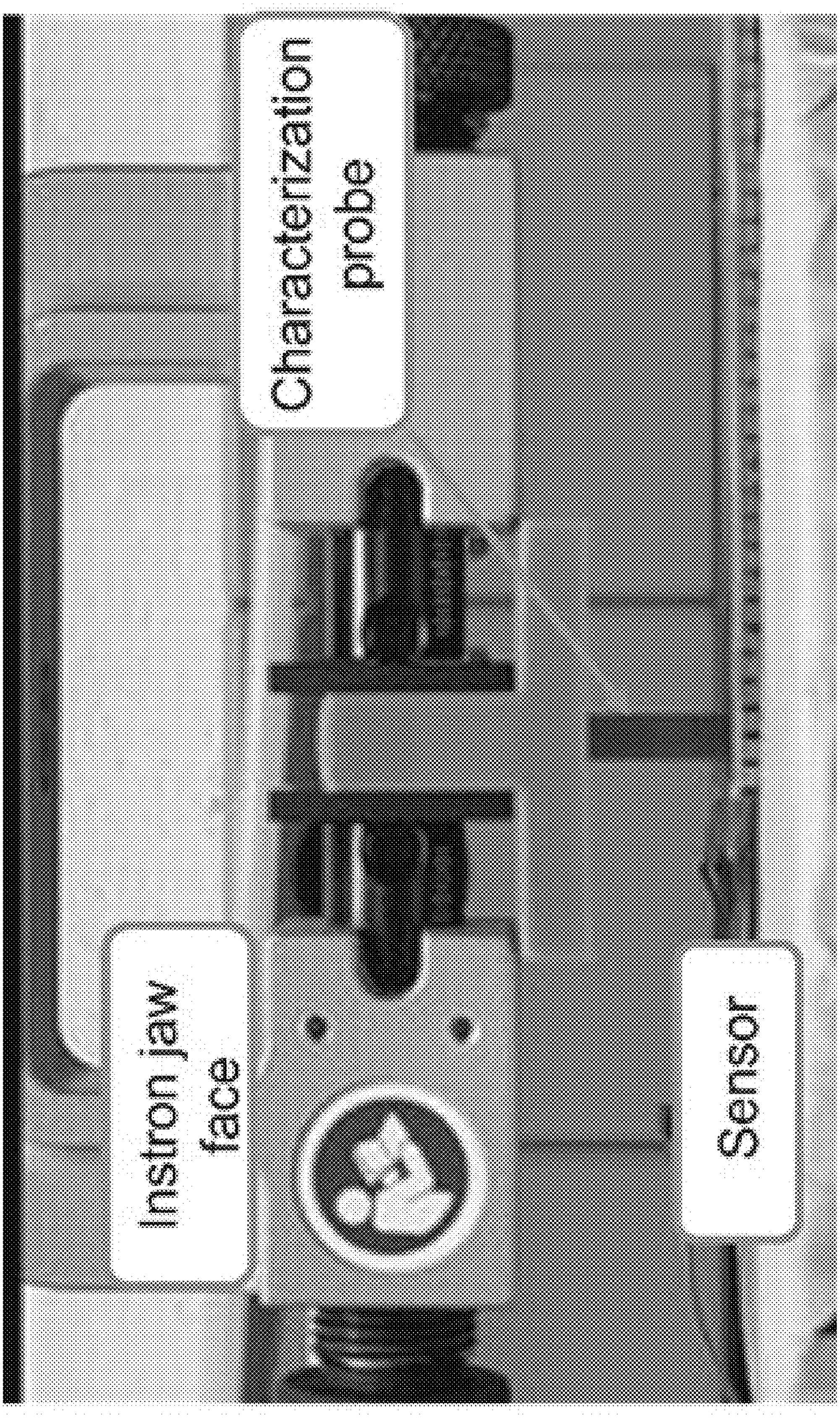
FIG. 26 is a photo of characterization setup for an exemplary sensor according to an embodiment.

An exemplary embodiment of sensor array 16 was characterized using an Instron™ Universal Testing Machine (model 5969), shown in FIG. 26, prior to assembly on roller 10. The characterization probe was a 3D-printed, 5 mm by 8 mm rectangular head, which is equal to the size of taxels 19 on sensor array 16. The Instron increases the displacement at 0.1 mm/s until a maximum force of 40 N is reached, corresponding to a compressive stress of 1 MPa. The readout circuit records the change in capacitance of the sensor. The change in capacitance and force resulting from the applied displacement are recorded, as plotted in FIGS. 27 and 28. The displacement is scaled by dielectric thickness to obtain an average strain, while the force is divided by the contact area to obtain stress applied to the top of the sensor. The stress will be higher in the pillars due to the smaller total cross-sectional area.

Figure 27:
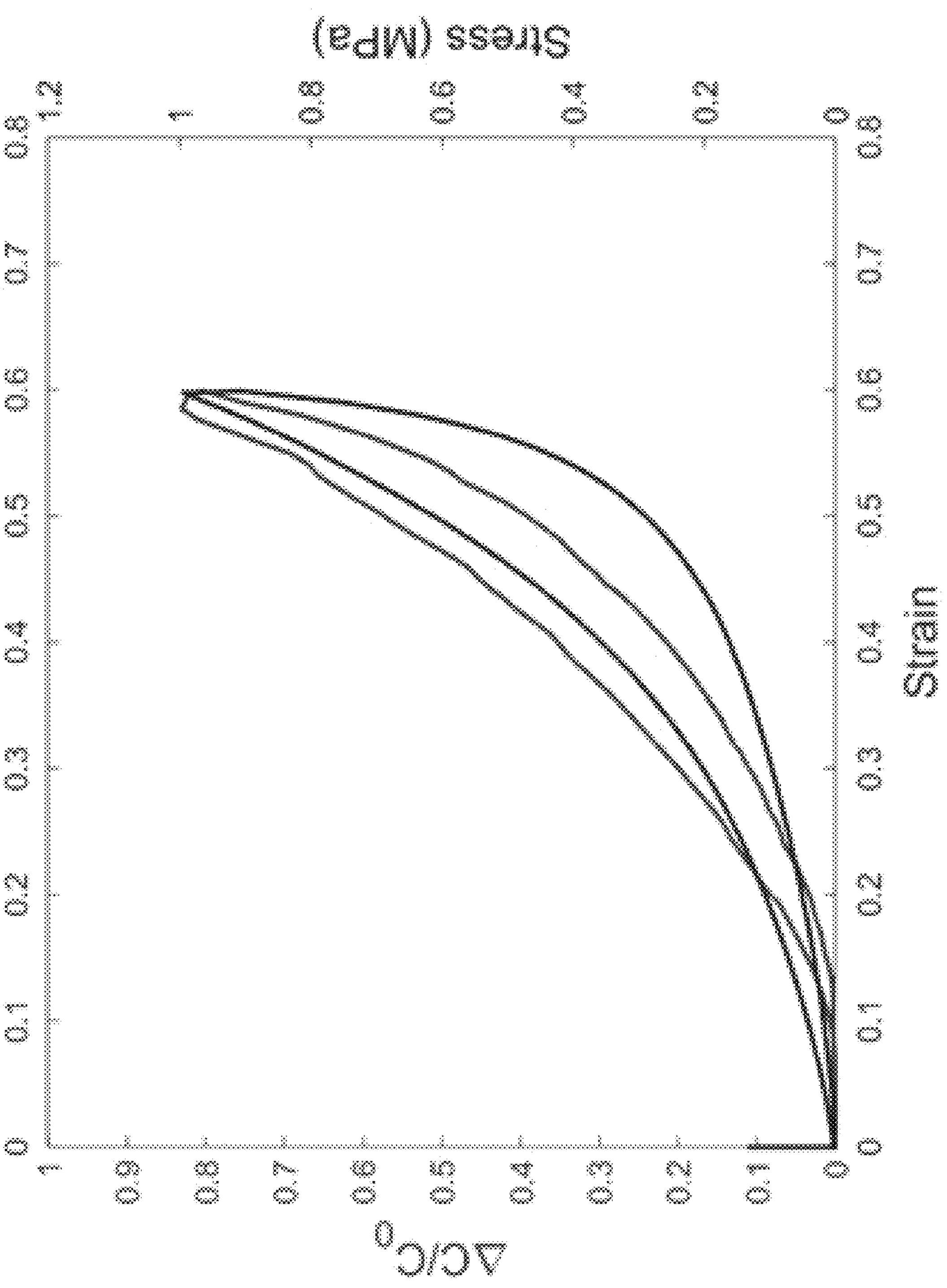
FIG. 27 depicts the results of the characterization of the FIG. 26 sensor showing change in capacitance relative to strain.
Figure 28:
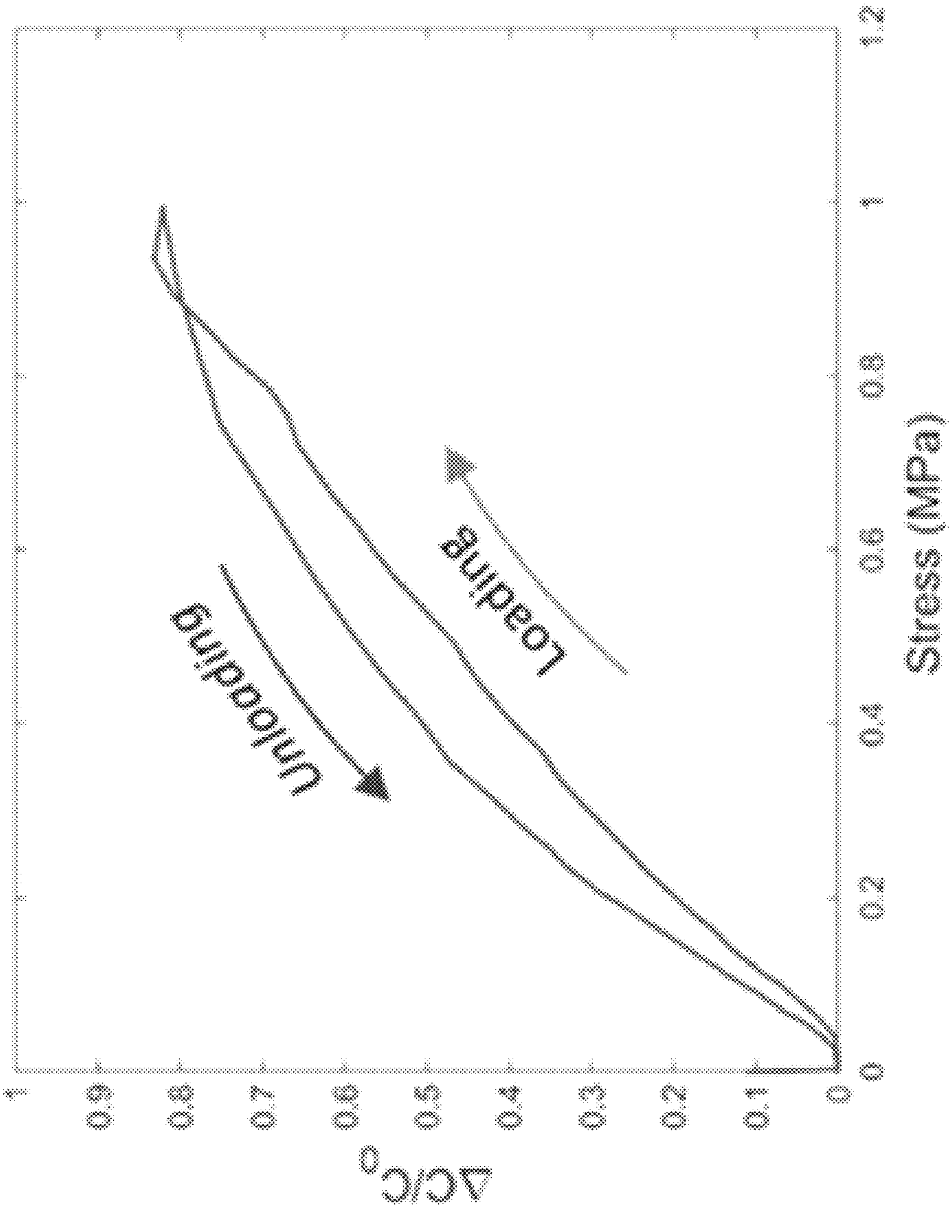
FIG. 28 depicts the results of the characterization of the FIG. 26 sensor showing change in capacitance relative to stress.

The characterization curves are illustrated in FIGS. 27 and 28. At the maximum stress, each taxel 19 was compressed by 70%, and the sensor reported a 1.07 pF capacitance change. The finite element simulation in FIGS. 15-20 showed that even larger stresses and strains occurred locally at the edges of pillars 28. In this high-strain, low-speed regime, it is not surprising that nonlinear and viscoelastic behaviour is observed, including the apparent hysteresis. The relative change in capacitance vs. stress is shown in FIG. 28, which shows a hysteresis of about 15%. If higher accuracy is desired, it may be possible to model and compensate for the viscoelastic response or make use of a stiffer elastomer. When rapid deformation is applied, the hysteresis is dramatically reduced, as shown in FIG. 28. This lower hysteresis is expected when roller 10 rotating relatively quickly. Due to the discrepancies between readings among the different taxels 19, taxels 19 may be individually calibrated before application.

Thermal Stability

During the AFP process, the workpiece is often heated to between 25 °C to 50 °C. In some embodiments it is desired that the smart roller 10 have temperature stability at temperatures up to and exceeding 50 °C to deliver accurate measurements within expected operating temperature range.

Figure 29:
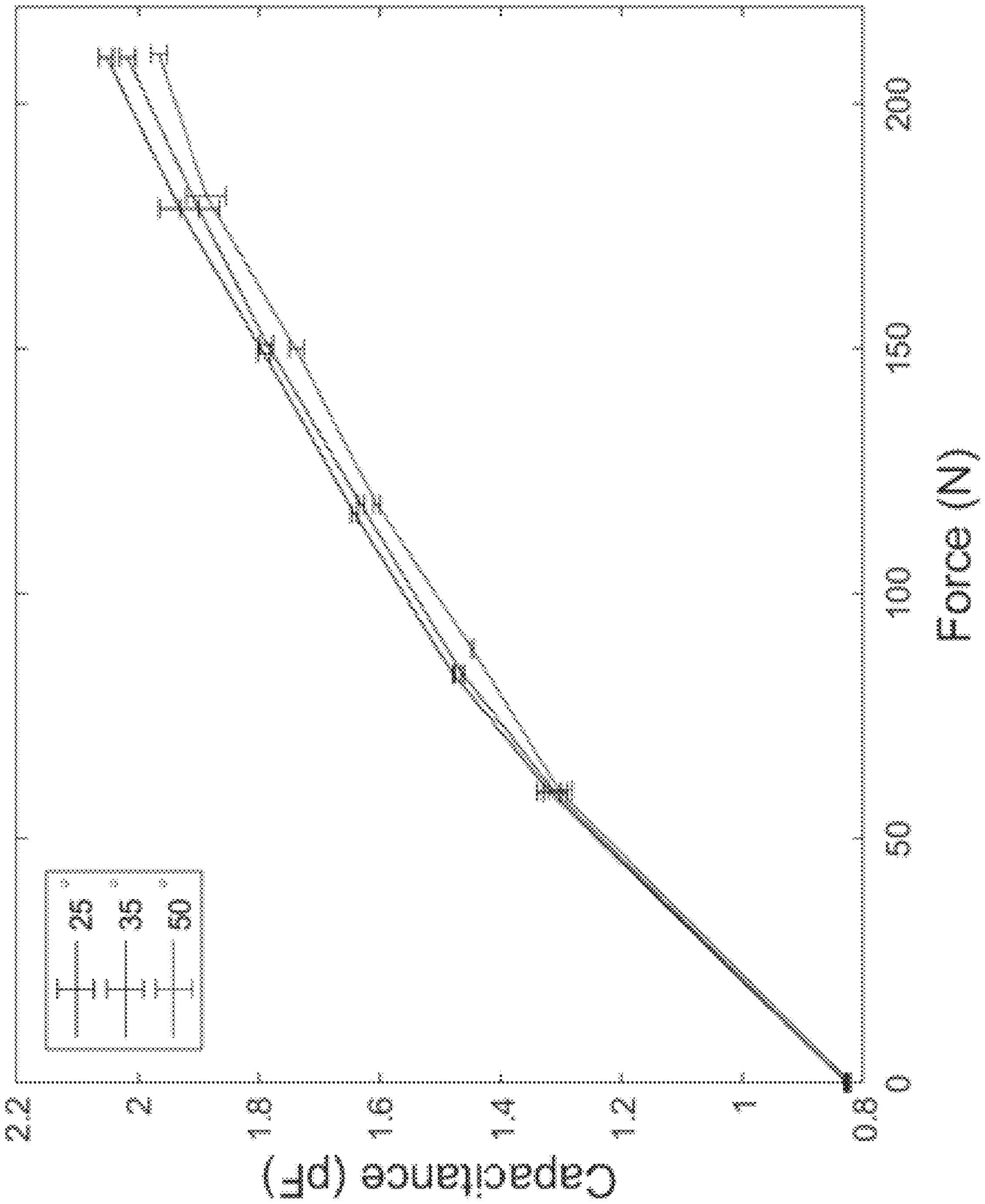
FIG. 29 depicts capacitance measurements of the FIG. 26 sensor, plotted against force at three discrete temperatures.
Figure 30A:
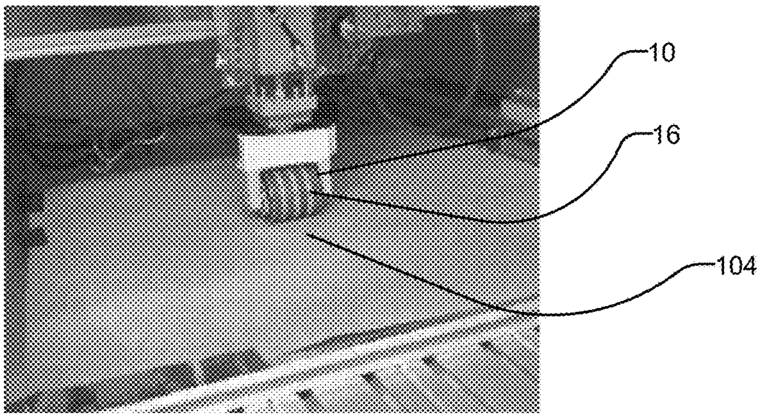
FIGS. 30A through 30D are thermal images showing the temperature observed during the characterization process, the data of which is shown in FIG. 29.
Figure 30B:
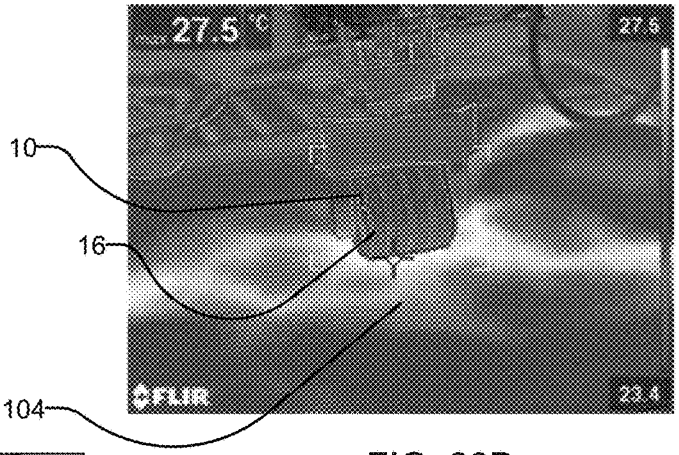
Figure 30C:
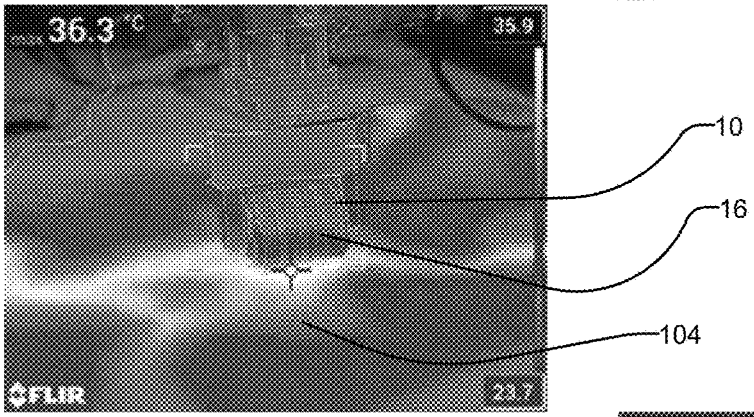
Figure 30D:
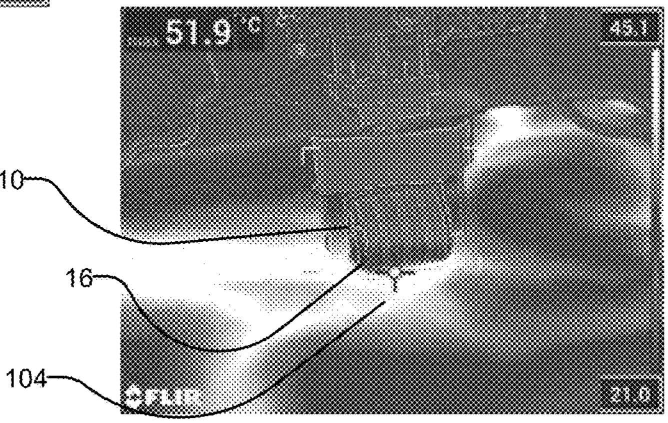

The experimental results in FIG. 29 of a smart roller 10 according to an exemplary embodiment show capacitance measurement versus force at 25 °C, 35 °C and 50 °C. The smart roller's capacitance measurement vs force at different temperatures. All measurements are taken after increasing force to prevent inconsistency introduced by hysteresis. The maximum measured error is 5% which occurs at 200N between 25 °C and 50 °C. The length of the error bars is the standard deviation of 10 measurements under the same condition. The experiment was performed by holding the temperature of workpiece and the temperature of the contact point of the roller constant at 25 °C, 35 °C, and 50 °C Thermal images in FIGS. 30A through 30D confirm the temperature. The roller is pressed against a flat workpiece while the force is then incrementally increased from 0 to 200N with an increment of 20 N. The force is increased instead of decreased to prevent the hysteresis effect from interfering with the data.

The maximum measured error is 5%, which occurs at 200 N. This variation may occur because silicone is known to change its dimension and dielectric constant with temperature. When the temperature is increased from 25 °C to 50 °C, the dielectric constant of PDMS decreases by 2.1% while its dimension expands by 1%. For the smart roller, volume expansion and a decrease in dielectric constant both reduce capacitance. As a result, the roller would expect to register a slight decrease in capacitance at higher temperatures. This change is also seen in the value of C_o, which drops by 4.1% under the same applied force.

The thermal images in FIGS. 30A-30D show that the heat distribution of the workpiece was not uniform. The heatmap range in every image is adjusted to fit the temperature spectrum. This is because a paper sheet is inserted below the roller to prevent infrared reflections from the metallic workpiece. This does not affect the result since the pressure applied by the roller ensured equal temperature at the roller's contact point. For every experiment in FIGS. 30A-

30D, one can observe that the contact point of the roller is at the same temperature as the workpiece.

Smart Roller Applications

Pattern Detection

In AFP processing, it may be desirable to detect the location and shape of defects or features in the substrate over which prepreg tows are deposited. If untreated, layup defects can create resin-rich areas and/or porous areas, as well as deviations in fibre orientation which ultimately have a detrimental effect on mechanical properties of final cured parts, such as tensile, compressive and interlaminar properties.

One application of a smart AFP rollers is detecting the underlying geometry over which prepreg tows are dispensed. Any defect or geometric feature that constitutes a height difference with respect to the base geometry creates local variations in the distribution of compaction pressure. This difference can be measured by smart roller 10. The variations in the local pressure can be used to detect the underlying surface shape and identify differences in applied pressure, which lead to variations in bonding or tack.

A smart roller 10 in a AFP process may permit real-time identification of defects in the deposition of prepreg tows. The real-time identification of defects may enable the correction of small scale defects in the layup. In the case of significant defects, the identification of issues by smart roller 10 may enable the abandonment of the object being produced, before further material is committed to its production. Since the material in prepreg tows can have significant costs per weight, early identification of errors and the resulting early correction or early abandonment can yield significant savings in the production process.

Additionally or alternatively, smart roller 10 may correct defects (e.g. in real time) by adjusting the continuing deposition of prepreg tows to account for variations in geometry of previously deposited material.

In AFP processes, smart roller 10 may also determine (e.g. infer) the tackiness of the prepreg tow in advance of the region of contact (nip point) by using detected properties of the prepreg tow as it comes into contact with the smart roller in advance of reaching the nip point. When roller 10 moves on and wants to separate from the prepreg tow, it is already in contact with, there will be some adhesion between the tow and the roller. Roller 10 may be configured to measure these adhesive forces—which will be a direct measurement of tack. Tackiness, or tack, is the stickiness of the material. A material that is too tacky may gum the system. Materials that are not tacky enough may not stick. The incoming raw material may vary in tackiness over its length. Determination of the tackiness of incoming prepreg tow may allow rapid adjustment of process conditions (e.g. heat, pressure, or positioning of the smart roller) to improve the deposition at the nip point.

In applications outside of AFP processes, smart roller 10 may permit identification of problems or changes in roller processes relevant to each application. For example, in a smart roller 10 in a paint roller application, smart roller 10 may permit identification of imperfections in the surface where a smooth surface is expected. In a further example, a smart roller 10 applied as a wheel or tire may be constructed with sensors 18 with sensitivity to shear forces, such as sensory array 16 according to FIGS. 11 and 12. A smart roller 10 according to such an embodiment may permit identification of unexpected lateral shear across the wheel or tire, indicative of a lateral acceleration.

Case Study

Figure 31:
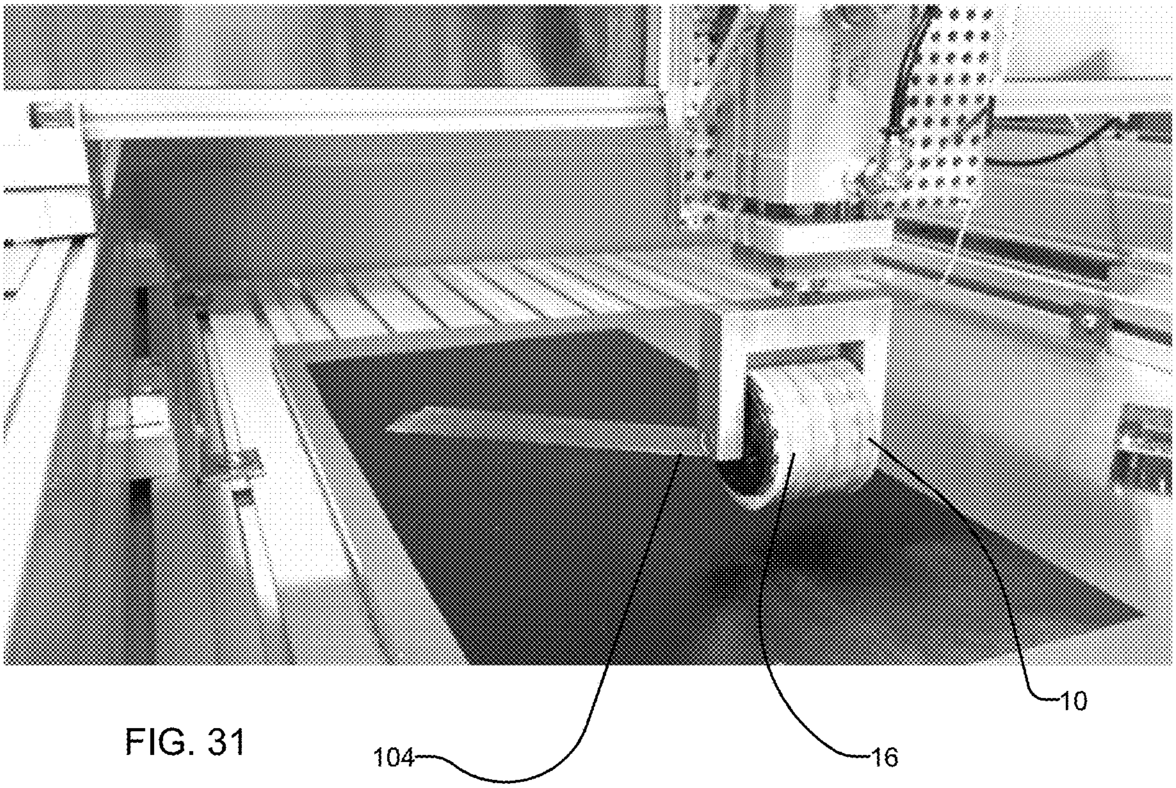
FIG. 31 is a photo of an experimental setup for demonstrating pattern detection in an AFP application.

An experimental case study was designed to demonstrate the application of an exemplary embodiment of a smart roller 10 in pattern detection in an AFP application. The roller was tested on a table-top AFP demonstrator, as shown in FIG. 31. The base layer was a single layer of AS4/8552 UD prepreg from the Hexcel Corporation. Six layers of 1-in-wide (25.4 mm), 0.2 mm thick prepreg strips were cut from the same material and were manually placed at a 45° angle with respect to the smart roller's trajectory of motion. To perform the experiments, 50 N force was applied to the smart roller, and the roller was automatically moved over the feature using the AFP demonstrator. The smart roller's response was recorded and visualized for further analysis.

FIG. 31 illustrates the pattern detection setup with the roller attached to an AFP demonstrator. The base layer comprised a single layer of UD prepreg. Six layers of 1-in-wide (25.4 mm) prepreg, with an approximate total thickness of 1.2 mm, were placed diagonally with respect to the smart roller's motion trajectory, the target surface comprised the base layer (substrate 104) and the diagonal strip for this experimental test. The roller was lowered and then moved over the target surface, resulting in the sequence of sensor responses shown in FIG. 32.

Figure 32:
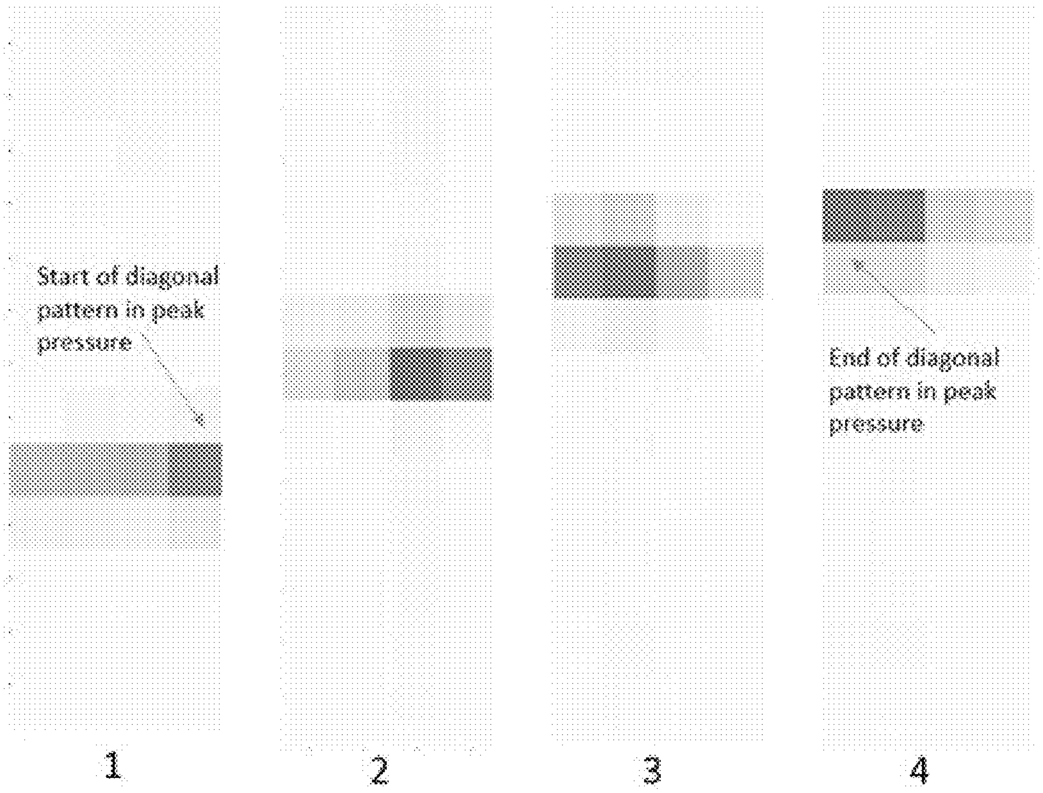
FIG. 32 is a visualization of the data resulting from the experimental setup of FIG. 31.

FIG. 32 shows a visualization of the smart roller's response as a heatmap, wherein each square corresponds to the measurements of an individual taxel 19, and the darkness of the square is proportional to the intensity of change in capacitance (corresponding to local pressure measurements), with increasing darkness therefore indicative of increased pressure. The four columns in FIG. 32 show the measurements of the taxels 19 at different time periods during the movement across the substrate 104.

It can be observed in FIG. 32 that as soon as smart roller 10 reaches the diagonally placed strip of prepregs, the right-most taxel 19 that comes into contact with the strip first measures elevated levels of capacitance change due to the height difference. As the roller moves forward, other taxels 19 come into contact with the strip of prepreg layers. In turn, they measure elevated levels of capacitance compared to the baseline value expected from a diagonal geometric pattern. The darker horizontal strip corresponds to the region of smart roller 10 in contact with the surface. When the roller first meets the diagonal strip (column 1), the rightmost taxel shows the strongest signal. As the roller proceeds over the strip, the high force taxel moves to the left (columns 2-4), enabling the ridge to be identified.

Tack Prediction

In AFP processing, prepreg tack is the primary mechanism that holds layers of composite together and resists the formation of layup defects. Tack is significantly influenced by the pressure history of the material. During AFP processing, multiple prepreg tows are deposited on tooling as a course during layup in a single pass. The existence of gaps, overlaps, and ply drops in the underlying substrate and lamination over curved and complex tooling geometries can create considerable variations in local pressure under the AFP compaction roller. These variations in local pressure can lead to differences in the bonding strength of the prepreg tows as they are deposited and can result in defects, delamination and mechanical failure.

Smart roller 10 may allow individual local pressure histories for each prepreg tow delivered in a course across the target surface to be measured and taken into account. During the process development stage, local pressure measurements can be used to estimate the resulting prepreg tack between individual prepreg tows and substrate. During manufacturing, the combination of in-situ local measurements from smart roller 10 in combination with physics-based tack models can enable the use of online process monitoring systems that continuously screen predicted tack levels as tows are deposited.

Figure 33:
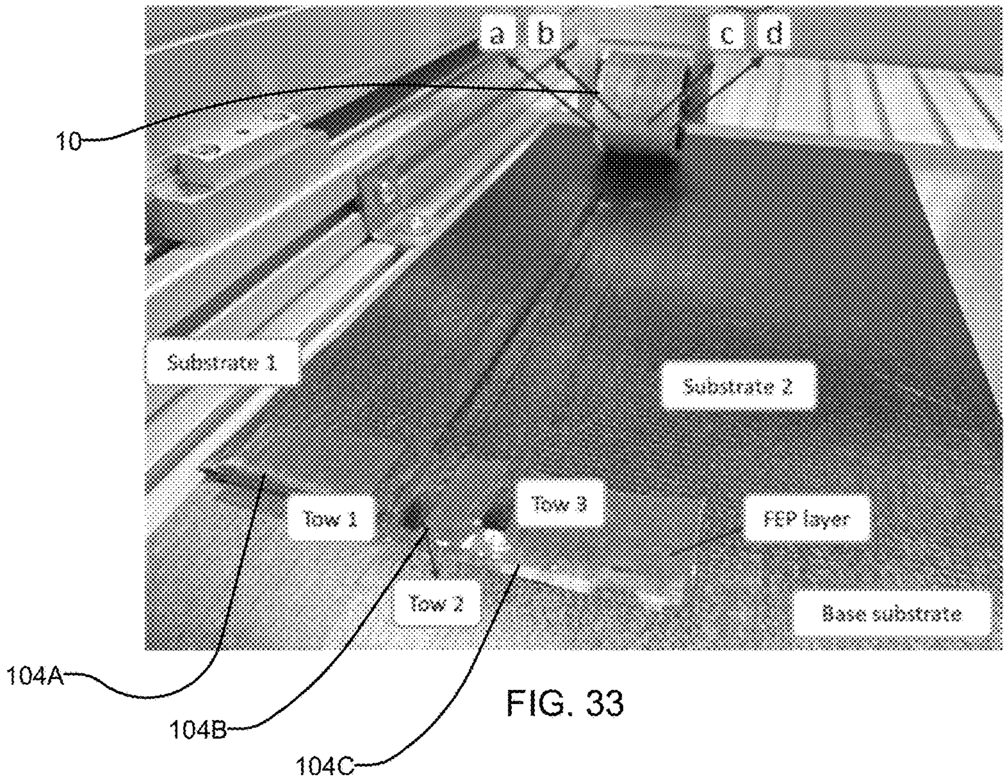
FIG. 33 is a photo of a further experimental setup for demonstrating pattern detection in an AFP application.
Figure 34:
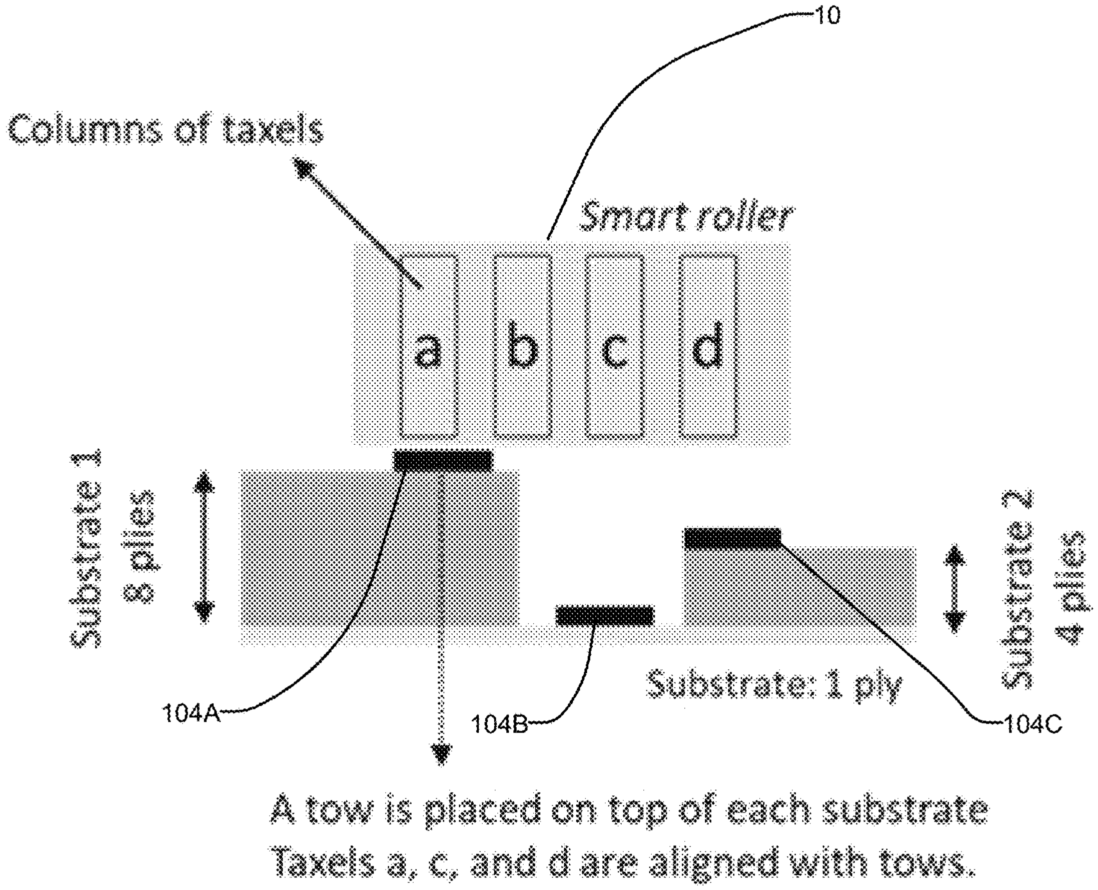
FIG. 34 is a schematic of layup geometries in the experimental setup of FIG. 33.

A further case study was designed to demonstrate the application of smart roller 10 in process development. FIG. 33 shows the experimental setup. The base substrate was a single ply of UD prepreg. In order to demonstrate the impact of height difference, an 8-ply thick substrate (substrate 1) and a 4-ply thick substrate (substrate 2) were placed on top of the base substrate. Three ¼-in-wide prepreg tows were cut from the same AS4/8552 prepreg material and placed on top of each substrate. FIG. 34 schematically shows the overall geometry and the column of taxels compacting each tow.

Figure 35:
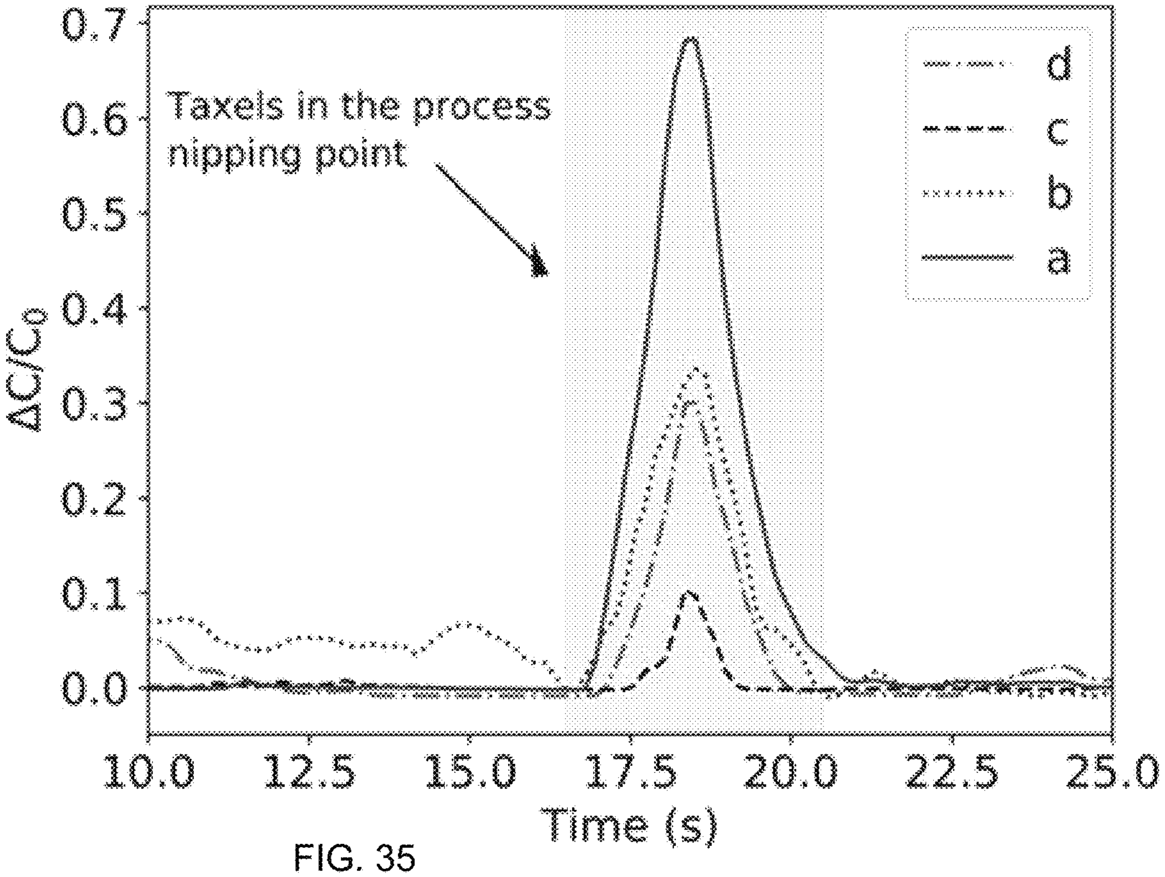
FIG. 35 is a graph of the change in capacitance over time observed in running the experimental setup of FIG. 33.

Using the AFP simulator, 50 N of compaction force was applied to consolidate the prepreg tows at a speed of 10 mm/s. The roller seen in FIG. 32 was rolled along and above tows 1-3. The experiment was performed at room temperature (22 °C). Throughout the experiment, raw capacitance data from the smart roller were recorded for further analysis. The data from the array of sensors is illustrated in FIG. 35, showing local measurement of normalized change in capacitance during the tack experiment.

As shown in FIG. 34, only taxel columns a, c, and d correspond to prepreg tow locations in this experiment and were considered for analysis. Using the characterization curve of FIG. 27, local pressure can be calculated from the normalized change in capacitance presented in FIG. 34.

RAVEN™ simulation software offers an implementation of a state-of-the-art physics-based prepreg tack model developed in, and was used to predict the prepreg tack obtained for each tow during the experiment.

Figure 36:
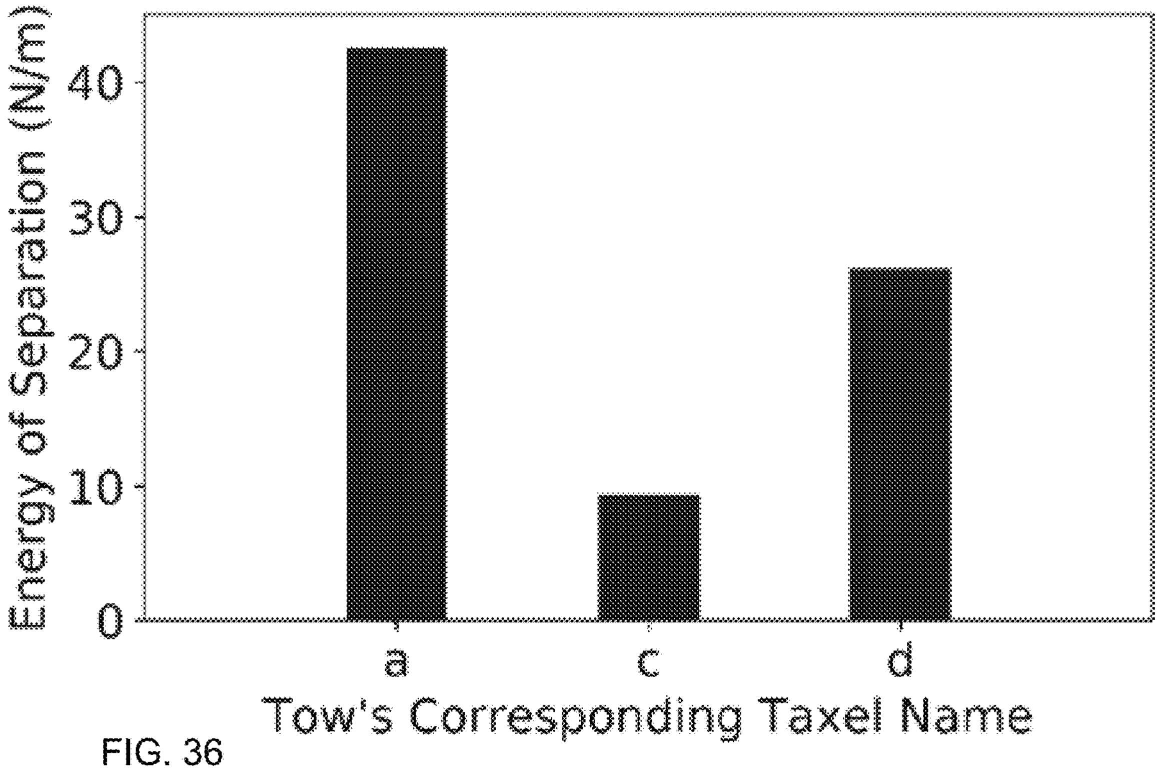
FIG. 36 is a graph showing the estimated energy of separation of each deposited tow in the experimental setup of FIG. 33.

FIG. 36 presents tack Energy of Separation (EoS) resulting from the experimental conditions for each tow. The prepreg tow corresponding to the location of taxel a is placed on the largest substrate and therefore experiences the highest amount of local pressure. A higher value of compaction force results in the superior quality of contact, and therefore the highest EoS (42.6 Nm) is achieved for this tow. On the other hand, the prepreg tow corresponding to the location of taxel c, is placed on the base substrate. The existence of substrates 1 and 2 does not allow the compaction roller to consolidate tow c very well, and therefore the lowest EoS (9.4 Nm) is predicted. The prepreg tow, corresponding to the location of taxel d, experiences a comparatively moderate amount of local pressure, and therefore, a moderate EoS (26.1 Nm) resulted from the simulations. Later tests confirmed that, as expected, the bonding is best with higher pressure applied, leading to less delamination.

Consequently, measurements of local pressure measured by sensor array 16 during deposition of prepreg tows 100 can be used in combination with a model for conversion of pressure histories to Energy of Separation to estimate the quality of prepreg tow deposition during AFP processing.

Automated Fiber Placement (AFP) is the leading technology in the automated lamination of composite materials that have enabled manufacturers to fabricate high-quality, complex structures at higher rates and with more consistent quality. Compaction pressure is well known to significantly impact the development of intimate contact, consolidation, and tack between prepreg layers deposited using AFP. Quality of consolidation and tack determines layup quality outcomes, yet currently, there is little to no real-time knowledge of the state of compaction under the roller.

Smart roller 10 retains the mechanical properties of the industrial roller while adding real-time pressure-sensing functionality.

In an exemplary embodiment, smart roller 10 is shown to measure up to 1 MPa pressure at the process nipping point. The system was able to measure at the rate of 100 μs per taxel, corresponding to a maximum traveling speed of 1 m/s for the AFP system while ensuring 1 measurement for each taxel for the duration of contact. Furthermore, two applications of the smart roller in the detection of the underlying layup geometry as well as in predicting prepreg tack are presented.

The sensing is made possible using a dielectric design comprising elastomeric pillars. This enables increased sensitivity, stretchable conductive traces, and flex printed circuit board connections that effectively connect with the electronics. The miniaturized circuitry is designed to be embedded in the roller itself to form an autonomous, stand-alone system that can readily be mounted on AFM machines.

Further mechanical, thermal, and electrical characterization of the smart roller can be performed to optimize the tradeoff between sensor size and performance.

Embedded Actuators

Figure 37A:
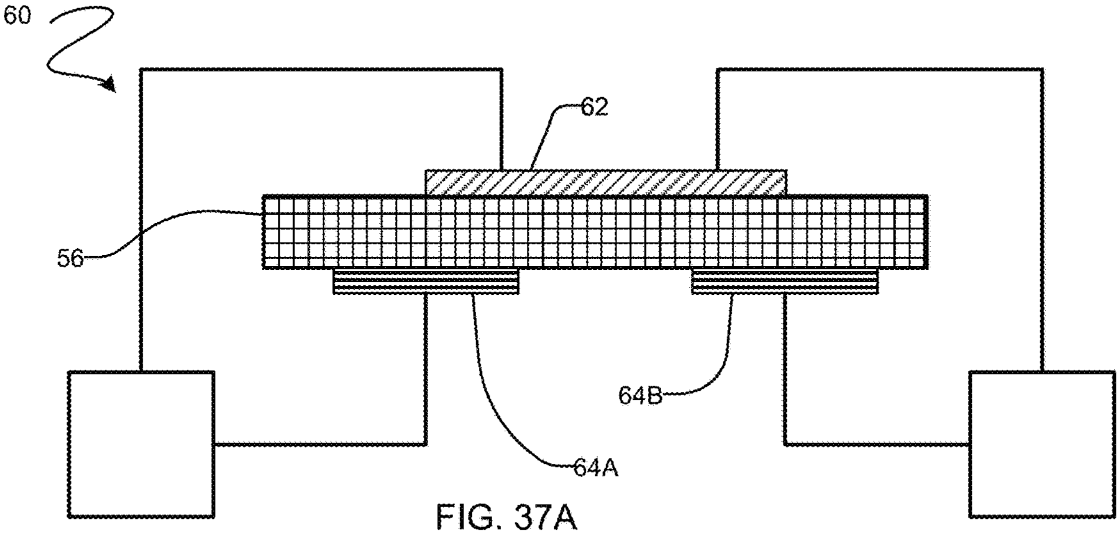
FIG. 37A depicts a schematic view of a capacitive actuator.

In another embodiment, embedded actuators can be incorporated in the exterior annular cylindrical portion 12, in addition to, or in the alternative to, sensor array 16, and such actuators can be arranged in an axially and circumferentially extending array and be independently actuatable to locally adjust forces. These actuators can be pneumatic, electrostrictive, Maxwell force-based or generally electrostatic, Lorentz force-based, hydraulic, magnetic, thermal and/or can be other actuators known in the art of actuation. In such embodiments, to make the forces applied more controllable, actuators may embedded into the roller (e.g. in exterior annular cylindrical portion 12) to enable the exterior cylindrical surface of the roller to change shape, thereby adapting to the shape of the part. This adaptive shaping can be performed in response to the measured forces from the sensor array 16. Adaptive shaping of the exterior cylindrical surface of the roller may be performed—in one embodiment—using dielectric elastomer actuators 60, as illustrated in FIG. 37A. In these actuators 60, voltages are applied between outer actuator electrodes 62 and inner actuator electrodes 64, leading to attraction between the electrodes and deformation. This is the inverse of the capacitive sensing process. By patterning electrodes, similar to what is done in the sensors, the rubber/composite interface can be displaced in both the radial direction (normal forces) and in directions tangential to the cylindrical surface (shear forces). Actuators 60 can be arranged as an actuator array 66, which extends in axial direction 26 and circumferential direction 24 as illustrated in FIG. 38, where individual actuators 60 can be independent controlled to enable local control of normal and shear forces.

Figure 37B:
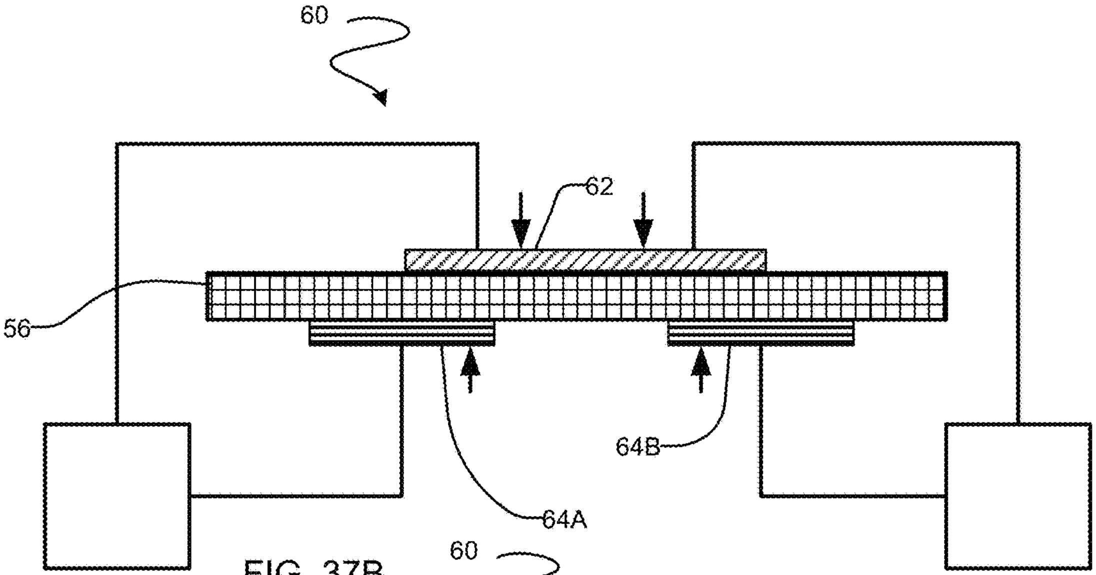
FIG. 37B depicts a schematic view of the FIG. 37A capacitive actuator applying compressive force to a dielectric.

An embodiment comprising dielectric elastomer actuators is illustrated in FIGS. 37A-37C and FIG. 38. An exemplary actuator electrode geometry is shown in FIG. 37A. When voltage is applied to both the outer actuator electrodes 62 and inner actuator electrodes 64, the outer actuator electrodes 62 and inner actuator electrodes 64A, 64B are pulled together evenly and cause an increase in area of the dielectric as it compresses and expands laterally, as shown in FIG. 37B. This pulling will change the force applied to the underlying surface. Spaces or air pockets or other geometrical patterns may be left between actuators to enable them to more freely displace, and not be constrained by the constant volume of the elastomers that may be used as the dielectric.

Figure 37C:
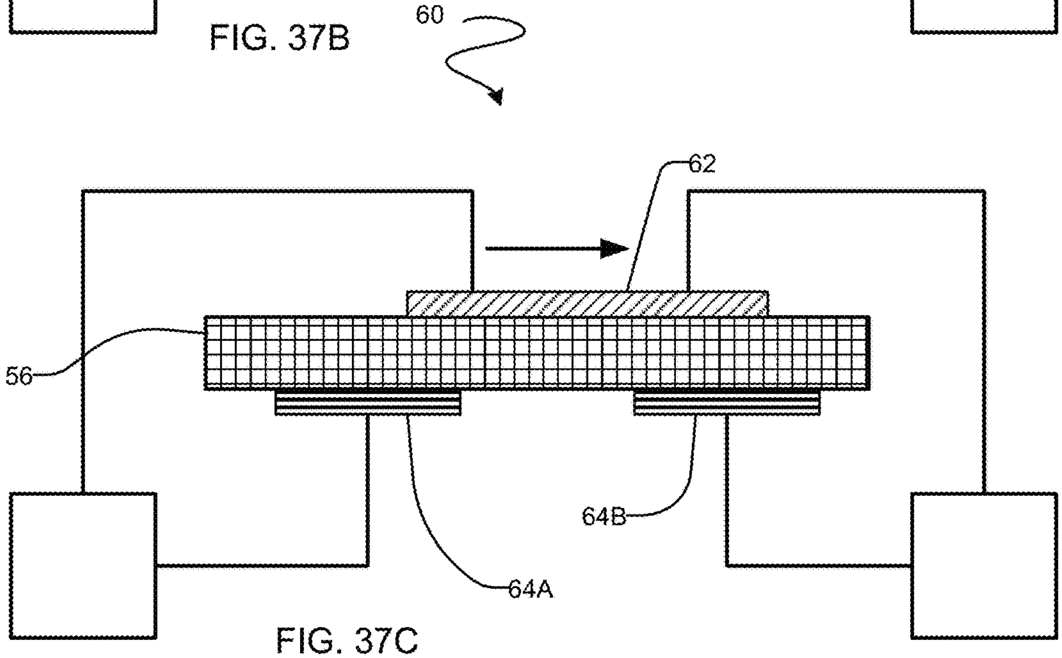
FIG. 37C depicts a schematic front view of the FIG. 37A capacitive actuator applying a shear force to a dielectric.

In some embodiments, the spaces or air pockets may be provided by gaps between pillars of dielectric material, similar to those discussed above in connection with sensor array 16. Shear may be generated by applying voltage between the outer actuator electrode and e.g. one or more of the inner actuator electrodes but not another of the inner actuator electrodes, which will draw the outer electrode to the inner actuator electrodes with an applied voltage. FIG. 37C illustrates the result of applying a voltage to the inner right actuator electrode 64B, causing the outer electrode 62 to experience a pulling force with a rightwards component. The shear can be controlled in two dimensions using a similar method and geometry, for example using a geometry such as that illustrated in FIG. 38. In FIG. 38, each outer actuator electrode 62 is associated with four inner actuator electrodes 64. The application and control of different voltages to selected inner actuator electrodes 64 permit the application of a resulting combination of compressive and shear forces on the dielectric (not shown). Power may be provided by a voltage source within the roller, e.g. powered externally or by battery. It may also be possible to use RF power. AC power can also be provided, inducing vibrations, and enabling ultrasound imaging. Such AC power could also be used to probe capacitance of underlying material. In some cases—for both actuation and sensing—a ground layer or other shield will be applied to protect the sensors, actuator and underlying parts from fields and voltages, and to enable sensing modes (shear and normal) to be separately monitored.

Calibration

Calibration of smart roller 10 can assist to compensate for variations in the sensitivity of taxels 19 by position and through time. In a calibration sequence, roller 10 may be rolled over a target surface comprising a calibration course 70, as illustrated in e.g. FIG. 39. Calibration course 70 may comprise one or more structures providing deviations 72 from a flat surface (e.g. protrusions 72). When a given taxel 19 is pressed over deviations 72, taxel 19 produces a signal, as previously described. If deviations 72 have a known shape and sequence, then running taxels 19 over a combination of deviations 72 that trigger all of the taxels 19 allows for calibration of the taxel 19 measurements relative to each other.

In one embodiment of a calibration sequence, deviations 72 comprise one or more ridges 72A that have width dimensions approximately commensurate with axial dimensions of the taxels 19. Spacing between ridges 72A in a group may approximate the spacing between taxels 19. Smart roller 10 is brought into contact with ridges 72A, in this case under constant applied force. In the example shown in FIG. 39, a calibration course 70 is designed for a smart roller 10 with a sensor array 16 of four circumferentially extending rows of taxels 19, each row of taxels wrapping circumferentially around the smart roller 10. The complete circumferential sensor array 16 is calibrated by rolling along the ridges 72A. The length of the calibration course may be equal to or greater than the total circumference of the exterior annular cylindrical portion.

Figure 39:
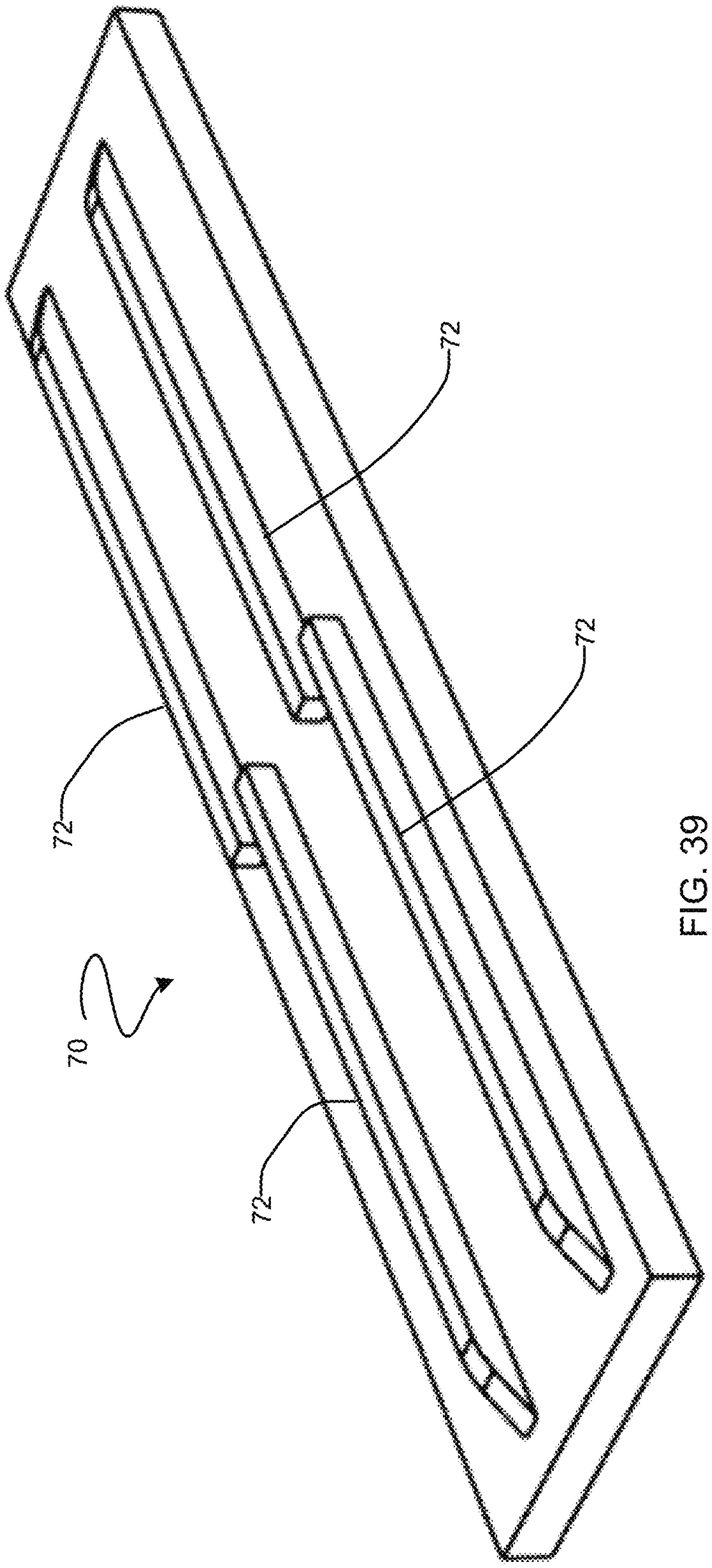
FIG. 39 is a perspective view of a calibration course according to an embodiment.

In the calibration course 70 shown in FIG. 39, a first two of the rows of taxels 19 of sensor array 16 are calibrated and then there is a transition in the middle as smart roller 10 progresses onto two other ridges 72A, with the second set of circumferential taxels 19 being calibrated. Since smart roller systems are pressure controlled, it is not necessary to alter ridge height to control the force applied. To test different force magnitudes, the pressure applied to the smart roller 10 against the calibration course 70 may be increased. In such a calibration sequence, the roller 10 may be rolled over the ridges multiple times, each time at different force.

Figure 40A:
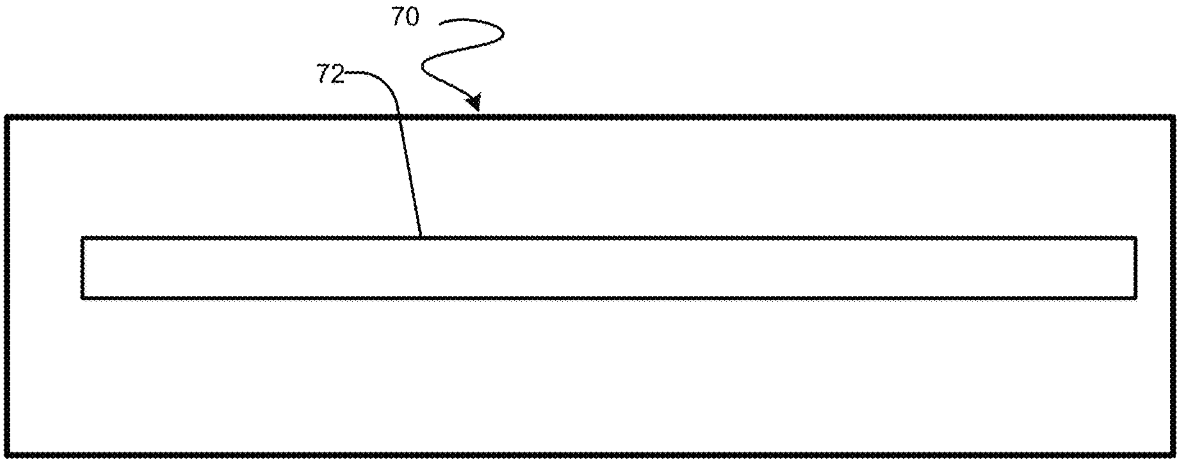
FIG. 40A depicts a schematic flattened view of an exemplary geometry of a calibration course according to an embodiment.
Figure 40B:
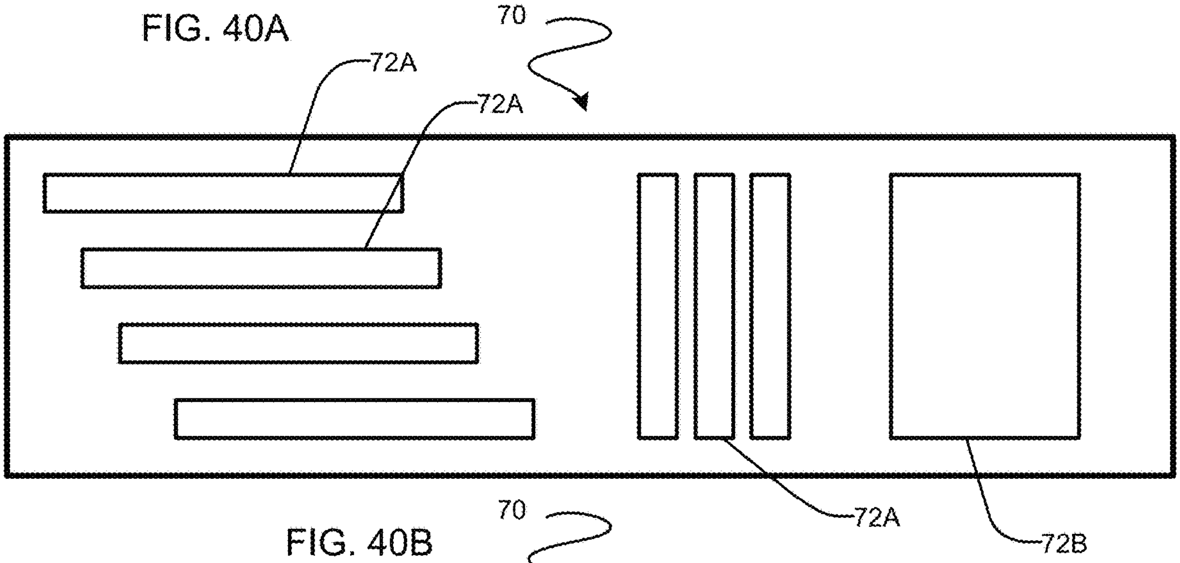
FIG. 40B depicts a schematic flattened view of an exemplary geometry of a calibration course according to an embodiment.
Figure 40C:
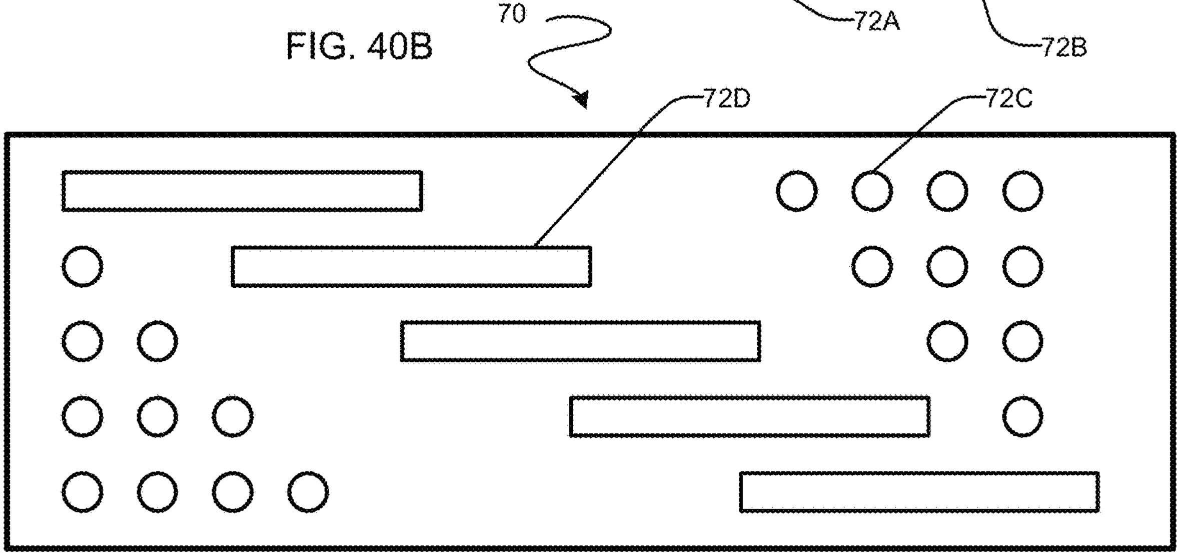
FIG. 40C depicts a schematic flattened view of an exemplary geometry of a calibration course according to an embodiment.

This calibration can be done calibration courses 70 with other shapes. Some exemplary shapes are illustrated in FIGS. 40A, 40B and 40C. A calibration course could be prepared with only a single deviation 72, such as a single ridge 72A, as illustrated in FIG. 40A. This course can have the advantage that smart roller 10 relative to ridge 72A can be less controlled. Smart roller 10 can be run across single ridge 72A multiple times to calibration each taxel 19 in sensor array 16, adjusting the relative alignment of smart roller 10 on each calibration run. In such a sequence, alignment could also be adjusted by first calibrating all taxels e.g. on the single ridge, and then repeating the tests on a flat surface (or on two ridges, or on other structures) and adjusting alignment to obtain uniform loading.

Surface deviations 72 can comprise shapes other than ridges. Surface deviations 72 may have various geometries, for example as illustrated in FIGS. 40B and 40C, where one surface deviation 72 comprises a block 72B and a second ridge comprises a pillar 72C. In some embodiments of a calibration course 70, the calibration course 70 may comprise sequences of surface deviations 72 with varying heights and profiles to calibrate taxels 19 at different applied pressures. For example, the surface deviations 72D in FIG. 40C may comprise ramps with increasing height across their length.

In general, a calibration sequence by having a surface with a range of different height deviations 72 in different locations and combinations, and by running the roller over this surface at different positions, rates, loads, and other parameters, enough data can be generated to either (a) do a complete calibration of each individual taxel 19 under the range of conditions of interest and/or (b) quickly evaluate whether previous calibration(s) remain valid.

Interpretation of Terms

Unless the context clearly requires otherwise, throughout the description and the

- "comprise", "comprising", and the like are to be construed in an inclusive sense, as opposed to an exclusive or exhaustive sense; that is to say, in the sense of "including, but not limited to";
- "connected", "coupled", or any variant thereof, means any connection or coupling, either direct or indirect, between two or more elements; the coupling or connection between the elements can be physical, logical, or a combination thereof;
- "herein", "above", "below", and words of similar import, when used to describe this specification, shall refer to this specification as a whole, and not to any particular portions of this specification;
- "or", in reference to a list of two or more items, covers all of the following interpretations of the word: any of the items in the list, all of the items in the list, and any combination of the items in the list;
- the singular forms "a", "an", and "the" also include the meaning of any appropriate plural forms.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

In addition, while elements are at times shown as being performed sequentially, they may instead be performed simultaneously or in different sequences. It is therefore intended that the following claims are interpreted to include all such variations as are within their intended scope.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

The invention claimed is:

1. A roller for measuring properties of a region of contact between the roller and a target surface, the roller comprising:

an exterior annular cylinder portion, the exterior annular cylinder portion comprising an elastomeric material, the exterior annular cylinder portion having an exterior cylindrical surface;

a sensor array extending in an axial direction and in a circumferential direction of the exterior annular cylinder portion, the array comprising a plurality of independently sampleable sensor elements, each sensor element comprising, within and as part of the sensor element, the elastomeric material of the exterior annular cylinder portion separating, in a radial direction normal to the axial and circumferential directions at a location of the sensor element, an outer electrode and an inner electrode, the elastomeric material within each sensor element formed into a plurality of pillars extending in the radial direction, the plurality of pillars spaced apart from each other in the axial and circumferential directions, each sensor element located for measurement at a corresponding axial and circumferential sensor location;

a rigid interior portion, at least a portion of the rigid interior portion disposed in a bore of the exterior annular cylinder portion, the rigid interior portion connected to the exterior annular cylinder portion for unitary rotational movement therewith; and readout electronics operably connected to the sensor array and configurable to independently sample sensor output from each of the sensor elements.

2. The roller of claim 1 wherein at least some of the sensor elements generate sensor output that varies with force applied to the exterior cylindrical surface in the radial direction at their corresponding sensor locations.

3. The roller according to claim 1 wherein at least some of the sensor elements generate sensor output that varies with force applied to the exterior cylindrical surface in at least one of axial and circumferential directions tangential to the exterior cylindrical surface at their corresponding sensor locations.

4. The roller according to claim 1 wherein at least some of the sensor elements generate sensor output that varies with proximity of the target surface to their corresponding sensor locations.

5. The roller of claim 1 wherein each of the at least some of the sensor elements comprises a flexible capacitive sensor for which the sensor output is a capacitance.

6. The roller according to claim 5 wherein the sensor array comprises an array of inner electrodes and an array of outer electrodes, the array of inner electrodes and the array of outer electrodes at least partially overlapping one another and at least some regions of the array of inner electrodes and the array of outer electrodes separated from one another in the radial direction by elastic dielectric material, the elastic dielectric material made up of the elastomeric material of the exterior annular portion.

7. The roller according to claim 6 wherein at least one of the array of inner electrodes and the array of outer electrodes extend around substantially a circumference of a cylindrical axis of the exterior annular cylinder portion.

8. The roller according to claim 6 wherein one or more of the inner electrodes and one or more of the outer electrodes extend around substantially a circumference of a cylindrical axis of the exterior annular cylinder portion.

9. The roller according to claim 6 wherein the readout electronics are configured to selectively sample inner electrodes and outer electrodes corresponding to sensor elements with corresponding circumferential sensor locations within a threshold circumferential range in or around the region of contact.

10. The roller according to claim 9 wherein the readout electronics are configured to selectively sample inner electrodes and outer electrodes corresponding to sensor elements with corresponding circumferential sensor locations within the threshold circumferential range by dynamically selecting a subset of inner electrodes and outer electrodes based on at least one of a measurement of the region of contact or an estimation of a location of the region of contact.

11. The roller according to claim 1 wherein the plurality of pillars are shaped to define gaps on the circumferential and/or axial sides of each pillar which provide volumes into which the plurality of pillars deform in response to force applied to the exterior cylindrical surface.

12. The roller according to claim 11 wherein when a force is applied to the exterior cylindrical surface, the pillars and gaps are shaped for the pillars to deform into the gaps without adjacent pillars contacting one another.

13. The roller according to claim 1 wherein the rigid interior portion comprises a surface defining at least a portion of a compartment and wherein the readout electronics are housed within the compartment.

14. The roller according to claim 1 comprising a shaft housing rigidly connectable to or defined by the rigid inner portion to enable a rotary connection to an external shaft.

15. The roller according to claim 1 wherein the sensor array spans a circumference around cylindrical axis of the exterior annular cylinder portion and an axial dimension of the exterior annular cylinder portion to thereby provide a spatial pressure sensor over the exterior cylindrical surface of the exterior annular cylinder portion, the pressure sensor having a spatial resolution corresponding to a size of the sensor elements.

16. A method for sampling the sensor array of the roller of claim 1, the method comprising:

determining or estimating the region of contact;

controlling the readout electronics to selectively sample sensor elements with corresponding circumferential sensor locations within a threshold circumferential range in or around the determined or estimated region of contact.

17. The method of claim 16 wherein determining or estimating the region of contact comprises estimating the region of contact based on output from one or more sensors (e.g. an encoder connected to detect rotation of the roller about is axis).

18. The method of claim 16 comprising repeating the steps of:

determining or estimating the region of contact; and controlling the readout electronics to selectively sample sensor elements with corresponding circumferential sensor locations within a threshold circumferential range in or around the determined or estimated region of contact;

a plurality of times in each rotation of the roller.

19. A method of automatically calibrating the roller of claim 1, the method comprising:

positioning the roller in a known position relative to a calibration surface;

rolling the roller over and in contact with the calibration surface to produce a measured sensor readout; and recalibrating the roller on the basis of an expected sensor readout and the measured sensor readout;

wherein the calibration surface comprises one or more calibration protrusions of known dimensions and shaped to provide for the measurement of the expected sensor readout.

20. The method of claim 19 comprising:

rolling the roller over the calibration surface one or more additional times to thereby generate one or more additional measured sensor readouts; and recalibrating the roller on the basis of the expected sensor readout, the measured sensor readout and the one or more additional measured sensor readouts.

21. The method of claim 20, wherein the calibration protrusions of the calibration surface comprise a known sequence of protrusions at least two of which are aligned with one another in an axial dimension of the roller as the roller rolls over the calibration surface and at least two of which are aligned with one another in a circumferential dimension of the roller as the roller rolls over the calibration surface.

22. A method of estimating tack of prepreg tow deposited by a roller according to claim 1, the method comprising:

rolling the roller relative to the prepreg tow under a compaction pressure;

measuring local pressure histories at one or more of the sensor elements, each local pressure history corresponding to a section of prepreg tow compacted by the roller;

determining, based at least in part on the measured local pressure histories, an estimated prepreg tack of the corresponding sections of prepreg tow.

23. The roller according to claim 1 wherein the sensor array is imbedded in a volume of the exterior annular cylinder portion.

24. The roller according to claim 1 wherein the sensor array comprises an array of inner electrodes and an array of outer electrodes, the array of inner electrodes and the array of outer electrodes at least partially overlapping one another and at least some regions of the array of inner electrodes and the array of outer electrodes separated from one another in the radial direction by the dielectric elastomeric material of the sensing annular portion, wherein at least one electrode of the array of outer electrodes radially overlaps multiple electrodes of the array of inner electrodes.

* * * * *